US009248467B2

(12) United States Patent
Advincula et al.

(10) Patent No.: US 9,248,467 B2
(45) Date of Patent: *Feb. 2, 2016

(54) TYPES OF ELECTRODEPOSITED POLYMER COATINGS WITH REVERSIBLE WETTABILITY AND ELECTRO-OPTICAL PROPERTIES

(76) Inventors: Rigoberto Advincula, Friendswood, TX (US); Roderick B. Pernites, Houston, TN (US)

(*) Notice: Subject to any disclaimer, the term of this patent is extended or adjusted under 35 U.S.C. 154(b) by 135 days.

This patent is subject to a terminal disclaimer.

(21) Appl. No.: 13/179,515

(22) Filed: Jul. 9, 2011

(65) Prior Publication Data

US 2012/0015146 A1    Jan. 19, 2012

Related U.S. Application Data

(60) Provisional application No. 61/363,696, filed on Jul. 13, 2010.

(51) Int. Cl.
| | | |
|---|---|---|
| C25D 5/02 | (2006.01) |
| C23C 28/00 | (2006.01) |
| C25D 5/48 | (2006.01) |
| C25D 1/00 | (2006.01) |
| B05D 1/20 | (2006.01) |
| B05D 3/10 | (2006.01) |
| B05D 3/14 | (2006.01) |
| B82Y 30/00 | (2011.01) |
| B82Y 40/00 | (2011.01) |

(Continued)

(52) U.S. Cl.
CPC ............... *B05D 1/202* (2013.01); *B05D 3/105* (2013.01); *B05D 3/14* (2013.01); *B82Y 30/00* (2013.01); *B82Y 40/00* (2013.01); *C25D 13/04* (2013.01); *B05D 7/14* (2013.01); *Y10T 428/24405* (2015.01); *Y10T 428/254* (2015.01); *Y10T 428/31533* (2015.04)

(58) Field of Classification Search
CPC ............ C23C 28/00; C25D 5/48; C25D 9/02; C25D 15/00
USPC .................................. 205/118, 188, 229, 67
See application file for complete search history.

(56) References Cited

U.S. PATENT DOCUMENTS

| | | | |
|---|---|---|---|
| 5,151,224 A * | 9/1992 | Madou et al. .................. 252/586 |
| 2012/0263922 A1* | 10/2012 | Advincula et al. ............ 428/172 |

FOREIGN PATENT DOCUMENTS

WO    WO 2007010536 A2 *    1/2007

OTHER PUBLICATIONS

Roncali et al., "Electroactive Conducting Composites from Poly(3-methylthiophene) and Poly(methylmethacrylate)", J. Chem. Soc., Chem. Commun. (no month, 1986), pp. 783-784.*

(Continued)

*Primary Examiner* — Edna Wong
(74) *Attorney, Agent, or Firm* — Robert W Strozier

(57) ABSTRACT

Novel coatings are disclosed prepared by electropolymerization of non-fluorinated conducting pre-grafted hydrophobic electropolymerizable monomers onto a conducting layer of a substrate, where the electropolymerized coating exhibit both unique reversible wettability and electro-optical properties. The coating may also include one or more layers of polymer particles upon which the non-fluorinated conducting pre-grafted hydrophobic electropolymerizable monomers are polymerized imparting a submicron structure to the coating. Methods for making and using the coatings are also disclosed.

22 Claims, 56 Drawing Sheets

SCHEME I.2

(51) Int. Cl.
  *C25D 13/04* (2006.01)
  *B05D 7/14* (2006.01)

(56) References Cited

OTHER PUBLICATIONS

Yang et al., "Microporous Conducting Polymers on Neutral Microelectrode Arrays I Electrochemical Deposition", Sensors and Actuators B (no month, 2004), vol. 101, pp. 133-142.*

Yu et al., "Fabrication of Polymer-Nanoparticle Composite Inverse Opals by a One-Step Electrochemical Co-deposition Process", Nano Letters (no month, 2004), vol. 4, No. 1, pp. 177-181.*

Li et al., "Electrochemical Polymerization of Poly(thiophene-3-ethyl acetate)—A New Candidate for a Rechargeable Battery Cathode", Journal of Electroanalytical Chemistry and Interfacial Electrochemistry (no month, 1991), vol. 302, Nos. 1-2, pp. 279-284.*

Waenkaew et al., "Electro-Copolymerization of Layer-by-Layer Deposited Polythiophene and Polycarbazole Precursor Ultrathin Films", Macromol. Rapid Commun. (no month, 2007), vol. 28, pp. 1522-1527.*

Freitas et al., "Electrochemical Synthesis of a Novel Conducting Polymer: The Poly[3-Pyrrolyl)-Octanoic Acid", Synthetic Metals (no month, 2005), vol. 155, pp. 549-554.*

Peng et al., "Novel Conducting Polymers for DNA Sensing", Macromolecules (no month, 2007), vol. 40, pp. 909-914.*

Bartlett et al., "Conducting Polymers Grown Around Self-Assembled Colloidal Templates", J. Mater. Chem. (no month, 2001), vol. 11, pp. 849-853.*

Waltman et al., "Electrically Conducting Polymers: A Review of the Electropolymerization Reaction of the Effects of Chemical Structure on the Polymer Film Properties, and Applications Towards Technology", Can. J. Chem. (no month, 1986), vol. 64, pp. 76-95.*

Ravindranath et al., "Ultrathin Conjugated Polymer Network Films of Carbazole Functionalized Poly(p-Phenylenes) via Electropolymerization", J. Phys. Chem. B (no month, 2007), vol. 111, pp. 6336-6343.*

Peng et al., "Synthesis of a Functionalized Polythiophene as an Active Substrate for a Label-Free Electrochemical Genosensor", Polymer (no month, 2007), vol. 48, pp. 3413-3419.*

Peng et al., "Conducting Polymers for Electrochemical DNA Sensing", Biomaterials (no month, 2009), vol. 30, pp. 2132-2148.*

Li et al., "Electrochemical Polymerization of Poly(thiophene-3-ethyl acetate)—A New Candidate for a Rechargeable Battery Cathode", J. Electroanal. Chem. (no month, 1991), vol. 302, pp. 279-284.*

Bartlett et al., "Electrochemical Syntheses of Highly Ordered Macroporous Conducting Polymers Grown Around Self-Assembled Colloidal Templates", J. Mater. Chem. (no month, 2001), vol. 11, pp. 849-853.*

Halldorsson et al., "Controlled Transport of Droplets Using Conducting Polymers", Langmuir (no month, 2009), vol. 25, No. 18, pp. 11137-11141.*

Senaratne et al., "Self-Assembled Monolayers and Polymer Brushes in Biotechnology: Current Applications and Future Perspectives", Biomacromolecules (no month, 2005), vol. 6, pp. 2427-2448.*

* cited by examiner

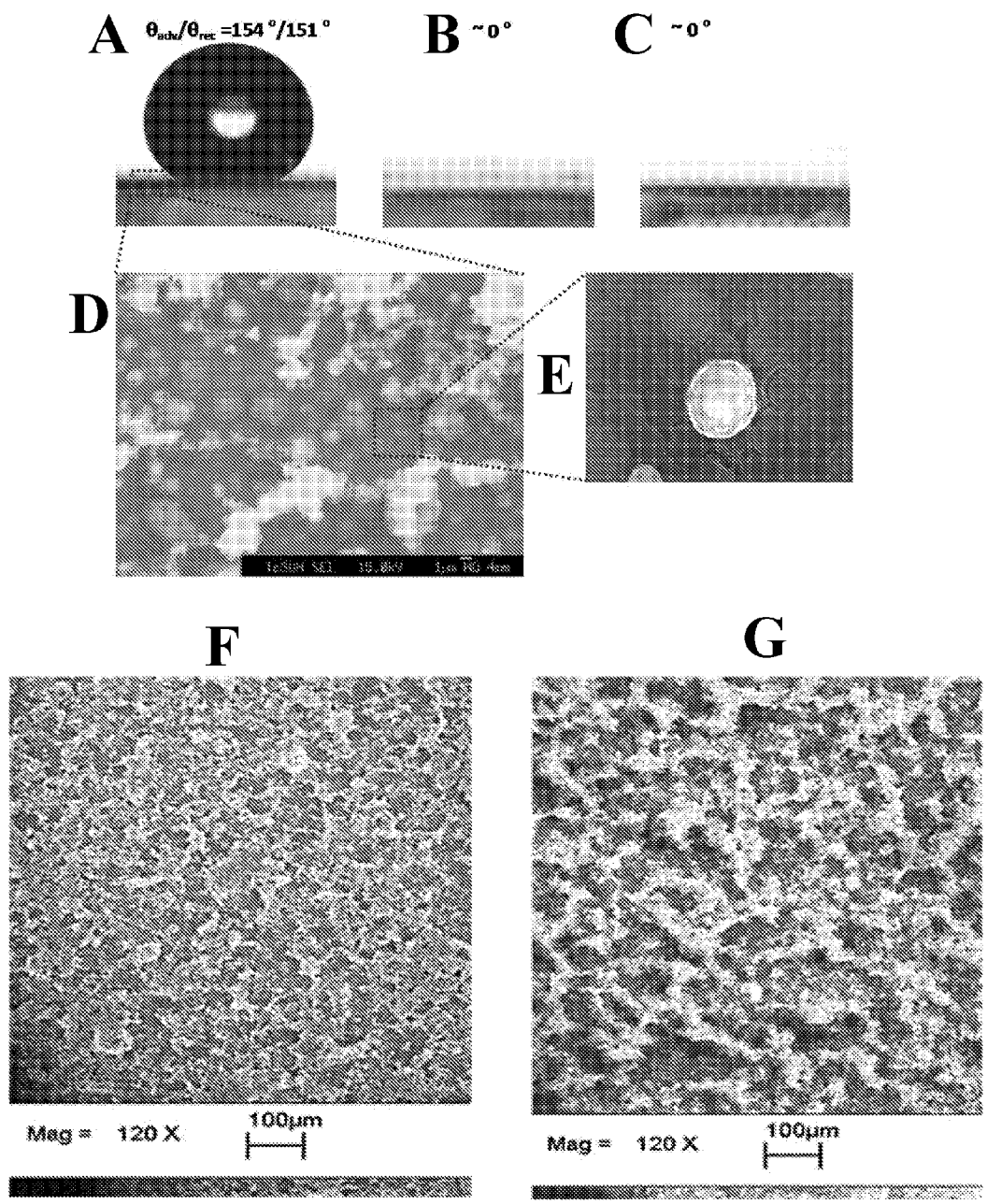
FIG. 18A-G

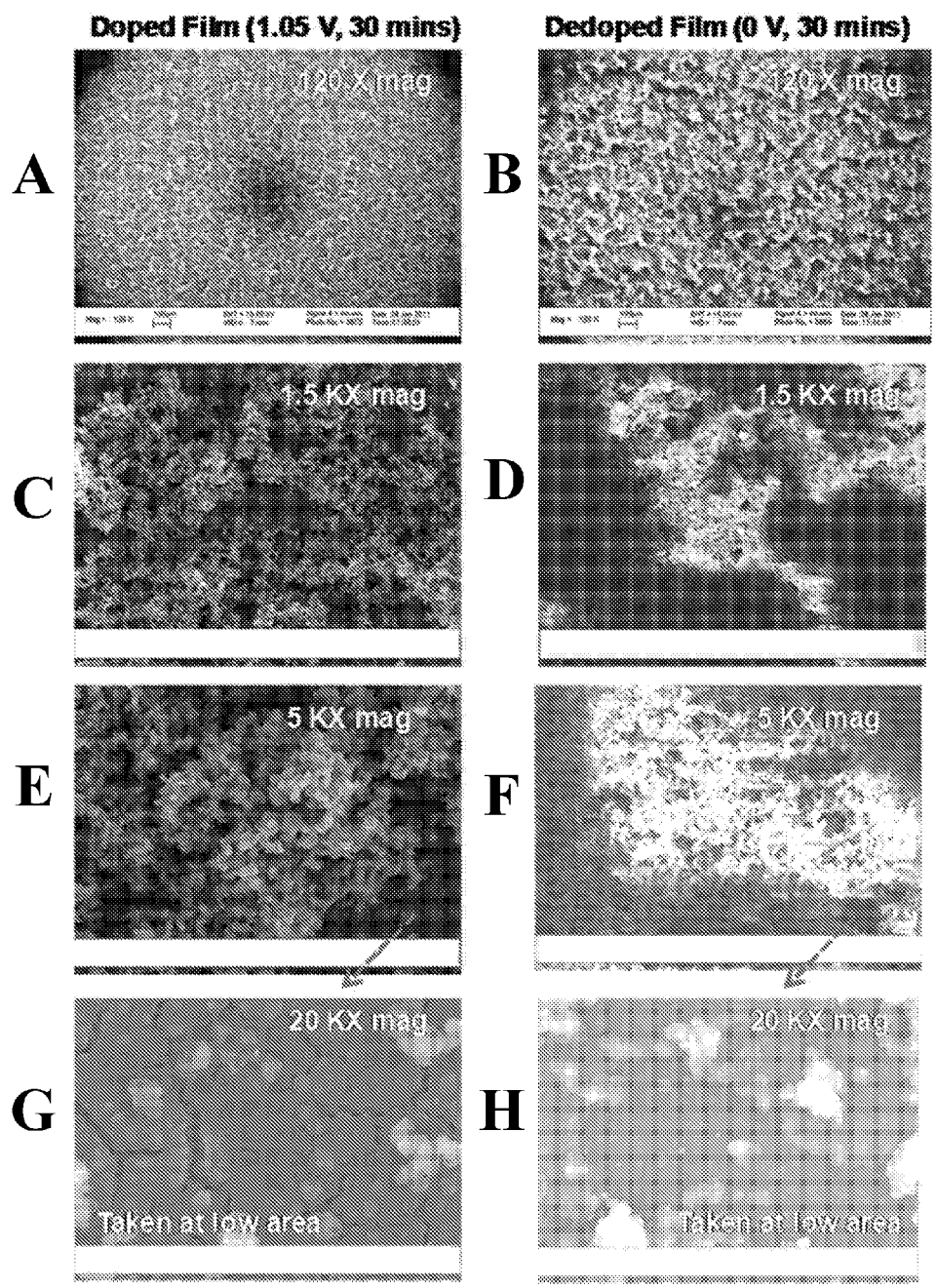
FIG. 19A-H

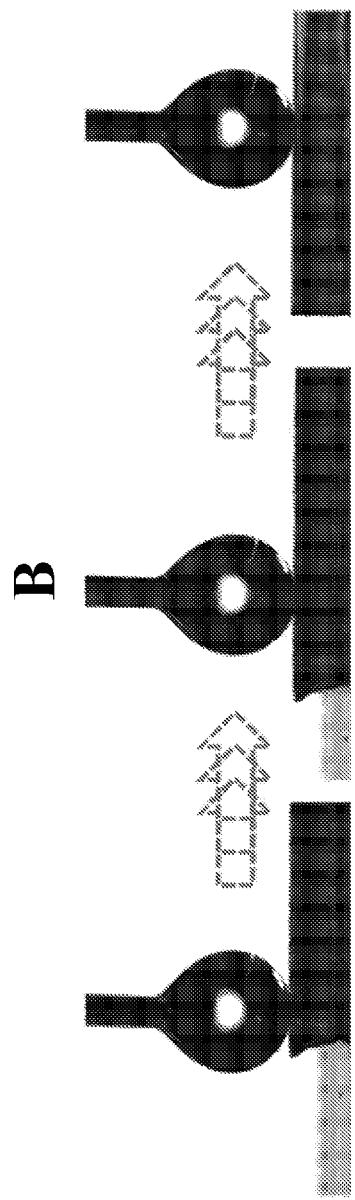
FIG. 20A&B

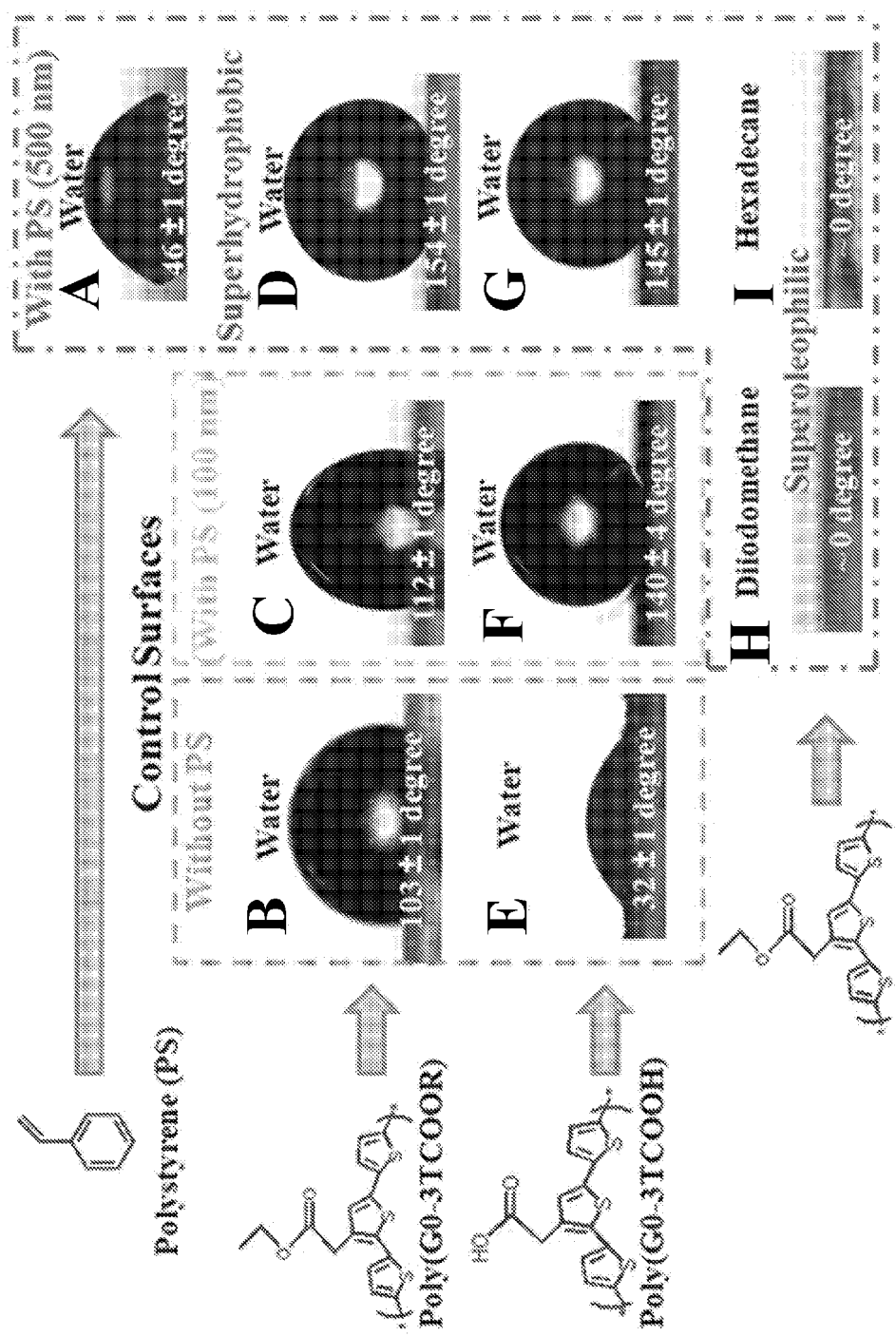
FIG. 21A-I

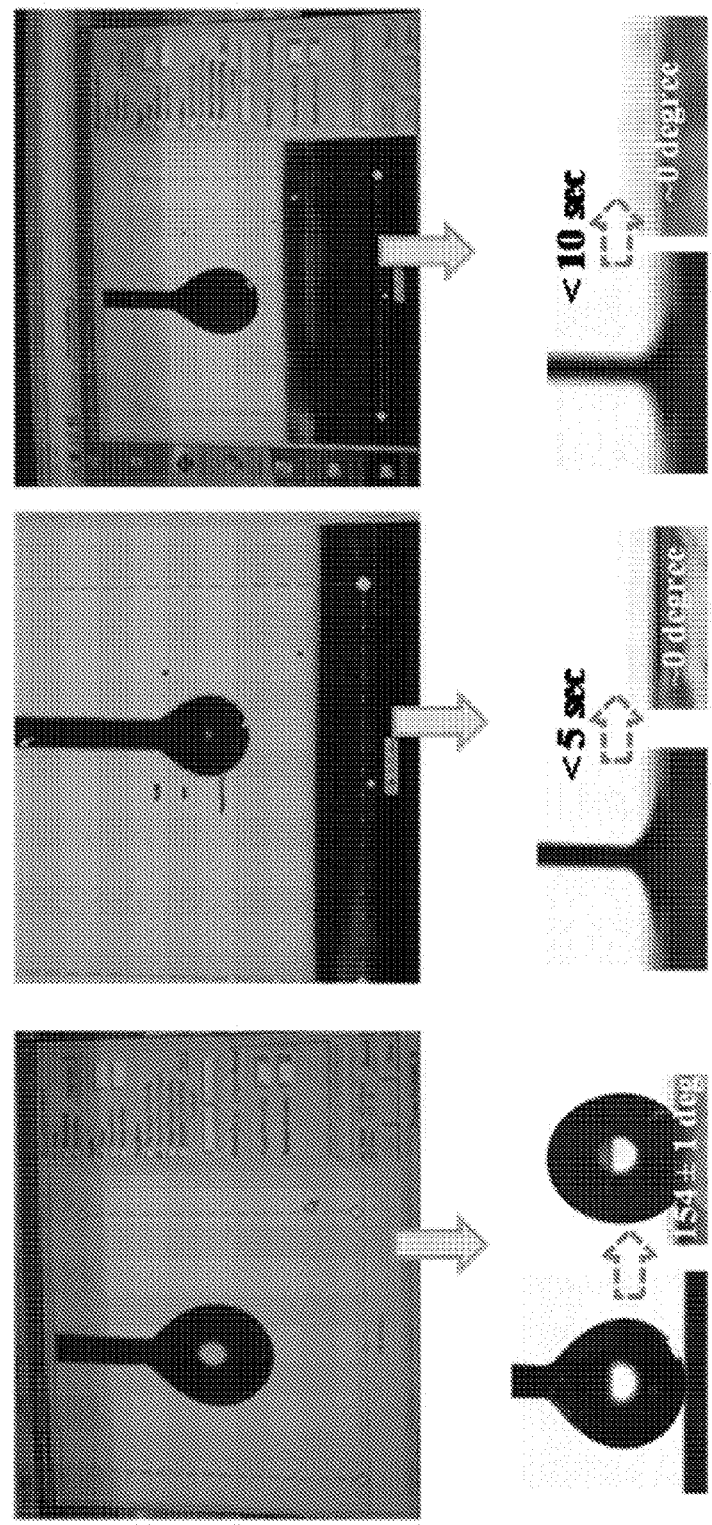

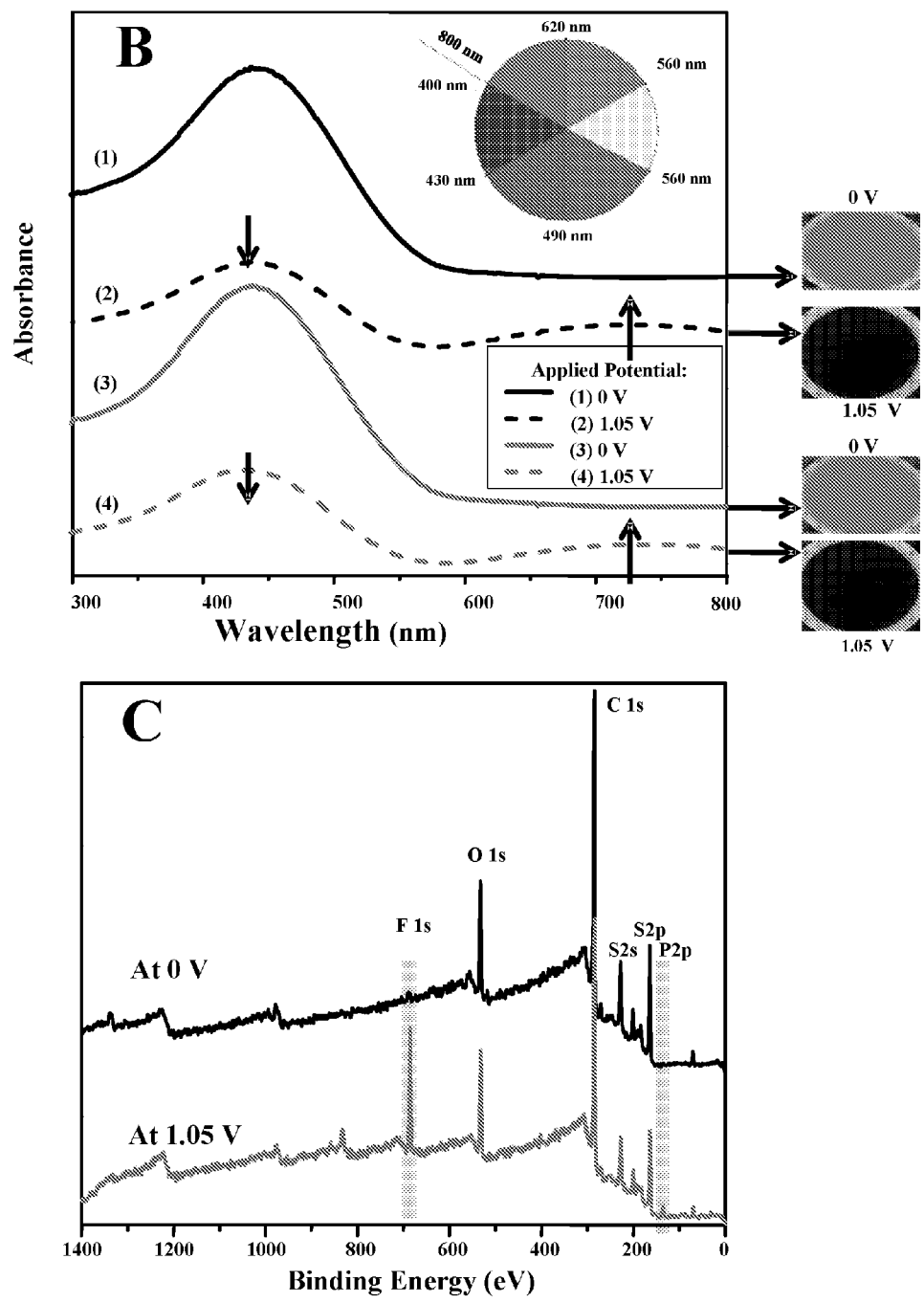
FIG. 25B-C

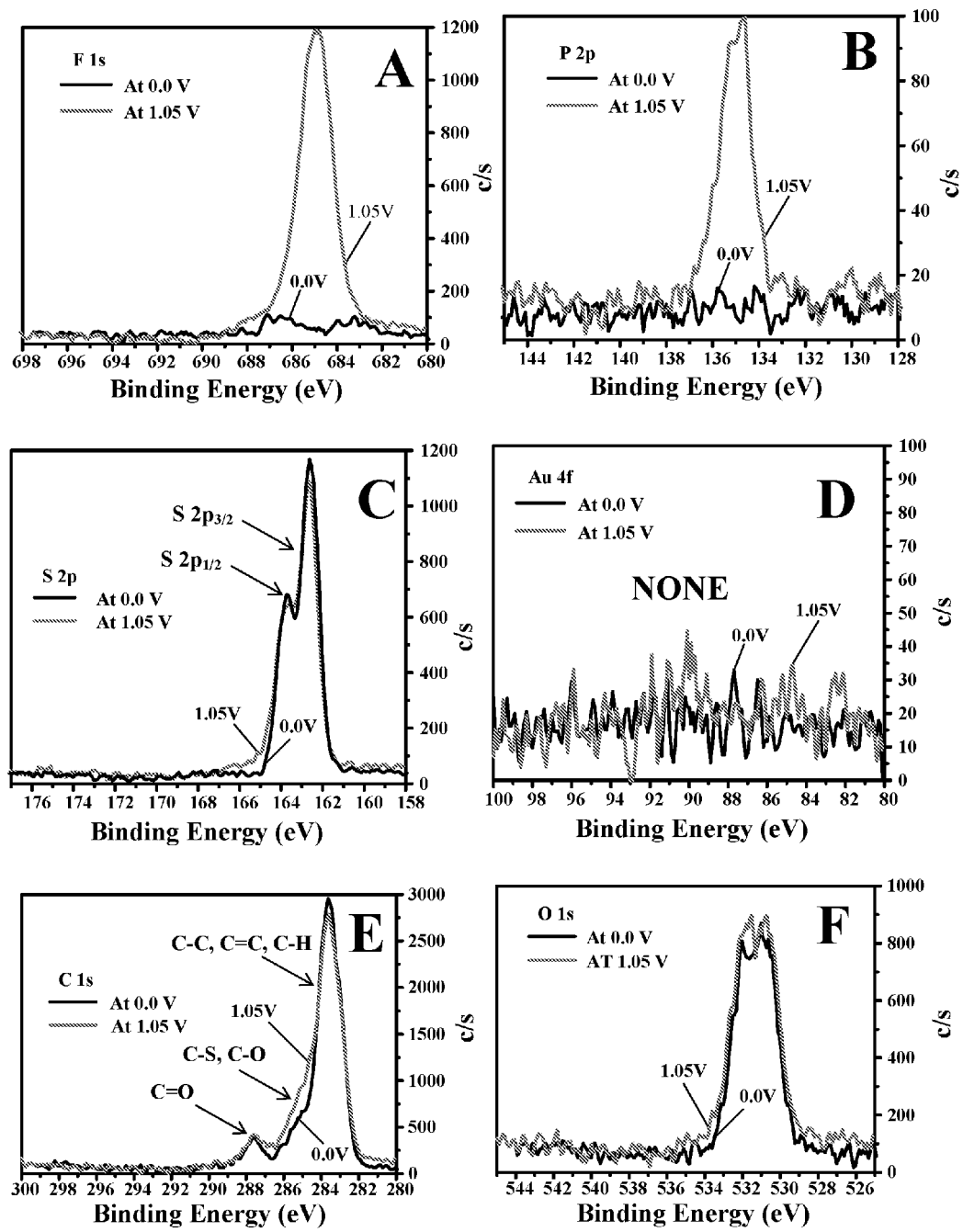
FIG. 26A-F

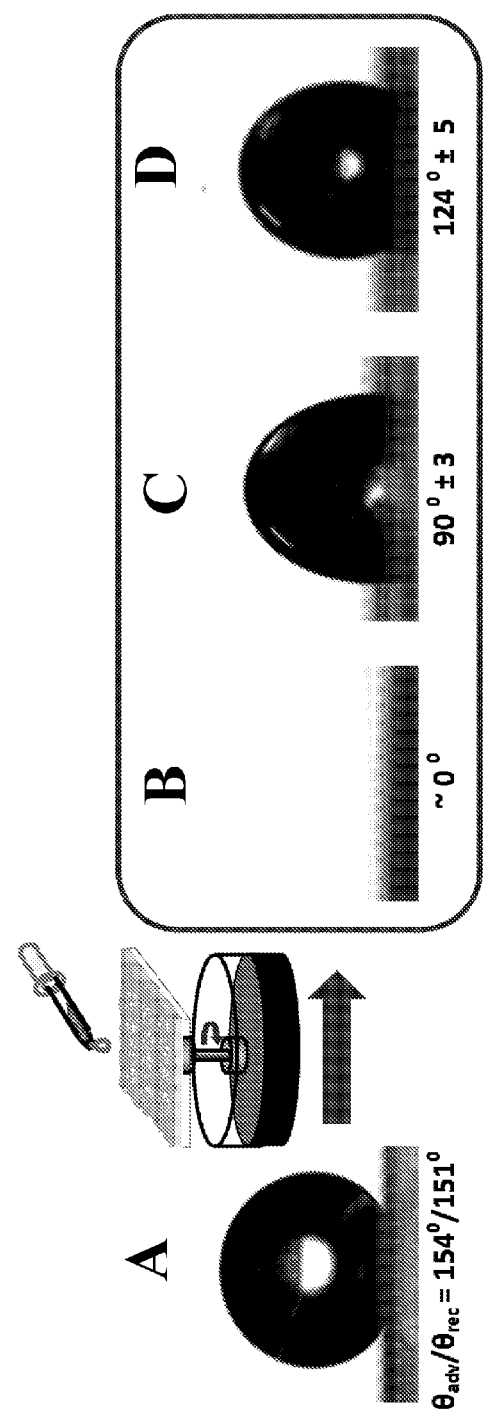
FIG. 27A-D

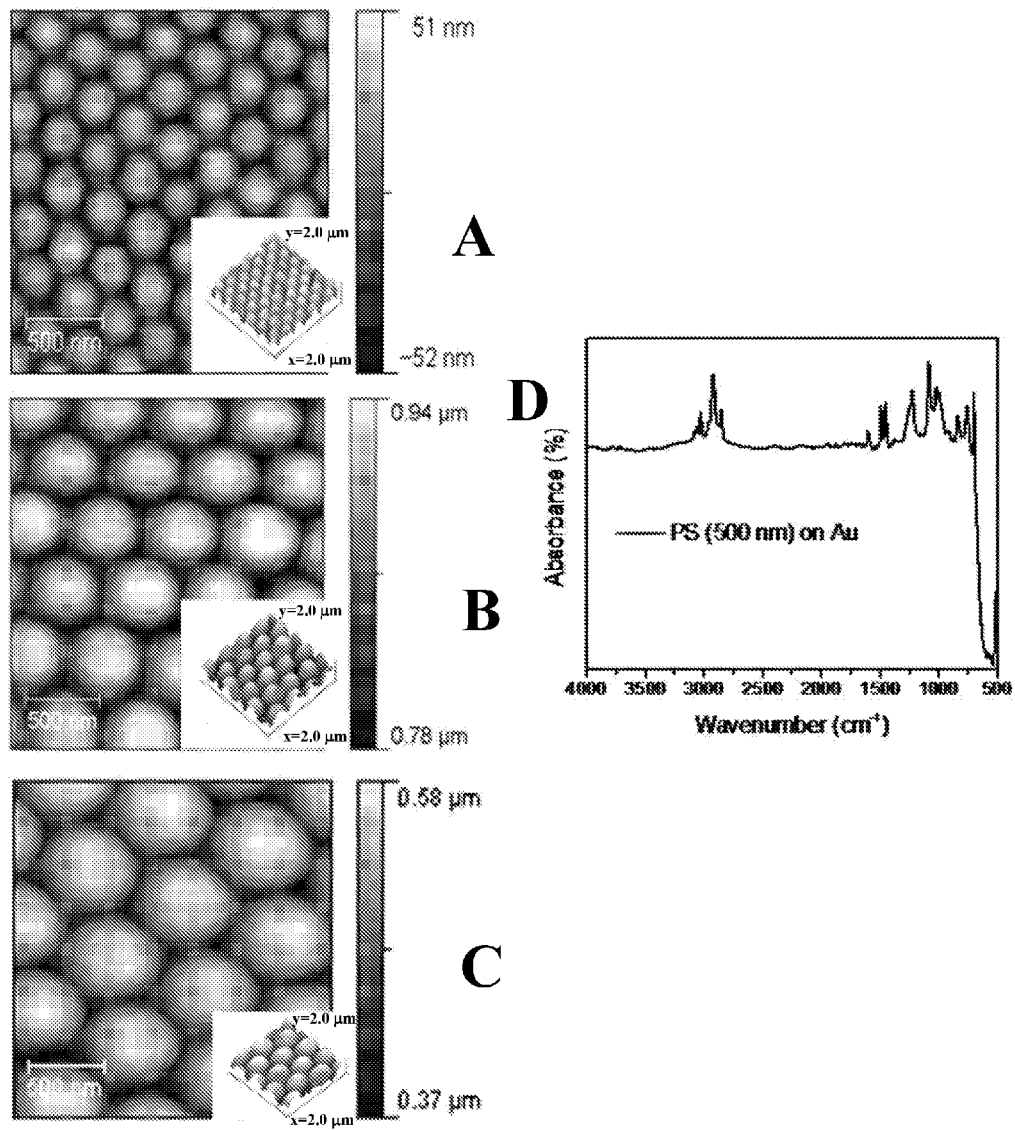
FIG. 34A-D

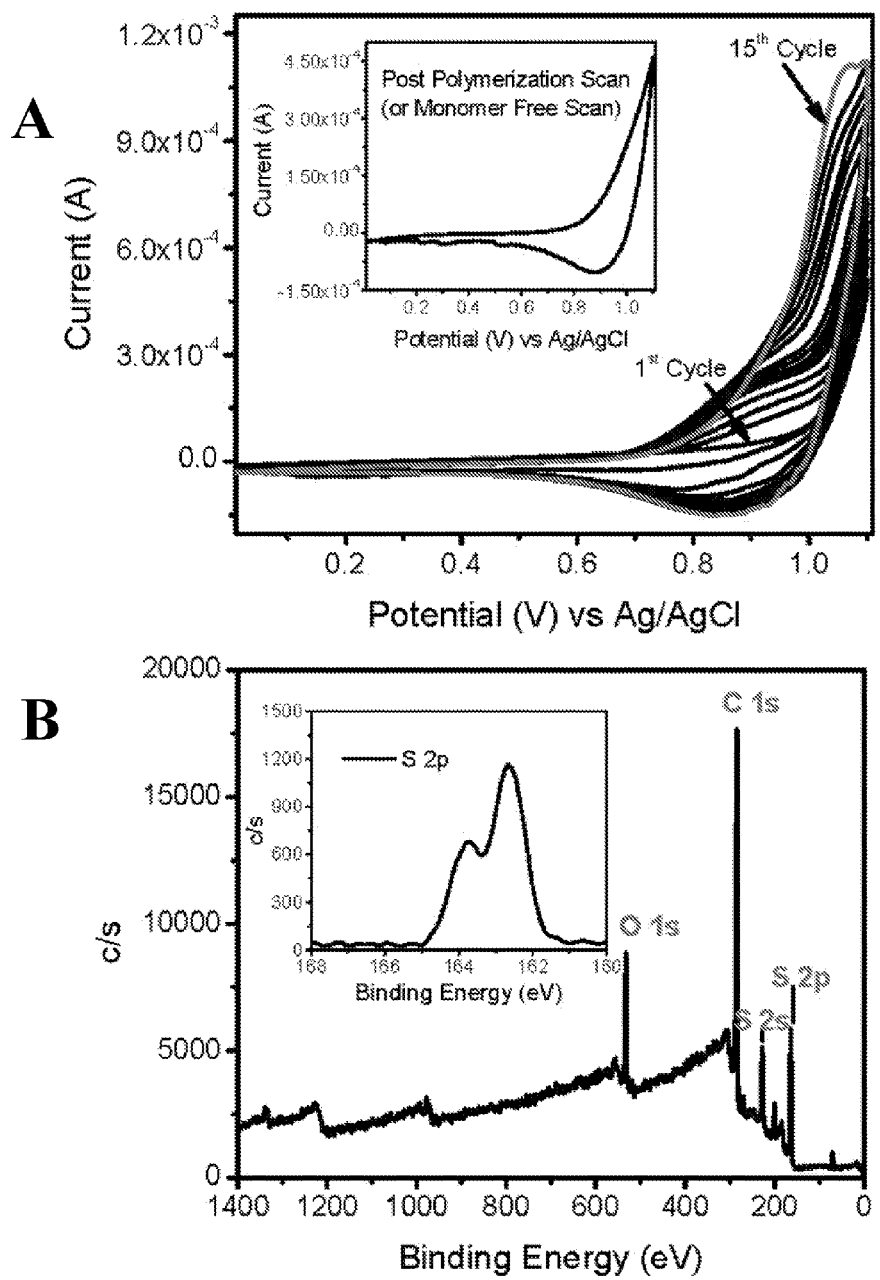
FIG. 35A-B

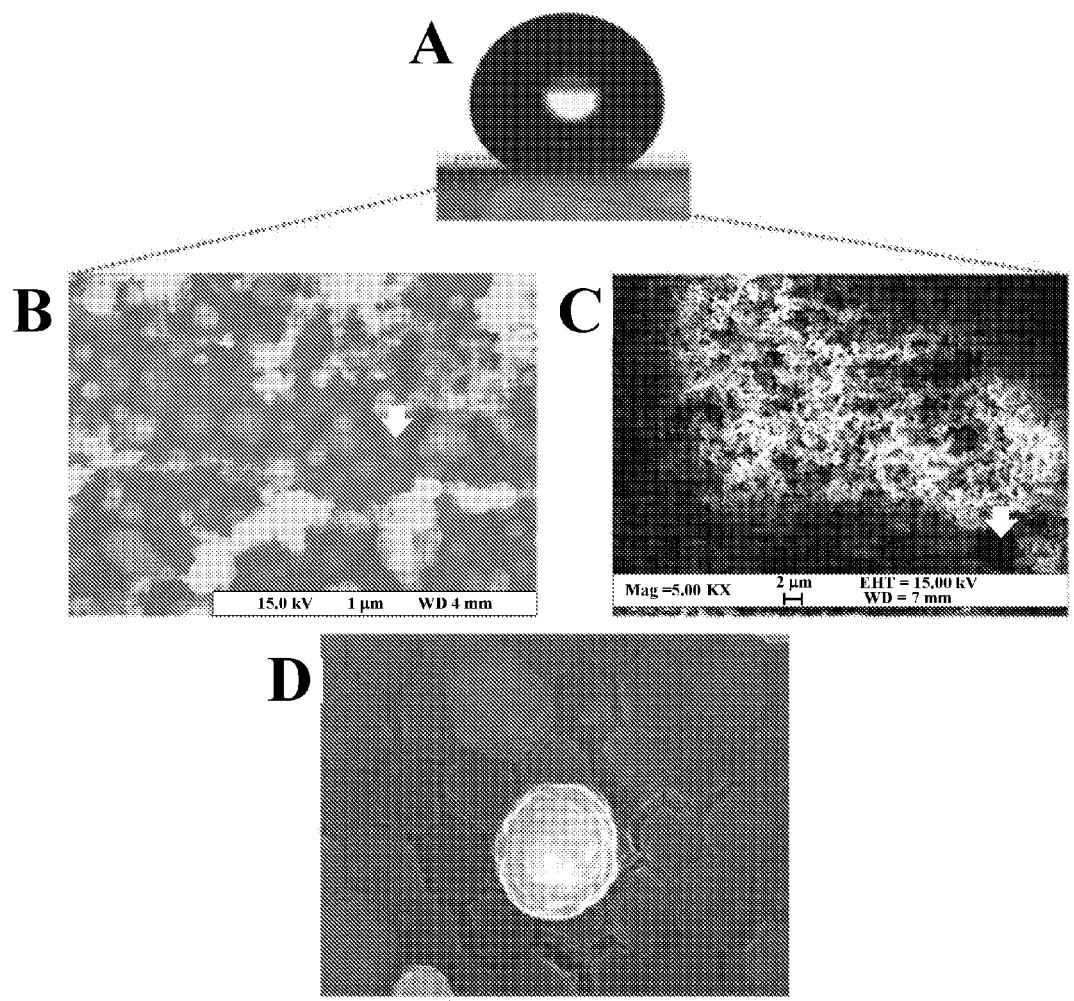
FIG. 36A-D

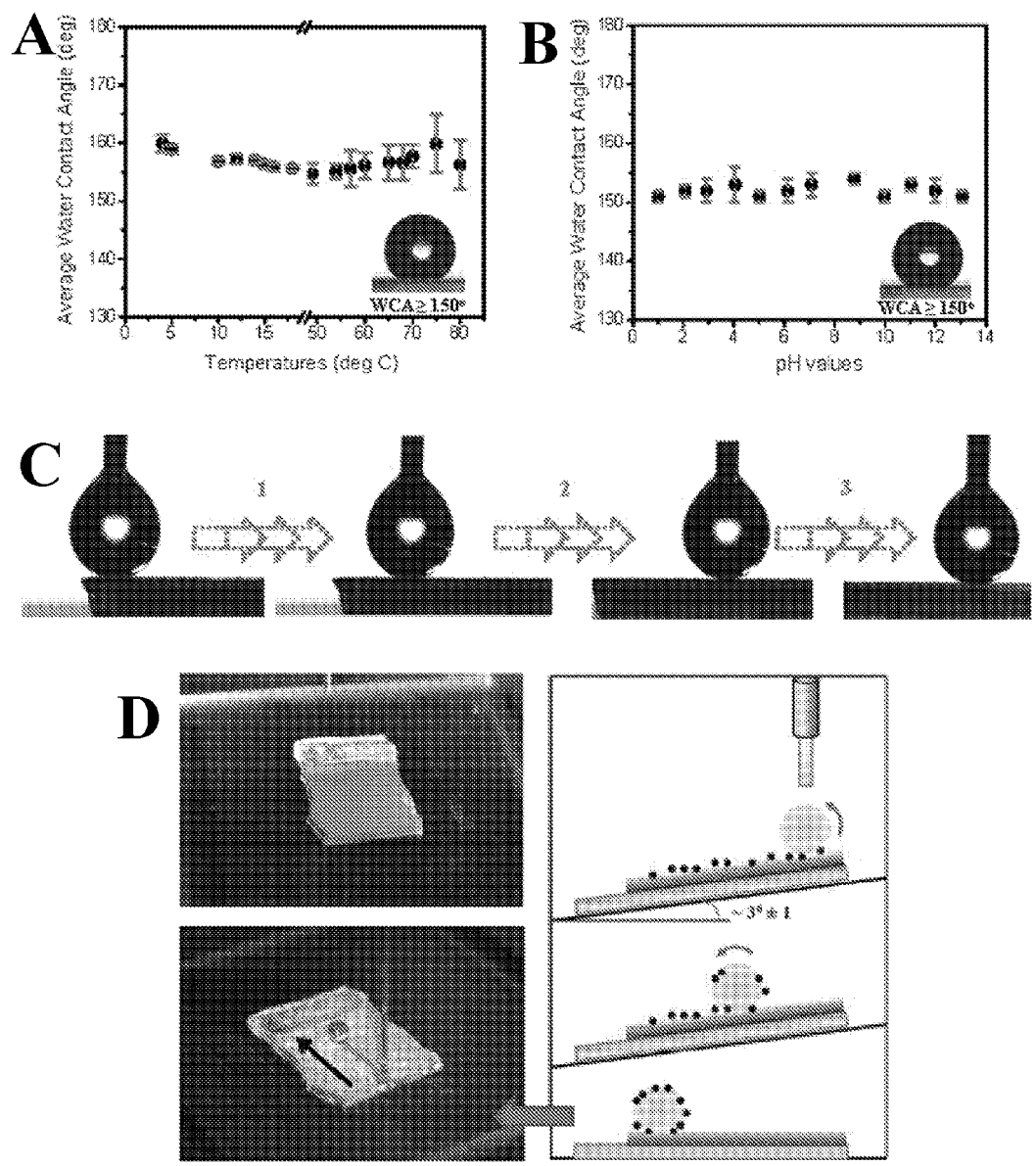
FIG. 37A-D

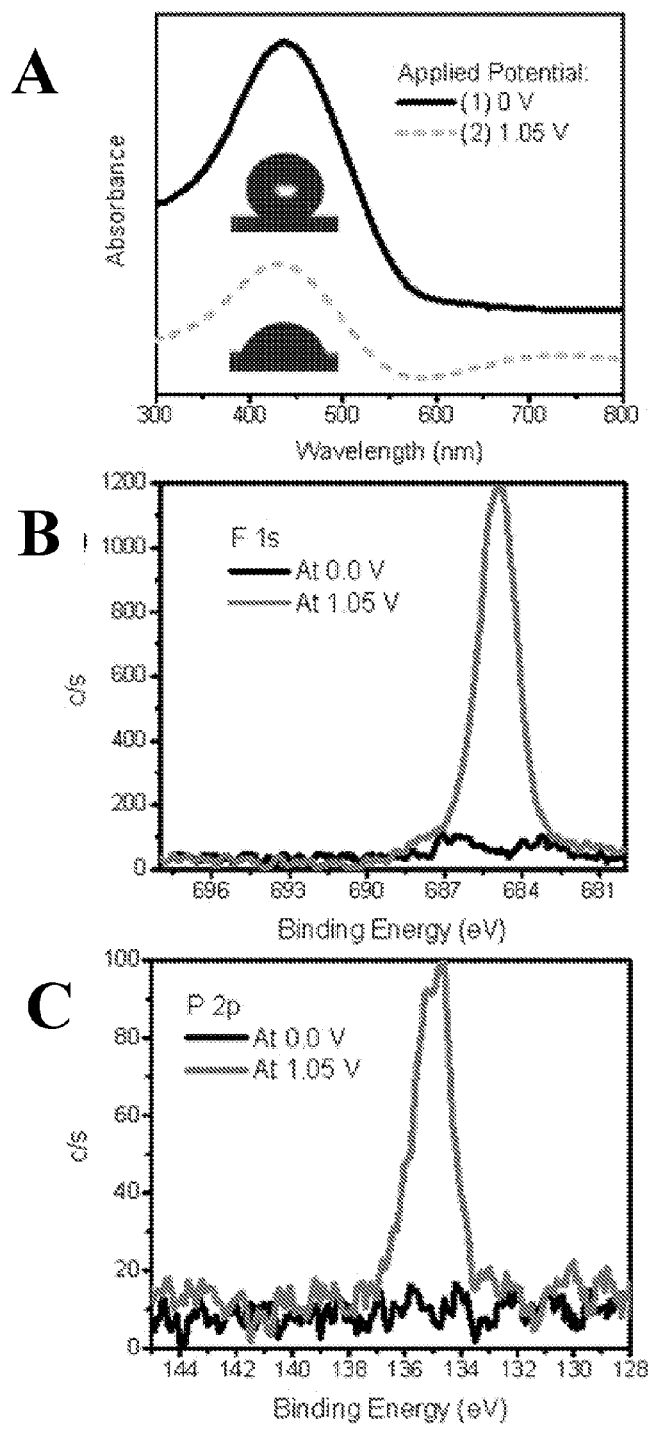
FIG. 38A-C

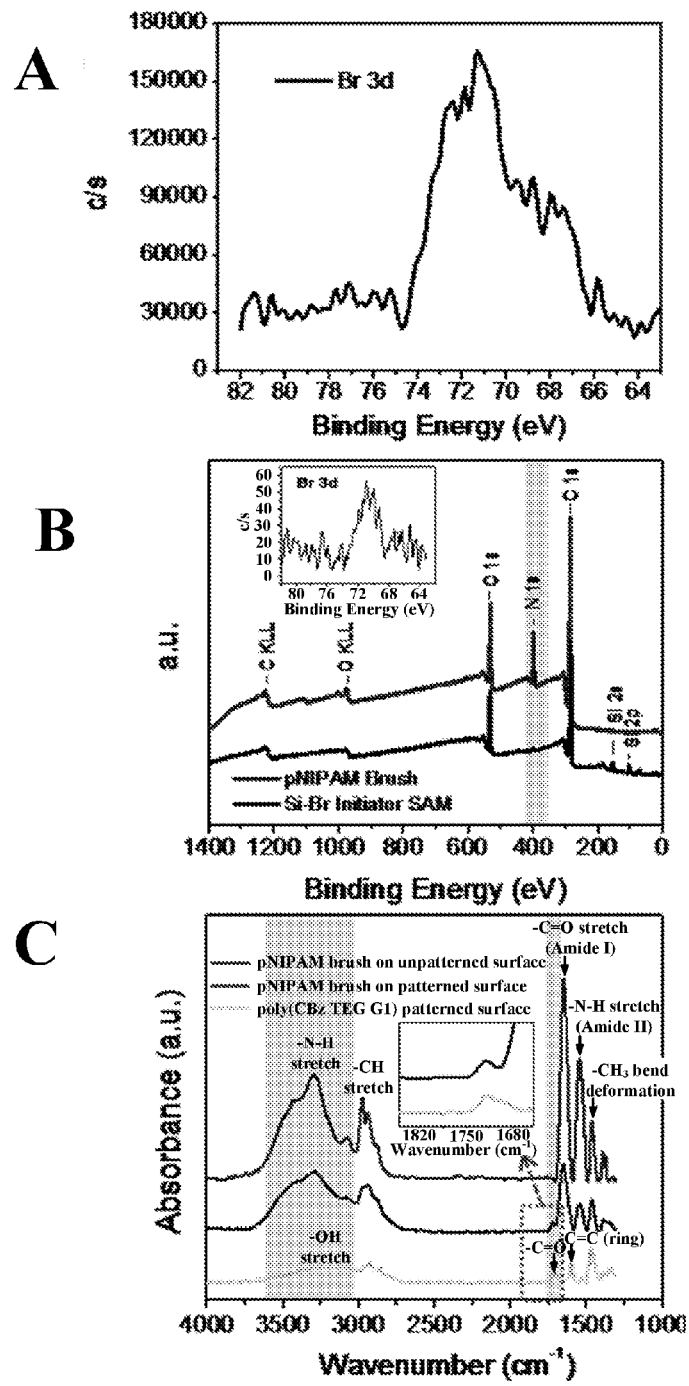
FIG. 53A-C

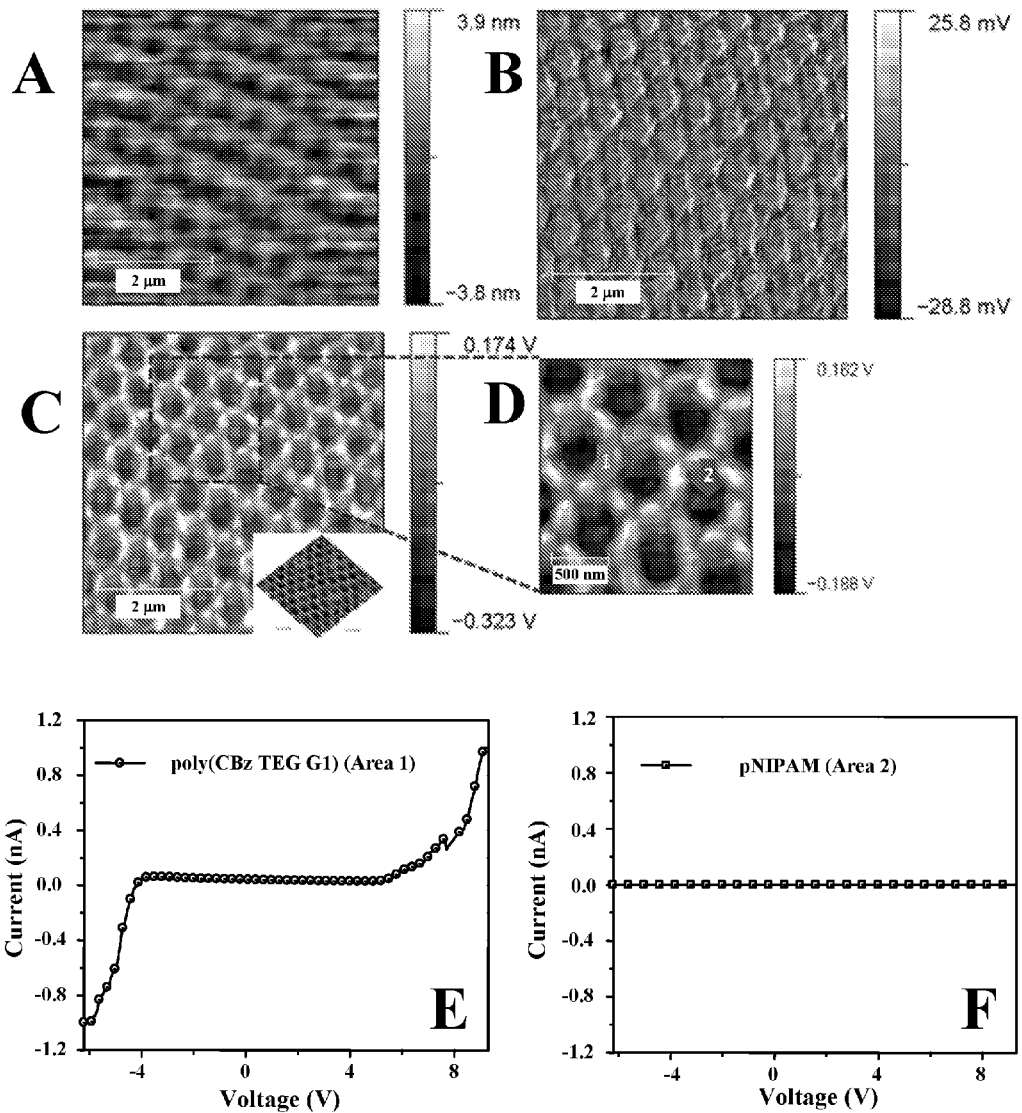
FIG. 54A-F

TYPES OF ELECTRODEPOSITED POLYMER COATINGS WITH REVERSIBLE WETTABILITY AND ELECTRO-OPTICAL PROPERTIES

RELATED APPLICATIONS

This application claims the benefit of and priority to U.S. Provisional Patent Application Ser. No. 61/363,696 filed 13 Jul. 2010 (Jul. 13, 2010) (Jul. 13, 2010).

GOVERNMENTAL SPONSORSHIP

Embodiments of the inventions set forth herein were in part funded by NSF CBET-0854979, and DMR-10-06776 and governmental rights may attach to these embodiments or portions thereof.

REFERENCE TO A SEQUENTIAL LISTING

Not Applicable.

BACKGROUND OF THE INVENTION

1. Field of the Invention

Embodiments of the present invention relates to designs, fabrications, characterizations, and uses of new types of electrodeposited polymer coatings that offer both unique reversible wettability and electro-optical properties.

More specifically, embodiments of the invention enable the formation of superhydrophobic and superlipophilic conducting surfaces made from non-fluorinated conducting polymers. Such surfaces are built following a two-step approach, which is capable of being applied to a variety of materials. The precursor reagents or agents include non-fluorinated conducting polymers of pre-grafted hydrophobic chains that are first electrodeposited by anodic electropolymerization or chemical oxidative methods onto layers of polymer particles such as polystyrene particles pre-assembled on an electrode surface such as a gold (Au) surface. The layering of the particles such as latex microspheres provides the submicron size roughness of a biomimetic surface imitating a geometrical microstructure of a surface of a lotus leaf for example. The overall coatings described herein exhibit both tunable electrochromic and wettability properties that are tuned by applying an electric potential across the surface. Electro-optical properties may be controlled based on a level of doping and type of chemical structures utilized. Moreover, the use of surfactants on top of such coatings allows one to further tune the wettability behavior. While this work emphasizes the use of conducting polymers by anodic polymerization, the design may be extended to non-conducting polymers such as acrylate, styrene, vinyl functional groups using cathodic electropolymerization or chemical reductive methods instead of anodic electropolymerization. Also, the coating can be done on a variety of metallic, metal alloy, metal-oxide and non-metallic substrates of various size, shape, and geometry, provided the requirements for deposition of particles and polymers can be accomplished. Important applications of such coatings may be in the form of anti-wetting, filtration, anti-corrosion, de-icing, anti-microbial, electrochromic, and electrophoretic or electro-wetting applications, where the wetting properties of the film play an important role.

2. Description of the Related Art

The water-repellent behavior of a lotus leaf is a wonder of nature that marvels many scientists of diverse backgrounds. A lotus leaf will give a water contact angle greater than 150° with only 2-3% of the water drop to come into contact with its leaf, and is therefore considered a superhydrophobic surface. This property is attributed to the synergistic effect of two important factors such as (1) hierarchical roughness, which are the nanometer scale asperities within the micron scale geometrical structures and (2) low surface energy wax epicuticula on the surface of the leaf. Its high water resistance property is well worth mimicking because of the many industrial and practical applications namely self-cleaning, anti-fouling marine coatings, stain-resistant fabrics, oxidation resistant surfaces, anti-adhesive coatings, nano-battery, microfluidics, anti-biofouling, etc.

With the basic understanding of the natural design of a lotus leaf, an artificial superhydrophobic surface can be accomplished by developing a dual-scale roughness structure and tuning the surface energy of the surface. Recently, electrically conducting polymers with fluorinated functional group has been used extensively to make a surface that would confer water and also oil resistance. Conducting polymers have been also used to develop various types of industrial coatings for anti-corrosion and anti-static purposes. Furthermore, conducting polymers have unique electro-optical properties making them useful for display materials, semi-conductors, electrochromic devices, fluorescent materials, non-linear optical materials, electromagnetic shielding, etc.

Unlike the other methods of creating polymer coatings such as electrospinning, lithography, and layer-by-layer assembly, the electrochemical deposition offers the following advantages like inexpensive, fast and easy to use. It has been used on a variety of electrode surfaces mostly based on metal or semi-conductor and transparent substrates such as Au, Ag, Al, stainless steel, indium tin oxide (ITO), etc. This includes similarly, the vertical deposition method also called the Langmuir-Blodgett (LB) like-technique used for the layering of polystyrene particles on conducting surface, which does not necessarily require a sophisticated technology.

Thus, there is a need in the art for new efficient and cost effective techniques for making a highly-ordered and closely packed arrays of the latex microspheres on flat surfaces having unique electrochromic and wettability properties.

SUMMARY OF THE INVENTION

Embodiments of the present invention provide electrochemical deposition methods for the design, use, and fabrication of unique coatings that exhibits both electrochromic and extreme wettability properties such as superhydrophobicity and superhydrophilicity. Such electro-optical properties may be tunable, tailored and/or altered by applying a potential and by varying the chemical structure and composition of the polymers, which may further be modified by treating the coating with a surfactant. Certain embodiments of this invention provide compositions using conducting polymers prepared by anodic polymerization or chemical oxidative polymerization. While the present invention emphasizes the use of conducting polymers by anodic polymerization, it is possible to extend the proposed design to non-conducting polymers such as, but not limited to acrylate, styrene, or vinyl functional monomer groups via cathodic electropolymerization or chemical reductive polymerization, involving radical or anion mechanisms. That is, electropolymerizability can be in the form of radical cation or radical anion generation. The electrochemical methods may be done using various shapes, sizes, and geometries of the electrode and may include a choice between potentiodynamic and potentiostatic or chronoamperometric and pulsed methods and other variants involving chemical redox methods. Other electrode or solid support substrates include noble metals, steel, stainless steel, metal alloys, Metal oxides, graphite or carbon electrode surfaces, transparent electrodes, plastic surfaces, and other surfaces capable of colloidal templating and deposition or polymerization of monomers of the same or analogous procedure. Yet other embodiments provide the use of colloidal templated features onto the substrate where colloidal templating can be done using polymeric, non-polymeric, inorganic, metal oxide, and other synthetic colloidal particles. This can include polystyrene, polymethylmethacrylate, polyamides, phenolic resins, silica, silicon oxide, titanium oxide, and other synthetic colloidal particles.

Embodiments of the present invention provide anodic electropolymerizable monomers of the general formula (I):

A-RZ    (I)

where A is an anodic electropolymerizable group, where A is selected from the group consisting of an $A_p$ or $L(A_p)_n$, where L is a linking group and the R group of is bonded to L and n is an integer having a value between 1 and 4, R is alkenyl group having between 1 and about 20 carbon atoms, where one or more of the carbon atoms may be replaced by oxygen atoms, amino groups, amide groups, ester groups, or mixtures thereof, and Z is an end group selected from the group consisting of OH, COOH, COOR$^1$, NR$^2$R$^3$, CONR$^4$R$^5$, A$^1$OH, A$^1$COOH, A$^1$COOR$^1$, A$^1$NR$^2$R$^3$, A$^1$CONR$^4$R$^5$, and mixtures thereof, where R$^{1-5}$ are carbyl group having between 1 and about 10 carbon atoms. In certain embodiments, the compounds of formula (I) are simply $A_p$-RZ. In other embodiments, the compounds of formula (I) are simply $(A_p)_n$L-RZ.

Embodiments of the present invention provide cathodic electropolymerizable monomers including ethylenically unsaturated monomers, diene monomers or mixtures or combinations thereof, where the monomers are polymerized through radical or radical anion generation with cathodic polymerization or chemical reductive polymerization, a complement to anodic electropolymerization.

BRIEF DESCRIPTION OF THE DRAWINGS

The invention can be better understood with reference to the following detailed description together with the appended illustrative drawings in which like elements are numbered the same.

Drawing of Section I

Drawing of Section II

FIGS. 15A-H depict (A) Two-step process towards the formation of superhydrophobic-and-superoleophilic conducting polymer nanostructured surface. AFM topography 2D images (3D on inset) of LB-like surface layering of PS nanoparticles: (B) 200 nm size, (C) 350 nm, and (d) 500 nm. IR imaging showing (E) 2D and (F) 3D images with IR spectra focused on (G) C—H stretch (area in dark gray or green) and (H) C=O stretch (area in light gray or cyan) regions. Note: Scanning area is 176×176 μm².

FIGS. 16A&B depict CV diagrams (monomer free scan on inset) of the eletropolymerization of G0-3TCOOR monomer (5 mM concentration) onto (A) PS coated Au and (B) bare Au. Note: The mechanism of thiophene electropolymerization is found elsewhere.[4]

Figure 17:
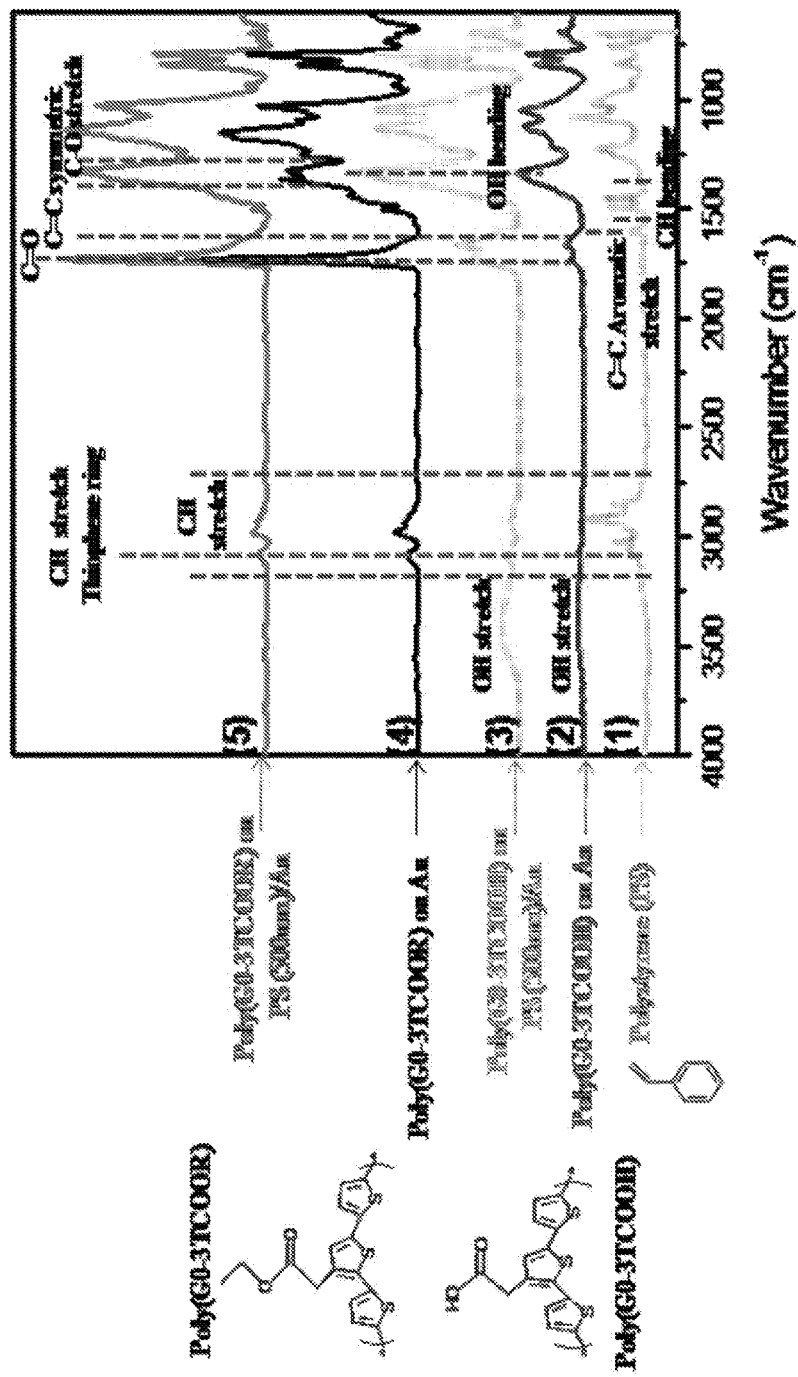

FIG. 17 ATR IR spectrum of (red) poly(G0-3TCOOR) on 500 nm size PS Au, (black) poly(G0-3TCOOR) on bare Au, (green) poly(G0-3TCOOH) on 500 nm size PS Au, (blue) poly(G0-3TCOOH) on bare Au, and (gray) 500 nm size PS coated Au (control film). Note: Peaks were assigned based on published literatures.[5,6,7]

FIGS. 18A-G depict contact angle measurements of poly (G0-3TCOOR) onto 500 nm PS/Au in (A) water, (B) diiodomethane, and (C) hexadecane. (D) Low 24×36 mm and (E) high magnification SEM images of poly(G0-3TCOOR) onto 500 nm PS/Au at 4×3 mm. Also a distinction between the: (F) Doped (1.05 V, 30 mins), and (G) dedoped (0 V, 30 mins) morphologies at wide area of 800×900 mm.

FIG. 19 depicts morphology of the films at doped (left column) and dedoped (right column) states with increasing magnification (120 X to 20 KX).

FIGS. 20A&B depict (A) Static water contact angle measurements of the superhydrophobic nanostructured film (poly (G0-3TCOOR) onto 500 nm PS layer on Au) inclined at a very low sliding angle of 2°±1. (B) Lateral movement at the surface of the superhydrophobic nanostructured film by the water droplet hanging at the tip of the needle. Note: (1) click on the first image to see the real time movie of the rolling of water droplet from the film. (2) The orange colored circle on the substrate is the only area with the superhydrophobic coatings.

FIGS. 21A-I depict static contact angle measurements in water of (A) PS (500 nm size)-coated Au/BK 7, (B) poly(G0-3TCOOR) on Au/BK 7, (C) poly(G0-3TCOOR) on PS (100 nm size)-coated Au/BK 7, (D) poly(G0-3TCOOR) on PS (500 nm size)-coated Au/BK 7, (E) poly(G0-3TCOOH) on Au/BK 7, (F) poly(G0-3TCOOH) on PS (100 nm size)-coated Au/BK 7, (G) poly(G0-3TCOOH) on PS (500 nm size)-coated Au/BK 7, in diiodomethane of (H) poly(G0-3TCOOR) on PS (500 nm size)-coated Au/BK 7, and in hexadecane of (I) poly(G0-3TCOOR) on PS (500 nm size)-coated Au/BK 7.

Figure 22A:
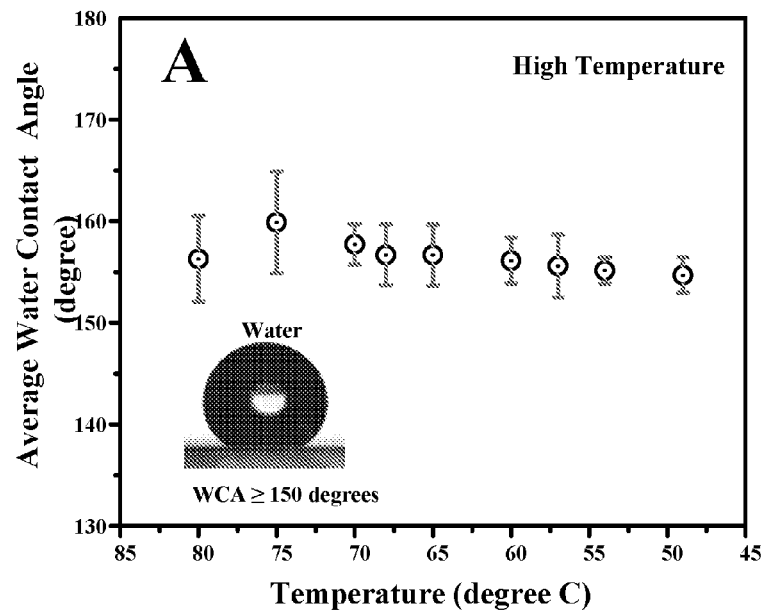

FIGS. 22A&B static water contact angle measurements of the superhydrophobic film (poly(G0-3TCOOR) onto 500 nm PS layer on Au) at (A) very high and (B) very low temperatures of water.

Figure 23:
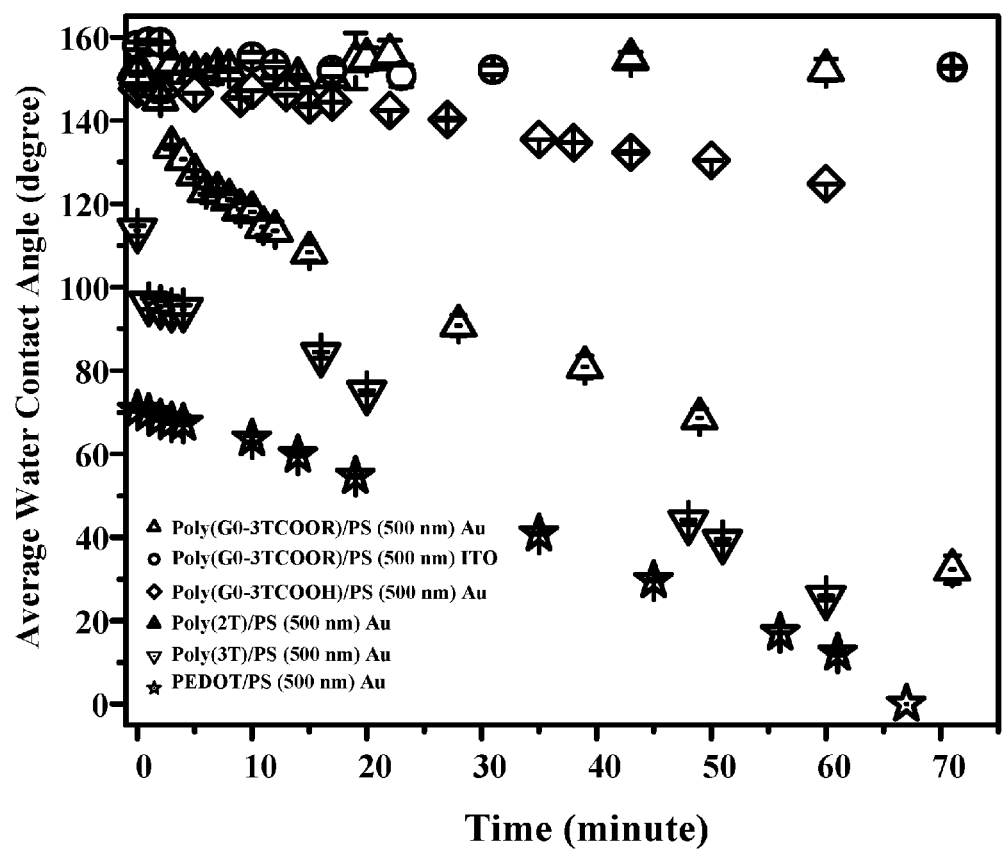

FIG. 23 depict stability studies showing static water contact angle measurements of the superhydrophobic film (poly (G0-3TCOOR) onto 500 nm PS layer on Au) and other films (commercially available monomers electrodeposited atop 500 nm PS layer on Au). Note: Superhydrophobic film was fabricated onto 500 nm PS coated Au and 500 nm PS coated ITO.

FIGS. 24A-C depict static water contact angle of the poly (G0-3TCOOR) onto 500 nm PS layer on Au: (A) water, (B) diiodomethane, and (C) hexadecane.

Figure 25A:
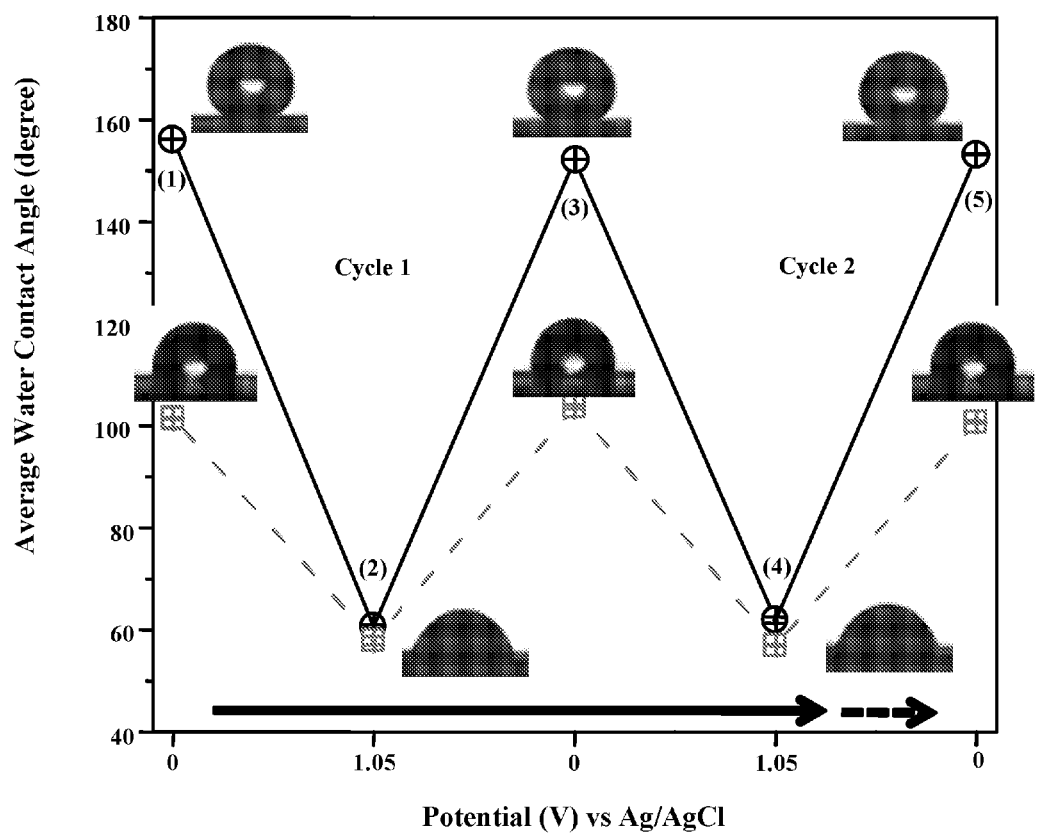

FIGS. 25A-C depict reversible wettability and electro-optical properties: (A) Static water contact angle analysis of poly(G0-3TCOOR) on PS-templated Au (solid line) and poly (G0-3T COOR) on bare Au (broken line) via potential switching between 1.05V (doping) and OV (dedoping) and (B) UV-Vis measurements of the doped (light gray orange colored film) and dedoped (dark gray or dark green colored film) poly(G0-3TCOOR) electrodeposited on ITO. (C) XPS survey scans of the doped (broken line curve) and dedoped (solid line curve) film. Note: The doping and dedoping of the films were carried out in ACN with the supporting electrolyte (0.1 M TBAH) using the same electrochemistry set-up (FIG. 15A) having three electrode system with the electrodeposited film on Au as the working electrode.

FIGS. 26A-F depict XPS high resolution scans of the poly (G0-3TCOOR) onto 500 nm PS layer on Au at dedoped (superhydrophobic film, black curve) and doped (converted to hydrophilic film, red curve): (A) F 1s, (B) P 2p, (C) S 2p, (D) Au 4f, (E) C 1s, and (F) O 1s. Note: Peaks were assigned and compared with published literatures.[8,9,10,11]

FIG. 27A-D depict contact angle measurements of poly (G0-3TCOOR) onto 500 nm PS coated Au in (A) water before and after spin coating of S 760P in (B) water, (C) hexadecane, and (D) diiodomethane.

Figure 28:
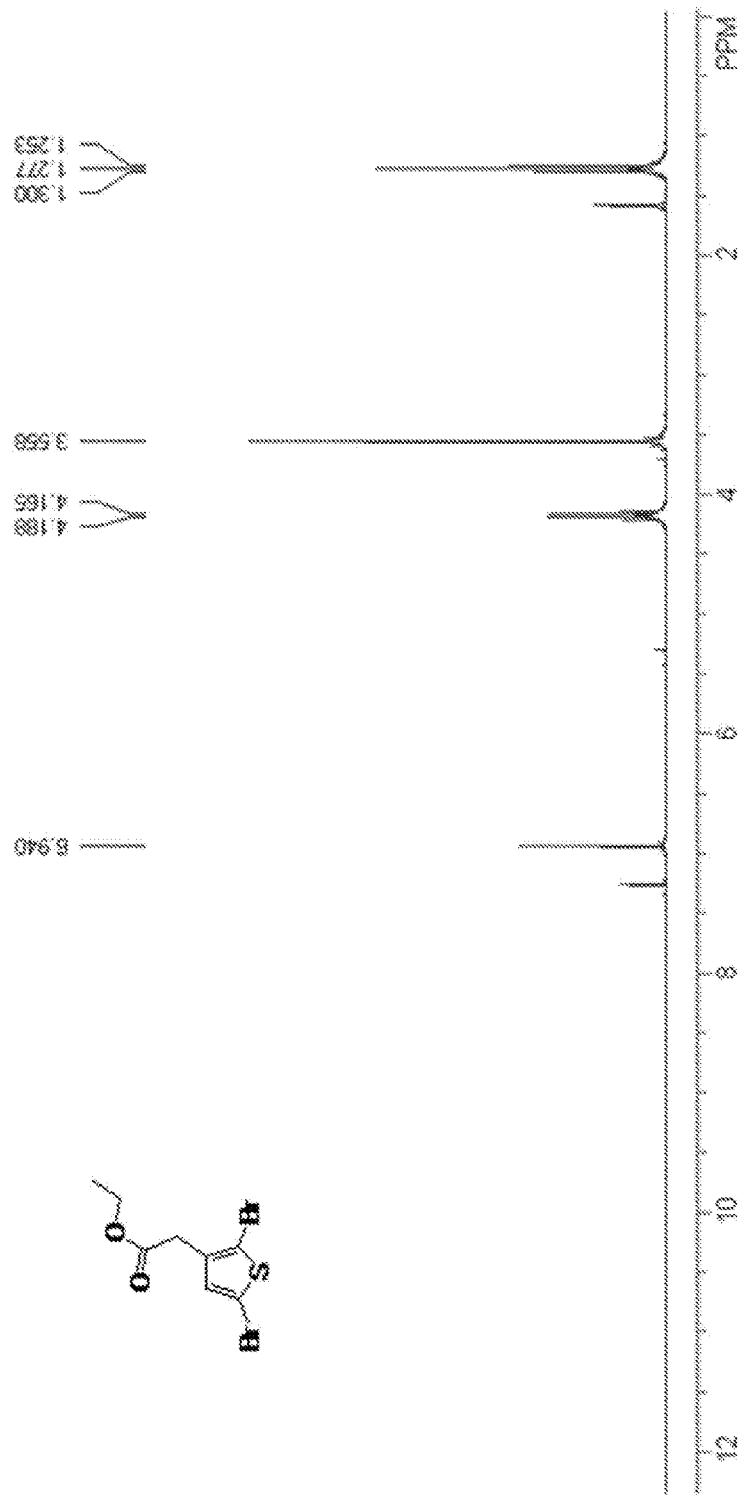

FIG. 28 depict an NMR spectrum of ethyl 2-(2,5-dibromothiophen-3-yl)acetate.

Figure 29:
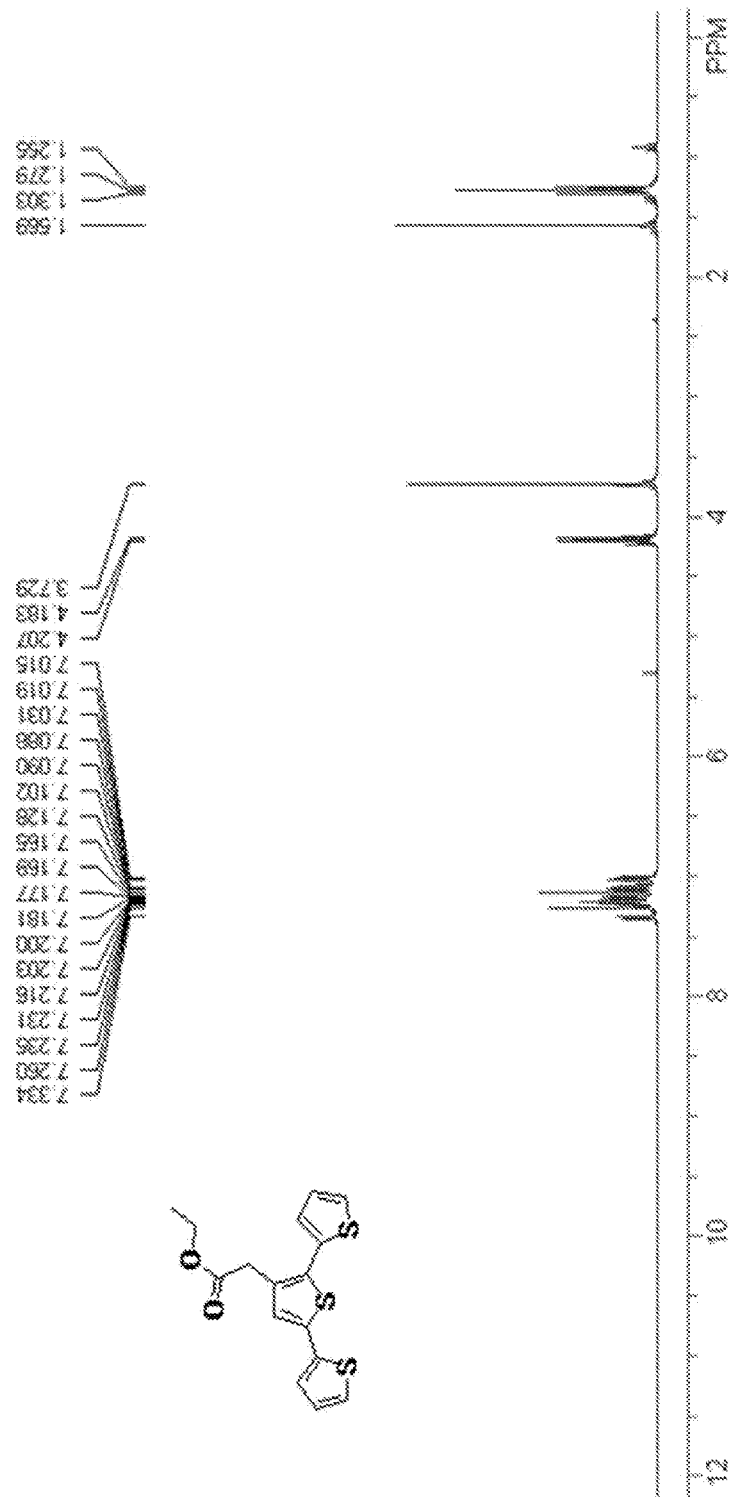

FIG. 29 depict an NMR spectrum of ethyl 2-(2,5-di (thiophen-2-yl)thiophen-3-yl)acetate (G0-3TCOOR).

Figure 30:
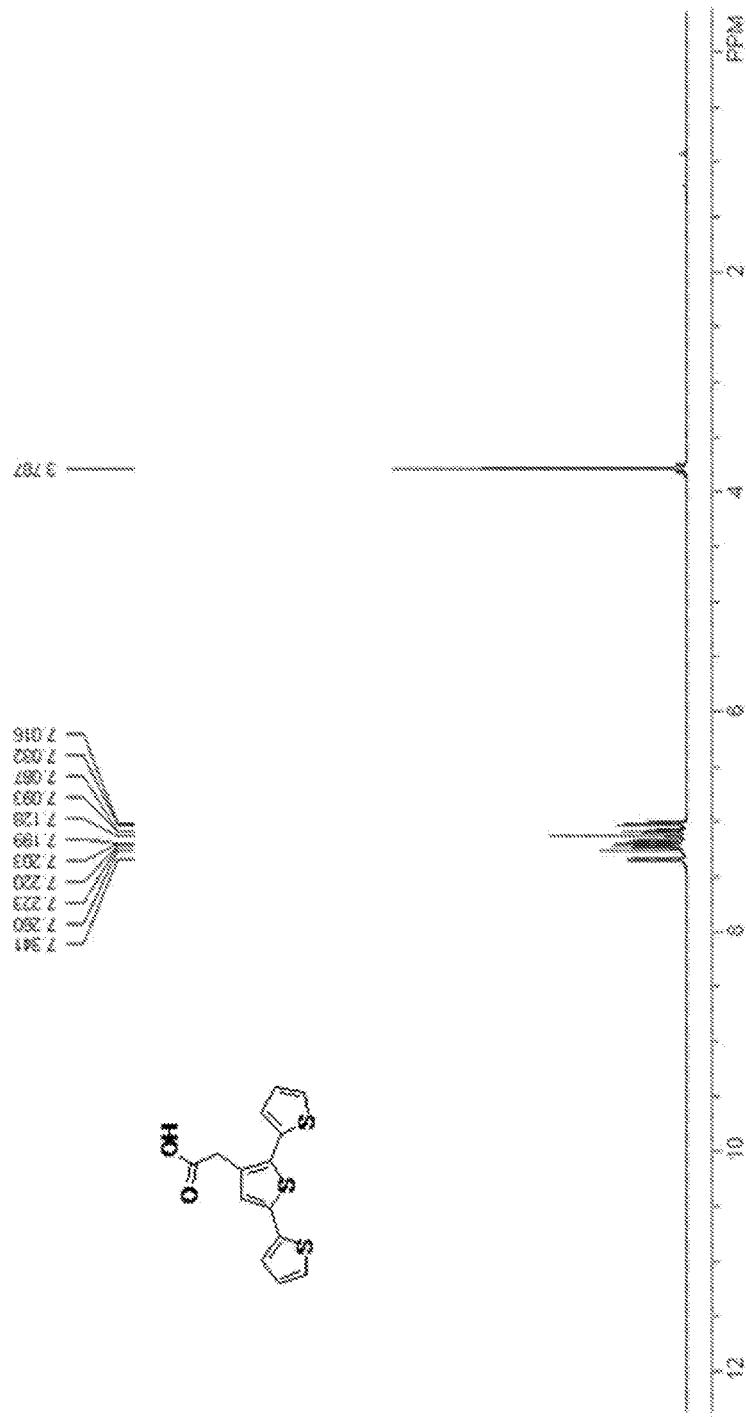

FIG. 30 depict an NMR spectrum of 2-(2,5-di(thiophen-2-yl)thiophen-3-yl)acetic acid (G0-3TCOOH).

Figure 31:
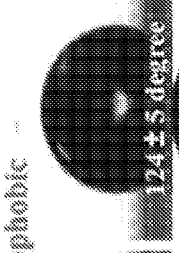

FIG. 31 depict static contact angle measurements of the poly(G0-3TCOOR) onto 500 nm PS layer on Au and other control films before and after spin coating of fluorinated surfactants (S 760 P).

Drawing of Section III

Figures 32A, 32B:
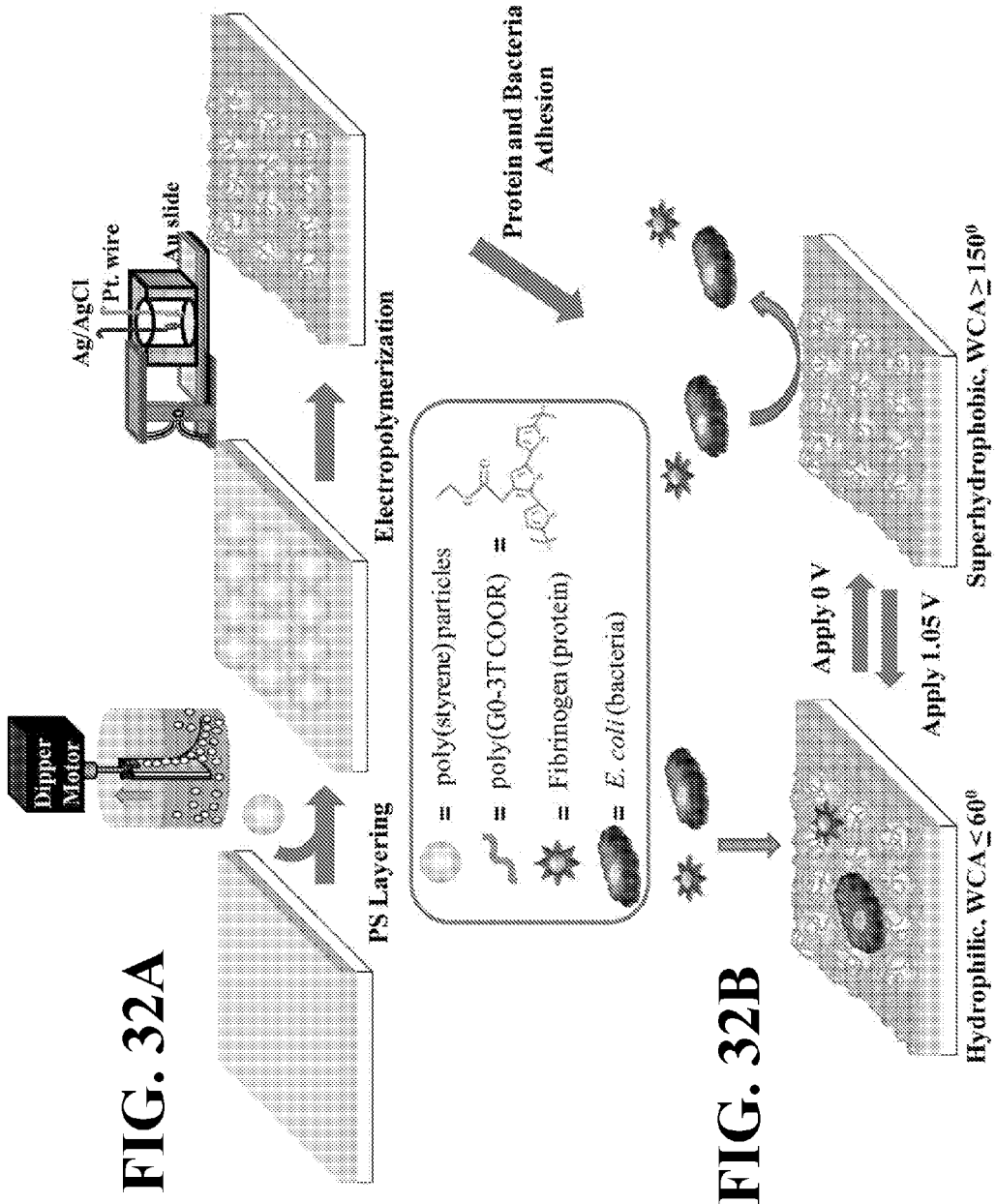

FIGS. 32A&B depict (A) fabrication scheme of the superhydrophobic polymeric surface by PS layering and CV (cyclic voltammetry)-electropolymerization. (B) Protein (fibrinogen) and bacterial (*E. coli*) adhesion onto the undoped (orange-colored film) and doped (green-colored film) colloidally-templated polythiophene (poly(G0-3TCOOR)/PS) surfaces.

FIGS. 33A-D depict AFM topography (A) 2D and (B) 3D images of the 500 nm size PS coated-Au substrate with high magnification image on inset of (A). Note: AFM scan area is 6.5 μm×6.5 μm. SEM wide scan of the (C) doped and (D) undoped or dedoped colloidally-templated and electrodeposited polythiophene surface (poly(G0-3TCOOR)/PS Au)). Inset shows the wetting behavior (contact angle) and the respective applied voltage.

FIGS. 34A-D depict AFM topography 2D images (3D on inset) of the different sizes of PS assembled on Au: (A) 200 nm and (B) 350 nm. (C) 500 nm PS assembled on ITO. (D) ATR IR spectrum of PS layer on Au. Notes: IR spectrum shows the signature peaks of PS: CH aromatic stretch (3083, 3061, 3026 $cm^{-1}$), CH aliphatic stretch (2990-2830 $cm^{-1}$), C=C aromatic stretch (1602 $cm^{-1}$), CH bending (1493, 1452 $cm^{-1}$), $CH_2$ rocking (1219 $cm^{-1}$), out of phase ring deformation (697 $cm^{-1}$).

FIGS. 35A&B depict (A) CV electrodeposition of the conducting polymer (poly(G0-3TCOOR)) with inset of the monomer-free post-polymerization scan in 0.1 M TBAH/ACN. (B) XPS wide scan of the electropolymerized film with inset of the S 2p high resolution scan.

FIGS. 36A-D depicts (A) Digital photo image of the static water contact angle of the undoped poly(G0-3TCOOR) on PS coated Au. SEM images of the undoped polymeric surfaces: (B) hierarchical surface ordering, (C) high dense foam-like features, and (D) low area under layer (magnified image of the under layer of (B)). Note: The red arrow indicates the low area on the surface.

FIGS. 37A-D depict static water contact angle measurements of the superhydrophobic polymeric surface at (A) low and high temperatures and at (B) different pH values of water. (C) Digital photo images of the actual movement of the water droplet along the superhydrophobic surface. (D) Digital photo images of the superhydrophobic surface before (top-left, pristine) and after (bottom-left, dusted surface) self-cleaning studies (right) at sliding angle of 3°±1.

FIGS. 38A-C depict (A) UV-Vis spectrum and XPS high resolution peak of (B) fluorine and (C) phosphorus before and after doping of the poly(G0-3TCOOR) film.

Figure 39:
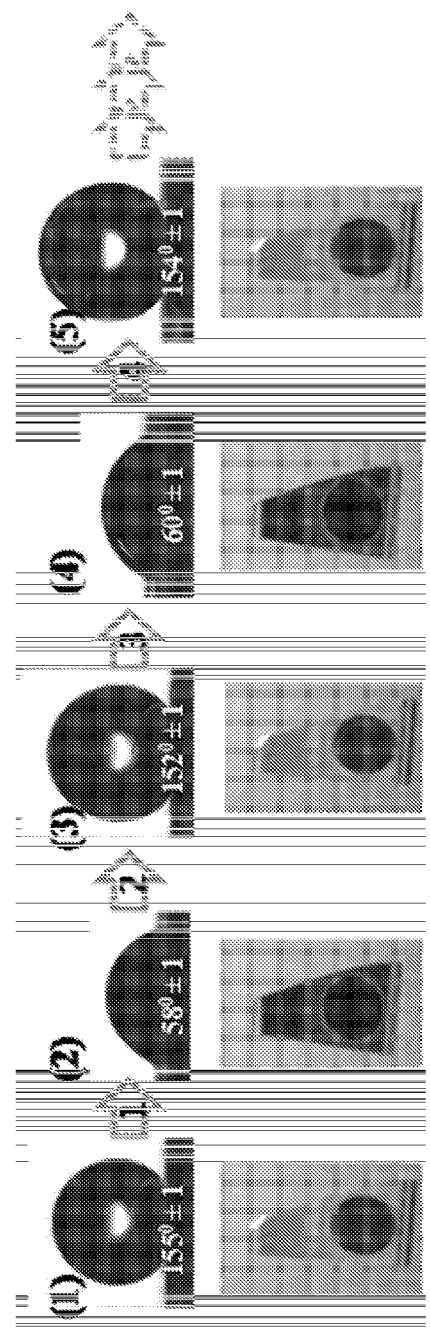

FIG. 39 depicts static water contact angle of the colloidally-templated polythiophene surface upon switching the potential of the conducting polymer between 0 V (1, 3, 5) and 1.05 V (2, 4).

Figure 40:
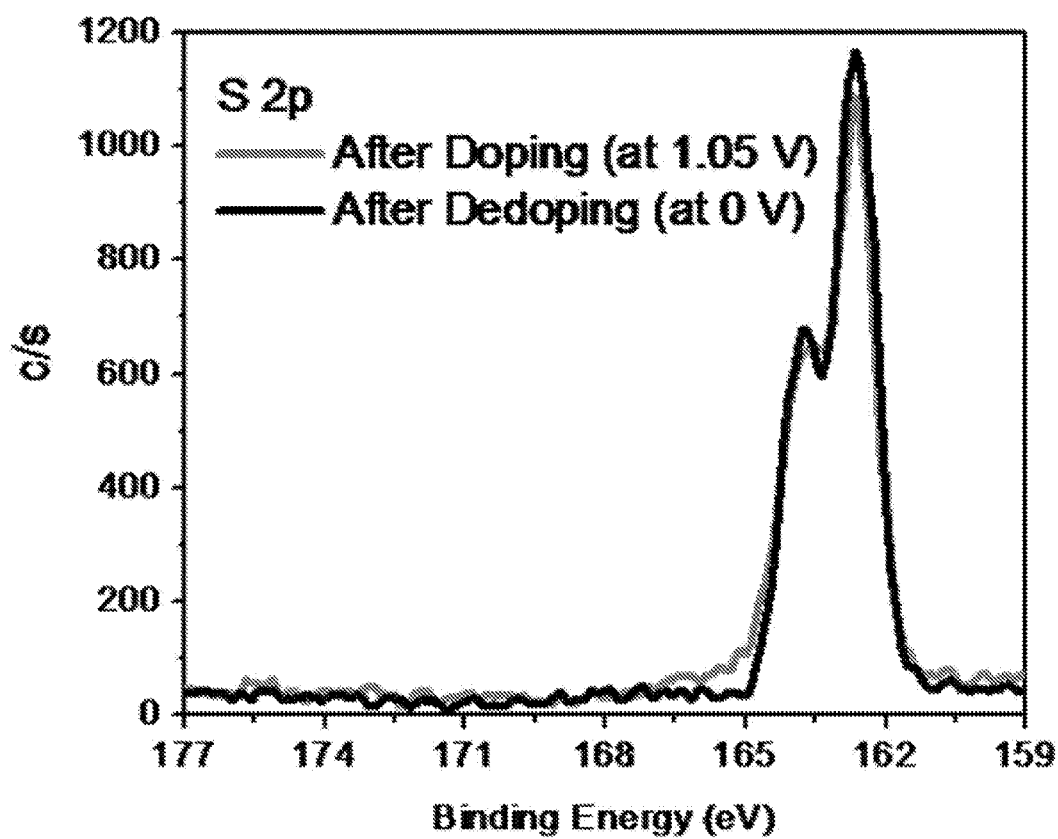

FIG. 40 depicts XPS high resolution scan of sulfur peak after doping and dedoping of the polythiophene.

Figure 41:
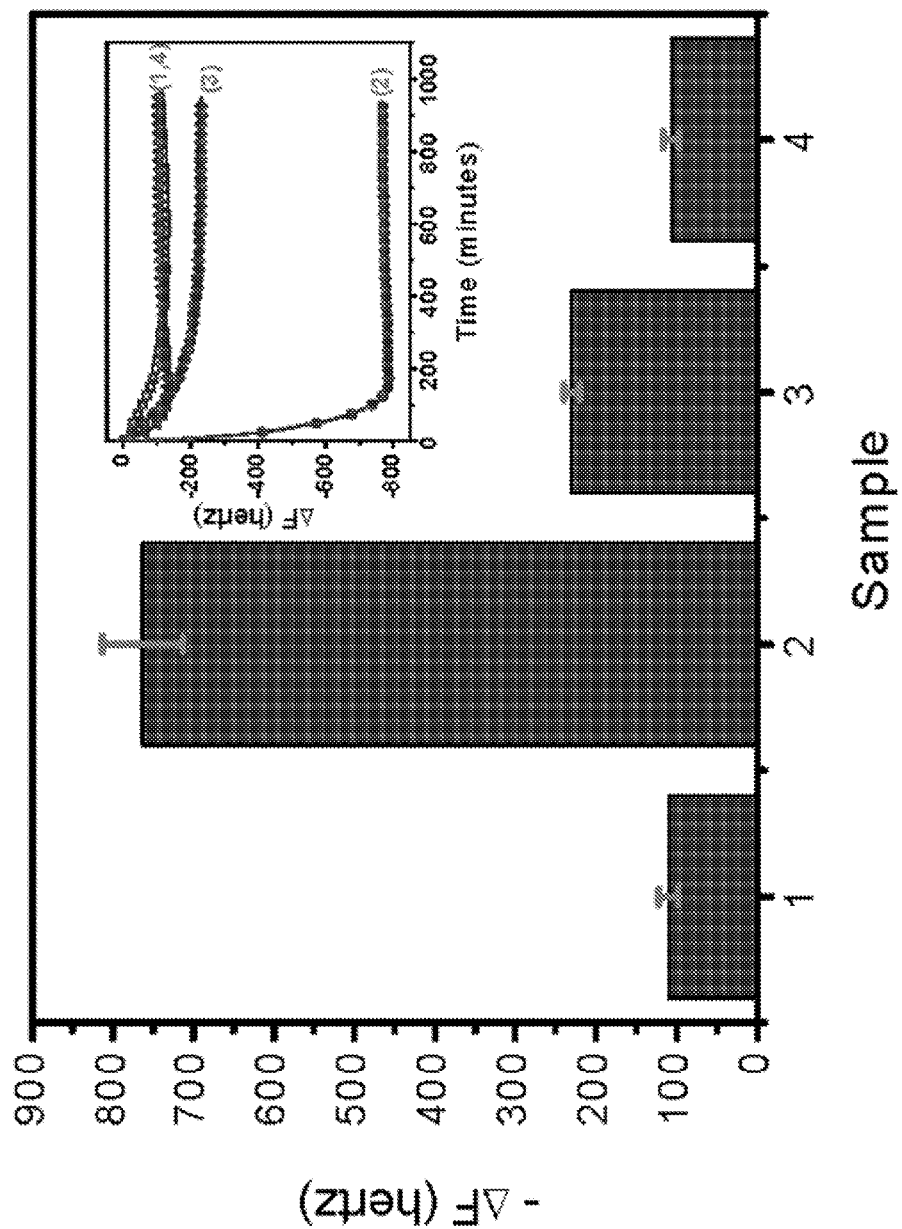

FIG. 41 depicts a bar graph summary with inset of the in-situ binding kinetic curve (average curve, n=3) of the QCM measurements of fibrinogen adsorption (1 mg/mL in PBS buffer, ~950 minutes) on different surfaces: (1) poly(G0-3TCOOR)/PS Au undoped, (2) poly(G0-3TCOOR)/PS Au doped (1.05 V, 30 mins), (3) bare Au, and (4) PBS injection to poly(G0-3TCOOR)/PS Au undoped (control film).

Figure 42:
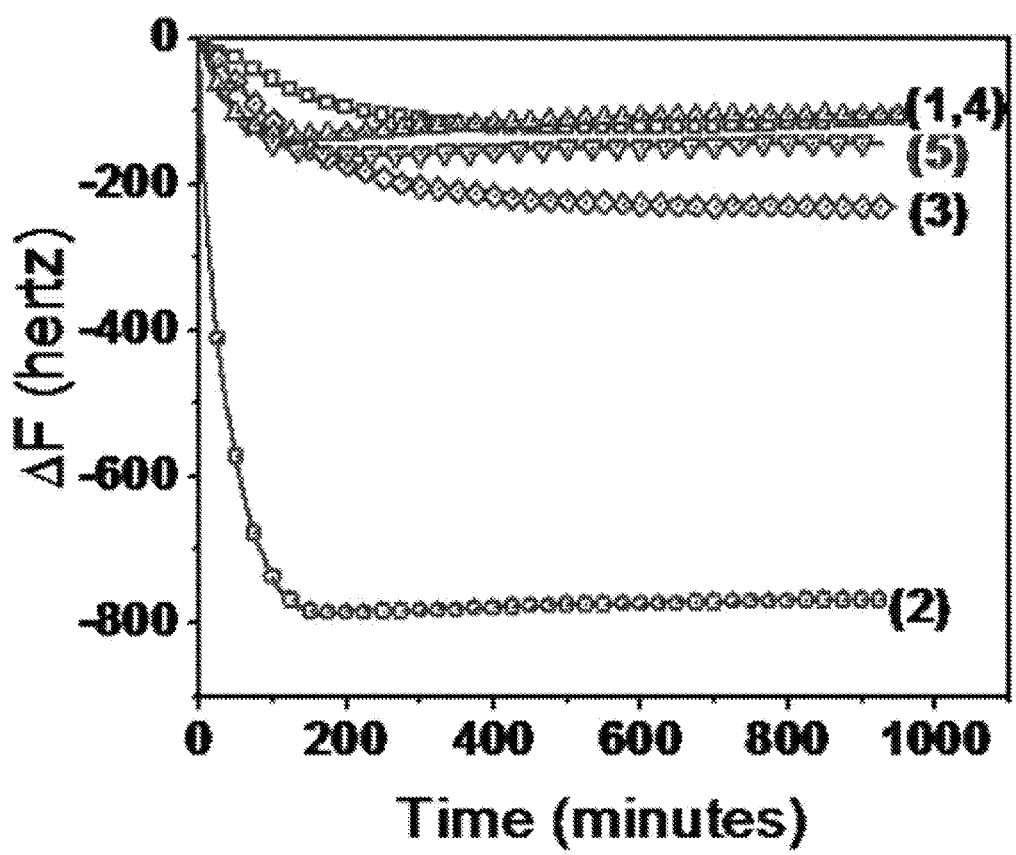

FIG. 42 depicts in-situ binding kinetic curve of the QCM measurements of fibrinogen adsorption (1 mg/mL in PBS buffer, ~950 minutes) on different surfaces: (1) poly(G0-3TCOOR)/PS Au undoped, (2) poly(G0-3TCOOR)/PS Au doped (1.05 V, 30 mins), (3) bare Au, (4) PBS injection to poly(G0-3TCOOR)/PS Au undoped (control film), and (5) poly(G0-3TCOOR)/bare Au.

Figure 43:
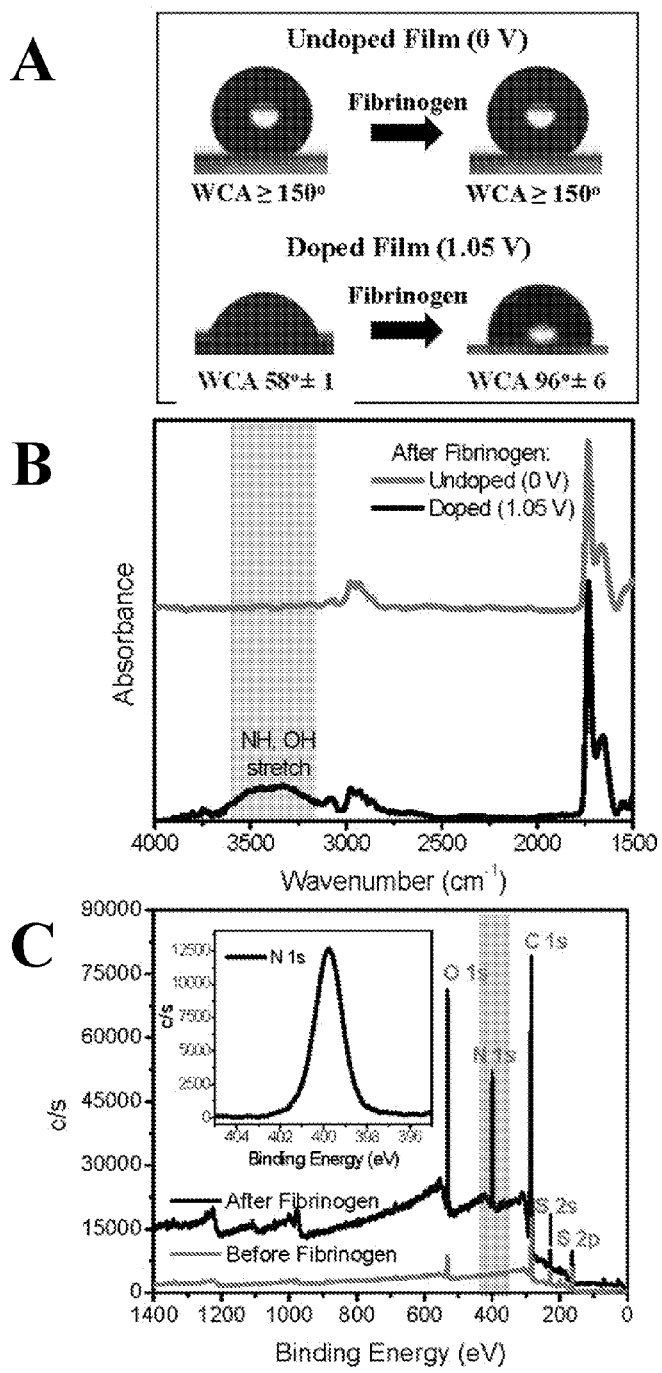

FIGS. 43A-C depict static water contact angle and ATR IR measurements of the undoped (A) and doped (B) poly(G0-3TCOOR)/PS Au surface after fibrinogen adsorption (1 mg/ml in PBS buffer, ~950 minutes). (C) XPS wide scan of the doped (1.05 V) poly(G0-3TCOOR) before and after fibrinogen adsorption with inset of N 1s high resolution scan.

FIGS. 44A-D depict bacterial adhesion during the 2 h incubation in E. coli solution and briefly washed by PBS buffer on the unit area of different surfaces (1 mm$^2$×1 mm$^2$): (A) Undoped poly(G0-3TCOOR)/PS Au, (B) doped (1.05 V) poly(G0-3TCOOR)/PS Au, and (C) bare ITO (control). (D) Bar graph summary of the statistical analysis of the bacterial cell adhesion on the three surfaces. Notes: (1) values are averages with standard deviations of at least 8 pictures conducted on a minimum of two separate experiments. (2) * denotes significant difference in terms of the bacterial adhesion compared to the unmodified control ($p<0.05$, ANOVA on ranks). (3) ** denotes significant difference in terms of the bacterial adhesion compared to the doped ($p<0.05$, ANOVA on ranks)

Figure 45:
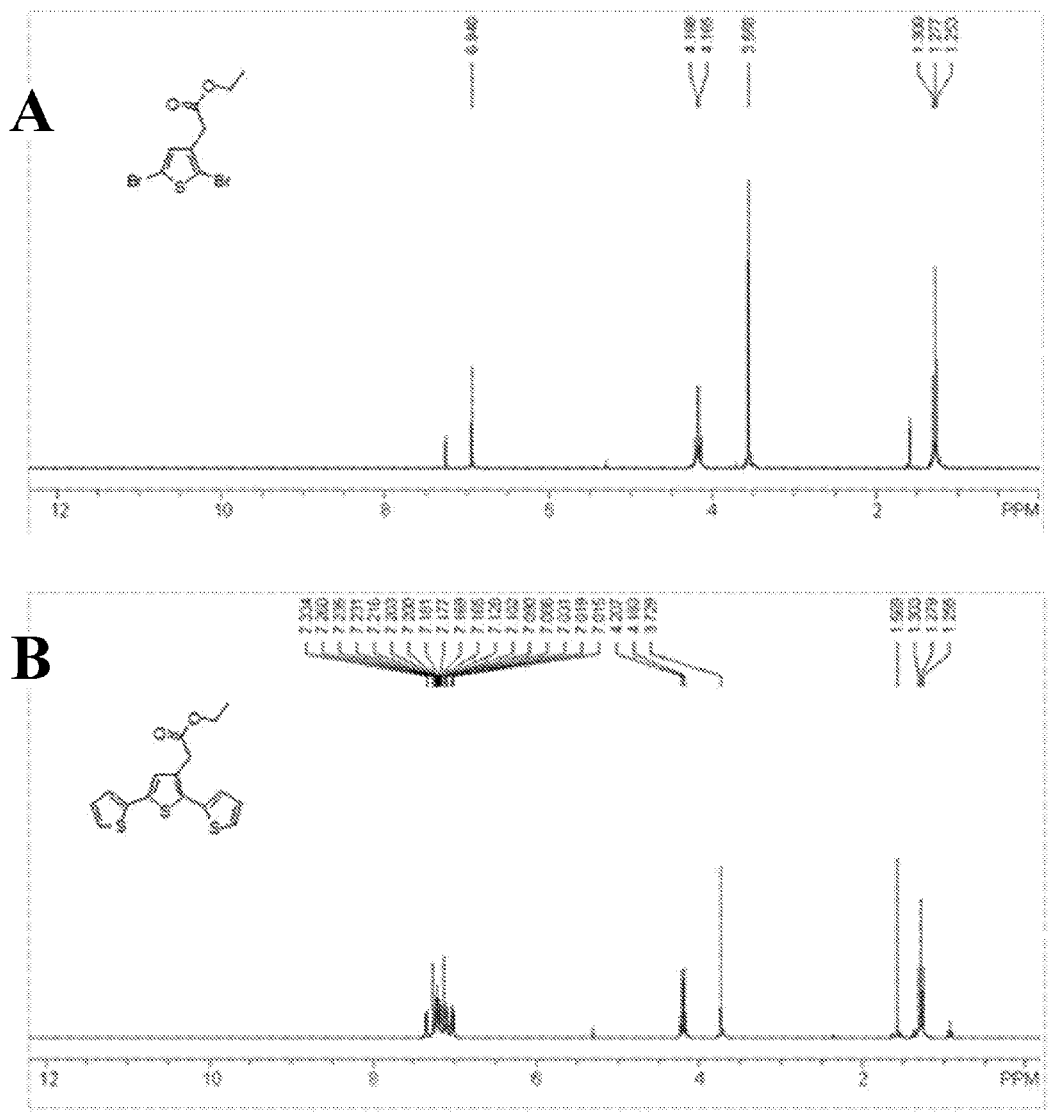

FIGS. 45A&B depicts NMR spectra of (A) ethyl 2-(2,5-dibromothiophen-3-yl)acetate and (B) ethyl 2-(2,5-di(thiophen-2-yl)thiophen-3-yl)acetate (G0-3TCOOR).

Drawing of Section IV

FIGS. 46A-H depict (A) Fabrication scheme of conducting polymer network monolayer array (inverse colloidal crystals) onto ITO substrate. Low (B, D, F) and high (C, E, G,) magnification AFM (in tapping mode) topography 2D images (3D on inset) of (B), (C) colloidal crystals before electropolymerization; (D), (E) colloidal crystals after electropolymerization; (F), (G) inverse colloidal crystals; and (H) SEM 2D image of the inverse colloidal crystals.

FIG. 47A-G depict (A) Fabrication scheme of backfilling the inside cavities with silane SAM (ATRP-initiator) and polymer brush (PNIPAM). Low (B, E) and high (C, F) magnification AFM (in tapping mode) topography 2D images (3D on inset) of backfilled (B, C) Si—Br SAM and (E, F) pNIPAM brush. AFM line profile analysis of (D) Si—Br SAM and (G) pNIPAM brush versus bare ITO surface (before back filling).

Figure 48:
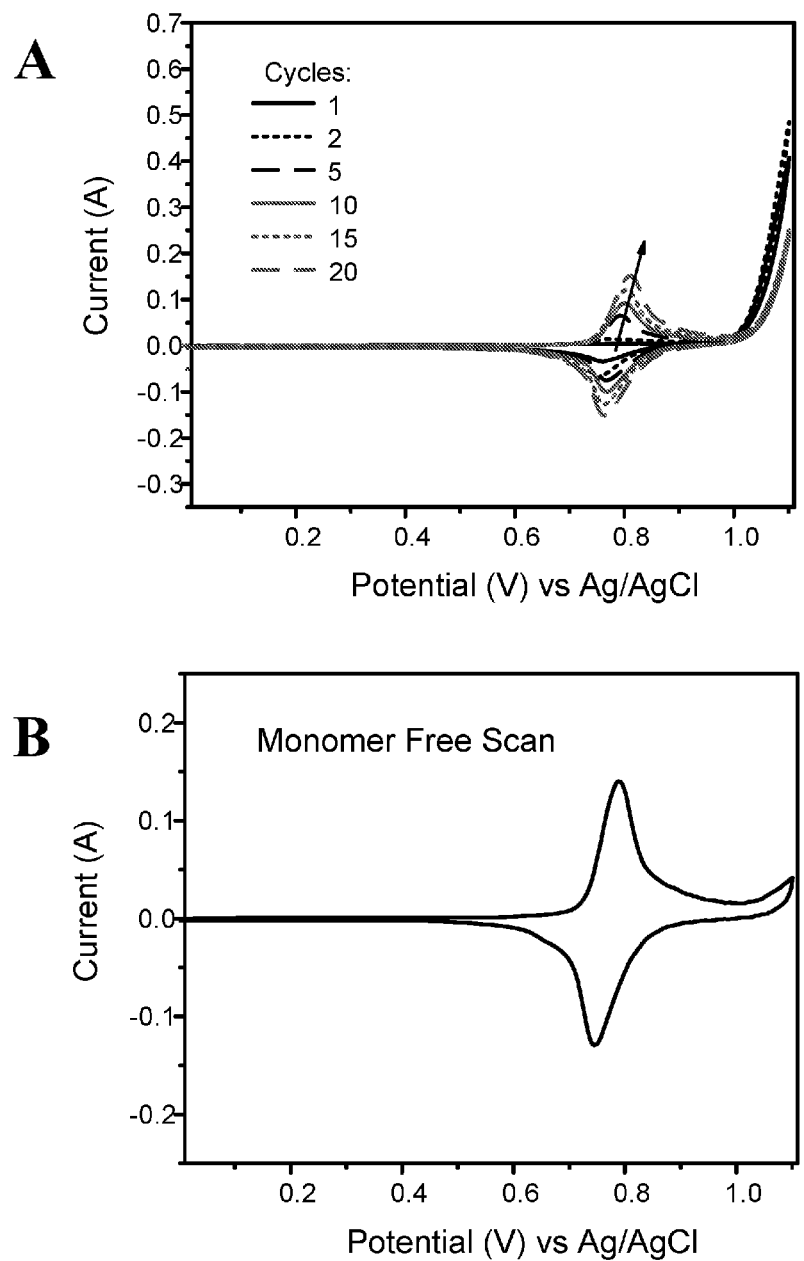

FIGS. 48 depict (A) CV-electropolymerization of monomer (CBzTEGG1, 5 mM conc) onto 500 nm PS layer. (B) Post polymerization scan or monomer free scan of the electropolymerized film (poly(CBzTEGG1) atop the 500 nm PS layer.

Figure 49:
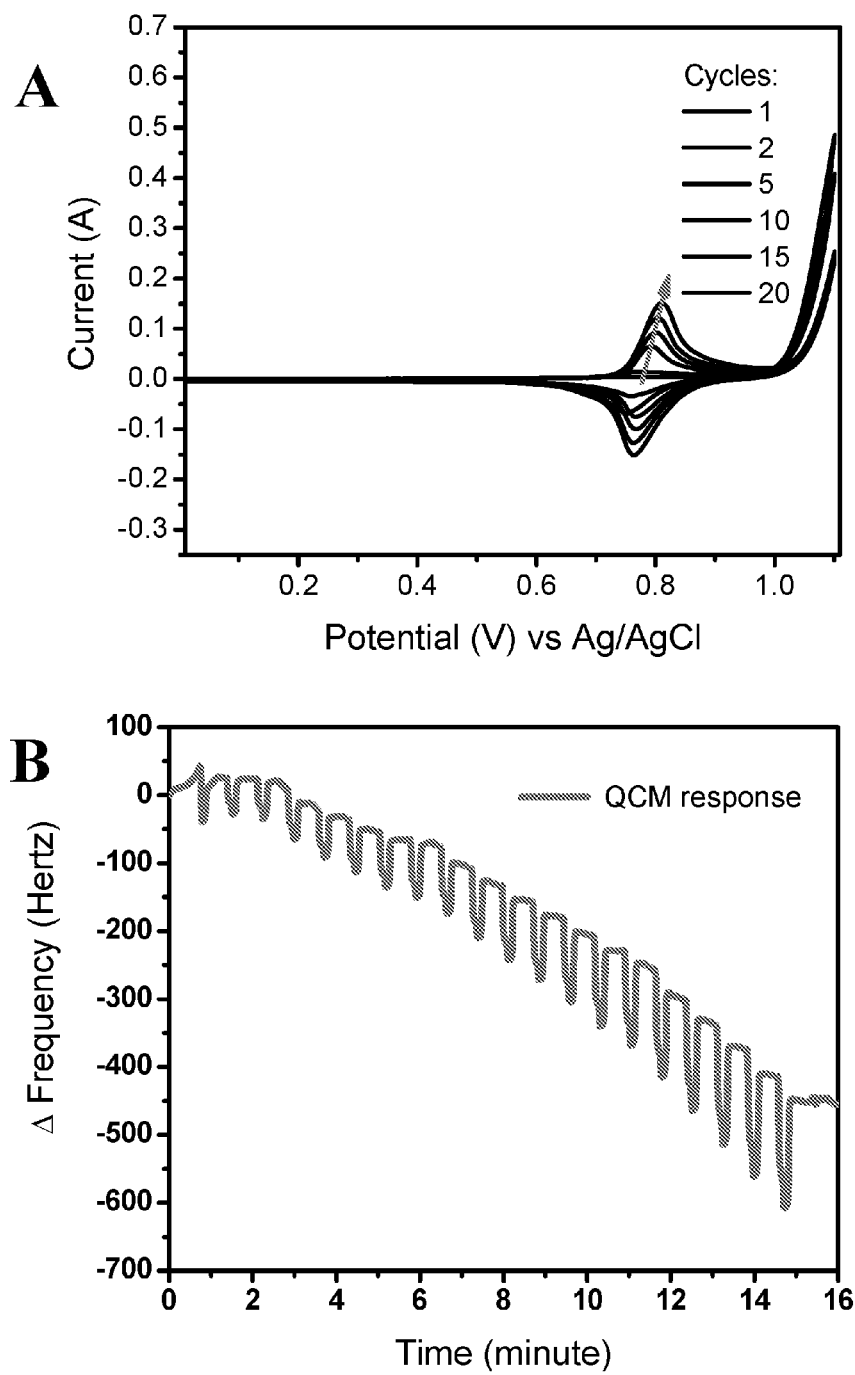

FIG. 49 depict In-situ EQCM monitoring of film deposition (poly(CBzTEGG1) onto 500 nm PS layer/Au QCM crystal. (A) cyclic voltamogram and (B) QCM response.

Figure 50:
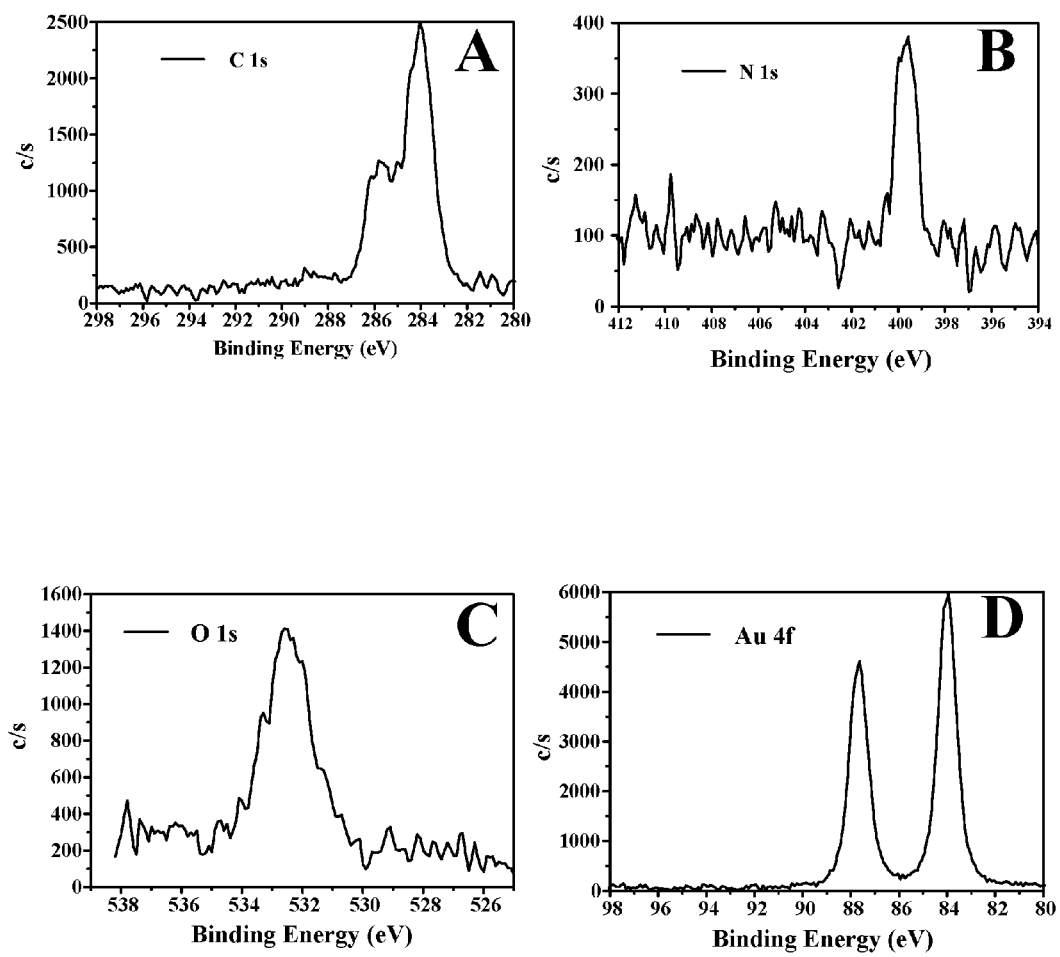

FIG. 50 depict XPS high resolution scans of the PS imprinted electropolymerized film (after the removal of 500 nm size PS: C 1s (A), N 1s (B), O 1s (C), and Au 4f (D).

Figure 51:
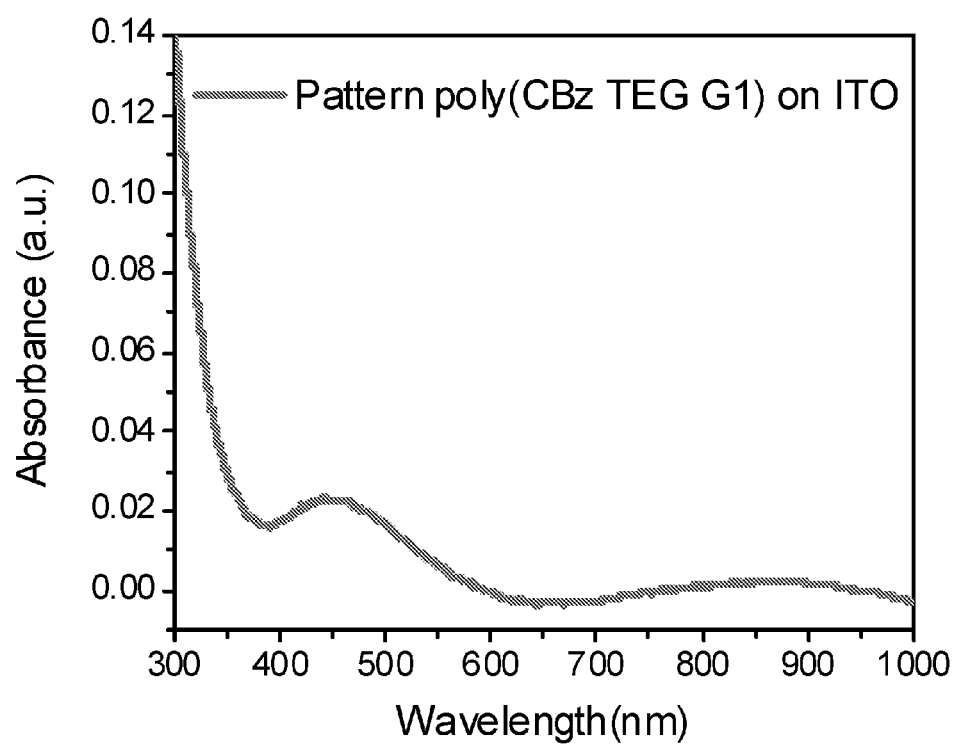

FIG. 51 depicts UV-Vis measurements of inverse opal (poly(CBzTEGG1)) on ITO after the removal of 500 nm layer of PS. Note that the sample is measured directly in UV-Vis as a film.

Figure 52:
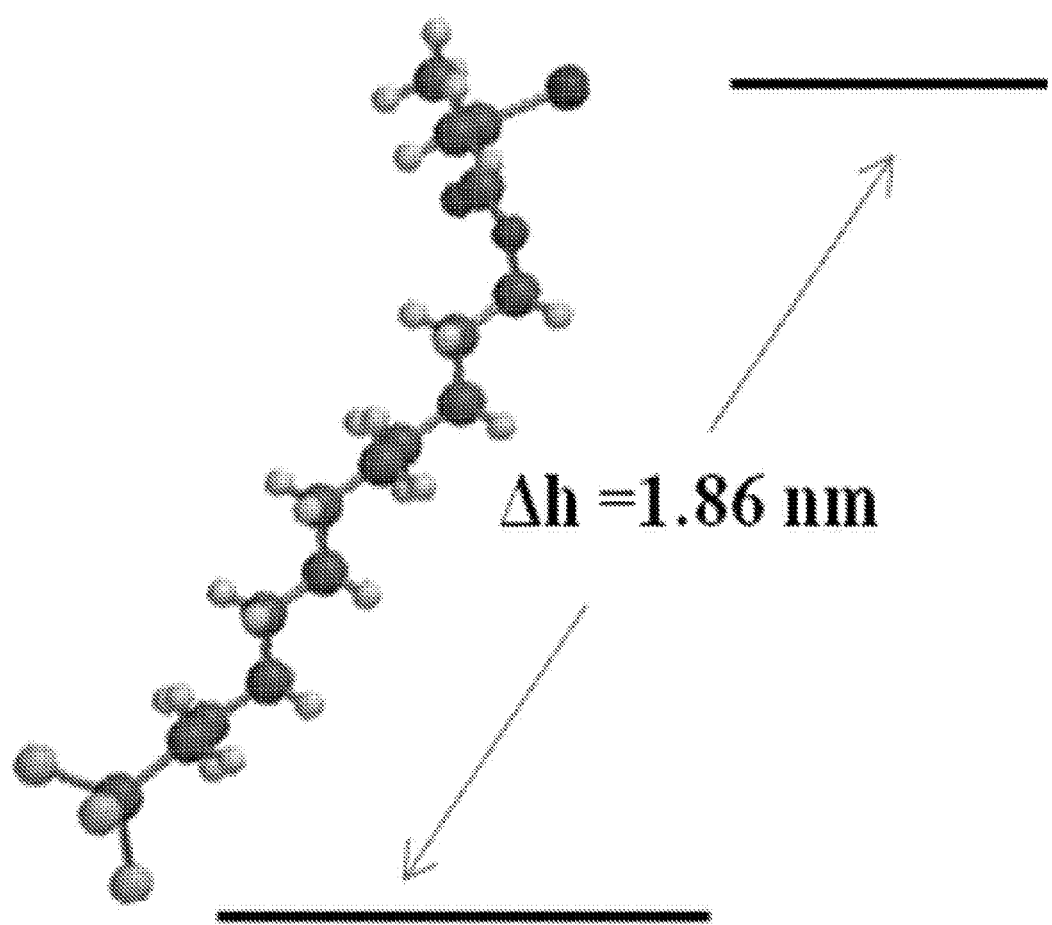

FIG. 52 depicts 2D minimized structure of 11-(2-Bromo-2-methyl)propionyloxy) undecyltrichlorosilane (ATRP initiator) determined from Spartan (Spartan, Wavefunction Inc). The total length and minimization energy of the molecule was calculated using Spartan and are equivalent to 18.6 angstrom and 99.7338 KJ/mole, respectively.

FIGS. 53A-D depict XPS and ATR IR measurements: (A) XPS high resolution Br 3d scan of backfilled silane SAM onto inverse colloidal crystals, (B) XPS survey scan verifying the growth of pNIPAM brush onto the backfilled silane initiator SAM on inverse colloidal crystal (on inset is Br 3d high resolution scan of the pNIPAM brush) and (C) ATR IR spectrum of inverse colloidal crystals (poly(CBzTEGG1), dual pattern surface (pNIPAM brush on inverse colloidal crystals), and pNIPAM brush on unpattern surface (bare ITO).

FIGS. 54A-F depict CS-AFM (in contact mode) (A) topograpghy, (B) friction, (C) low and (D) high current images of the dual pattern surface on Au substrate: pNIPAM brush backfilling the holes of the poly(CBzTEGG1) polymer array. I-V plot of (E) poly(CBzTEGG1) region and (F) pNIPAM brush region. Note: AFM scan area is 5 μm×5 μm.

DETAILED DESCRIPTION OF THE INVENTION

The inventors have found that novel coatings and surfaces incorporating the coatings can be constructed using electropolymerization and deposition of polymers via electrochemical methods or chemical redox polymerization methods to form unique and novel coatings. Another feature of this invention is the use of templating colloidal particles deposited on electrode surfaces that influence the morphology of the electropolymerized outer layer. The coatings of this invention and the surfaces incorporating them have unique structures and tunable, controllable and/or reversible wettability and electro-optical properties.

Suitable Reagents

Suitable anodic electropolymerizable or chemical oxidative polymerizable heterocylic aryl or aromatic group $A_p$ for use in the present invention include, without limitation, single group compounds and multigroup compounds. Exemplary single group compounds including, without limitation, pyrrole, thiophene, carbazole, indole, aniline, fluorene, and their fused heteroaromatic, oligomeric, and copolymeric derivatives such as 2-(thiophen-2-yl)thiophene, 2,5-di(thiophen-2-yl)thiophene, higher thiophene 2,5 oligomers, other anodic electropolymerizable heterocylic aryl or aromatic groups and mixtures thereof. Exemplary multigroup compounds include compounds of the general formula (II):

$$L(R'A_p)_n \qquad (II)$$

where $A_p$ is as set forth above and L is a linking group selected from the group an aromatic group, a dihydroxy aromatic group, a symmetrical dihydroxy substituted aromatic group, or mixtures thereof. Exemplary diether substituted aromatic groups include, without limitation, methyl-3,5-dihydroxybenzoate, where the ester group is the RZ group.

Suitable ethylenically unsaturated monomers for cathodic electropolymerization or chemical reductive polymerization which may involve radical or radical anion generation include, without limitation, ethylene, propylene, butylene, higher alpha olefins, styrene, other aromatic vinyl monomers, vinyl alcohol, vinyl acetate, fluorinated vinyl monomers, acrylates monomers, carbonate monomers, other ethylenically unsaturated monomers.

Suitable diene monomers for cathodic electropolymerization include, without limitation, butadiene, substituted butadiene monomer, isoprene substituted isoprene monomers, or mixtures or combinations thereof.

Suitable crosslinking agents include, without limitation, compounds of the general formula (III)

$$A^2\text{-}R''\text{-}A^3 \quad (III)$$

where A2 and A3 are the same or different and are selected from the heterocyclic compounds set forth above and where R" is an alkenyl group having between 1 and about 20 carbon atoms, where one or more of the carbon atoms may be replaced by oxygen atoms, amino groups, amide groups, ester groups, or mixtures thereof. Suitable crosslinking agents for cathodic electropolymerization include, without limitation, divinyl alkyenyl crosslinking agents, divinyl aromatic crosslinking agents, other divinyl crosslinking agents or mixture or combinations thereof.

Suitable substrates on which the coating of this invention may be deposited include, without limitation, metal substrates, plastics substrates, ceramic substrates, or mixtures and combinations thereof. For substrates transparent substrate, the substrates include optically transparent ceramics such as glass, transparent plastics such as polycarbonates, polyethylene, polypropylenes, polystyrenes, transparent metals or mixtures and combinations thereof. Exemplary metals including iron and iron alloys (e.g., steels, stainless steel, etc.), aluminum and aluminum alloys, copper and copper alloys, tungsten and tungsten alloys, nickel and nickel alloys, other transition metals and their alloys or mixtures or combinations thereof.

Suitable conducting layer include, without limitation, any suitable metal, metal alloy, metal oxide, polymer, and non-polymer surface, where the metal or metal alloys comprise gold (Au), platinum (Pt), indium tin oxide (ITO), iridium (Ir), rhodium (Rh), iron (Fe), titanium (Ti), Zinc (Zn), aluminum (Al) and other metal, metal oxide, or metal alloy electrode and conducting electrodes, mixtures or combinations thereof.

Suitable particles for templates upon which the coating of this invention may be deposited include, without limitation, polymer particles, polymer latex particles, metal oxide particles, ceramic particles, salt particles, other conductive or non-conductive polymers or mixtures or combinations thereof. In certain embodiments, the polymer latex particles are polyethylene latex particles, polypropylene latex particles, polystyrene latex particles, natural rubber latex particles, liposomal particles, or mixtures or combinations thereof. In certain embodiments, the particles are capable of being removed by standard methods such as washing, dissolving, etching, or other removal methods generally known in the art.

Suitable surfactants for use in reversibly changing the properties of the coatings of this invention include, without limitation, fluorinated surfactants, anionic surfactants, non-ionic surfactants and/or cationic surfactants or mixture or combinations thereof. Exemplary examples of fluorinated surfactants include, without limitation, perfluorooctanesulfonic acid (PFOS), perfluorooctanoic acid (PFOA), perfluorononanoic acid (PFNA), DuPont Zonyl® FSO Fluorinated Surfactant, DuPont™ Forafac® fluorinated surfactants, or mixture thereof.

Suitable anionic surfactants include, without limitation, anionic sulfate surfactant, alkyl ether sulfonates, alkylaryl sulfonates, or mixture or combinations. Preferred sodium or ammonium alcohol ether sulfate surfactants include those having the general formula $R^1O$—$(CH_2CH_2O)_nSO_3NH_4$, where $R^1$ is a carbon-containing group including an alkyl group, an aryl group, an alkaryl group, an aralkyl group or mixture thereof. Particularly preferred sodium or ammonium alcohol ether sulfate surfactants include short chain sodium or ammonium alcohol ether sulfate surfactants having between 2 and about 10 carbon atoms, especially, between about 4 and 10 carbon atoms and long chain sodium or ammonium alcohol ether sulfate surfactants having between about 10 to about 24 carbon atoms, more particularly, between about 12 and about 18 carbon atoms, especially, between about 12 and about 14 carbon atoms. The sodium ammonium alcohol ether sulfate surfactants are prepared by reacting 1 to 10 moles of ethylene oxide per mole of alkanol, preferred, are prepared by reacting 3 moles of ethylene oxide per mole of alkanol.

Preferred alkylaryl sulfonates including, without limitation, alkyl benzene sulfonic acids and their salts, dialkylbenzene disulfonic acids and their salts, dialkylbenzene sulfonic acids and their salts, alkyltoluene/alkyl xylene sulfonic acids and their salts, alkylnaphthalene sulfonic acids/condensed alkyl naphthalene sulfonic acids and their salts, alkylphenol sulfonic acids/condensed alkylphenol sulfonic acids and their salts, or mixture or combinations thereof.

Preferred alkyl ether sulfonates including, without limitation, alkyl ether sulfonates having the general formula $R^2$[—(O—$R^3$O)m-($R^4$O)n-($R^5$)]$_y$, where: $R^2$=alkyl, alkenyl, amine, alkylamine, dialkylamine, trialkylamine, aromatic, polyaromatic, cycloalkane, cycloalkene, $R^3$, $R^4$=$C_2H_4$ or $C_3H_6$ or $C_4H_8$, $R^4$=linear or branched $C_7H_{14}SO_3X$ to $C_{30}H_{60}SO_3X$ when y=1, $R^5$=linear or branched $C_7H_{14}SO_3X$ to $C_{30}H_{60}SO_3X$ or H when y>1 but at least one $R^4$ must be linear or branched $C_7H_{14}SO_3X$ to $C_{30}H_{60}SO_3X$, M is greater or equal to 1, n is greater or equal to 0, n+m=1 to 30+, y is greater or equal to 1, X=alkali metal or alkaline earth metal or ammonium or amine.

Suitable cationic surfactants include, without limitation, any cationic surfactant such as monocarbyl ammonium salts, dicarbyl ammonium salts, tricarbyl ammonium salts, monocarbyl phosphonium salts, dicarbyl phosphonium salts, tricarbyl phosphonium salts, carbylcarboxy salts, quaternary ammonium salts, imidazolines, ethoxylated amines, quaternary phospholipids, gemini, bis or di quaternary ammonium surfactants such as bis quaternary ammonium halides of bis halogenated ethane, propane, butane or higher halogenated alkanes, e.g., dichloroethane or dibromoethane, or bis halogenated ethers such as dichloroethylether (DCEE). Preferred bis quaternary ammonium halides are prepared from substituted dimethyl tertiary amines, where the substituent includes between about 4 and about 30 carbon atoms, preferably, between about 6 and about 24 carbon atoms, and particularly, between about 8 and about 24 carbon atoms, and where one or more of the carbon atoms can be replace by an oxygen atom in the form of an ether and/or hydroxyl moiety and/or a nitrogen atom is the form of an amido moiety. Particularly preferred bis quaternary ammonium halides hydrocarbons are prepared from naturally occurring acids, such as fatty acids, synthetic acids, modified naturally occurring acids, or mixture or combinations thereof. Preferred naturally occurring acids are those found in naturally occurring oils such as coconut oil, palm oil, palm kernel oil, soya, safflower oil, sunflower oil, peanut oil, canola oil, or from animal such as tallow oil and its derivatives. Preferred bis quaternary ammonium halides are prepared from disubstituted methyltertiaryamines, where the substituents include between about 4 and about 30 carbon atoms, preferably, between about 6 and about 24 carbon atoms, and particularly, between about 8 and about 24 carbon atoms, and where one or more of the carbon atoms can be replace by an oxygen atom in the form of an ether and/or hydroxyl moiety and/or a nitrogen atom is the form of an amido moiety, such as amidopropyltertiary amines, derived from the reaction of dimethyl aminopropylamine (DMAPA) or similar terminated primary-tertiary diamines, reacted with the above mentioned oils or their corresponding fatty acids, or hydroxy acids. Other preferred cationic surfactants are dimer acids or anhydrides including alkylsubstituted maleic anhydride, alkylsubstituted diethylmalonic acid, or alkylsubstituted higher diacids such as azelaic acid (C9), trimer acids as NTA (nitriloacetic acid), and aconitic acid and trimetellic anhydride are useful though producing a higher trimer. the tertiary amine may be accomplished by reaction of a diamine with a fatty acid or oil, reacting with one amine and then converting the other primary amine to tertiary by the addition of tetrahydrofuran, ethylene oxide, propylene oxide, butylene oxide, epichlorohydrin, or the like and further where the terminal hydrogens of the primary amine can be alkylated using formaldehyde/formic acid mixtures.

Suitable non-ionic surfactants include, without limitation, polyglycols comprising polymers of ethylene oxide (EO), propylene oxide (PO), and/or butylene oxide (BO), polyethyleneoxide polymers such as alcohol ethoxylates and the alkylphenol ethoxylates, alkyl polyglycosides, sorbitan ester surfactants, distribution of the polyoxyethylene chain, polyoxyethylene alkylphenols, polyoxyethylene alcohols, polyoxyethylene esters of fatty acids, polyoxyethylene mercaptans, polyoxyethylene alkylamines, nonionic surfactants containing an amide group, polyol ester surfactants, and mixtures or combinations thereof.

Suitable zwitterionic compounds include, without limitation: (1) any compound having the general structure $R^6, R^7, R^8N^+$—$R^9$—$CO_2^-$, where $R^6$, $R^7$, and $R^8$ are the same or different carbon-containing group, amido carbon-containing group, ether carbon-containing group, or mixtures thereof, and $R^9$ is an alkenyl group, alkenyloxide group or mixtures thereof; (2) any compound having the general structure $R^{10}(R^7,R^8N^+$—$R^9$—$CO_2^-)_n$, where $R^7$ and $R^8$ are the same or different carbon-containing group, amido carbon-containing group, ether carbon-containing group, or mixtures thereof, $R^9$ is an alkenyl group, alkenyloxide group or mixtures thereof, and $R^{10}$ is a multivalent substituent having a valency n between 2 and about 6, e.g., $CH_2$ moiety when n is 2, a CH moiety when n is 3 and a C atom when n is 4; (3) any compound having the general structure $R^{12}$—$C(O)$—$N(R^{11})$—$R^{13}$—$N^+(R^7,R^8)$—$R^9$—$CO_2^-$, where $R^7, R^8, R^{11}$ and $R^{12}$ are the same or different carbon-containing group, amido carbon-containing group, ether carbon-containing group, or mixtures thereof, and $R^9$ and $R^{13}$ are the same or different alkenyl group, alkenyloxide group or mixtures thereof; (4) any compound having the general structure $R^{14}[R^{15}$—$C(O)$—$N(R^{11})$—$R^{13}$—$N^+(R^7,R^8)$—$R^9$—$CO_2^-]_m$, where $R^7, R^8$ and $R^{11}$ are the same or different carbon-containing group, amido carbon-containing group, ether carbon-containing group, or mixtures thereof, $R^9, R^{13}$ and $R^{15}$ are the same or different alkenyl group, alkenyloxide group or mixtures thereof and $R^{14}$ is a multivalent substituent having a valency m between 2 and about 6; other similar ammonium acid zwitterionic agent; or mixtures or combinations thereof. Preferred zwitterionic compounds are betaines such as cocamidopropyl betaine, 5-(1-piperidiniomethyl)-1H-tetrazolide, or similar zwitterionic compounds. Other zwitterionic compounds for use in this invention include, without limitation, phospholipids capable of assuming a zwitterionic state such as phosphatidylcholine, phosphatidylserine, phosphalidylethanolamine, sphingomyelin and other ceramides, as well as various other zwitterionic phospholipids. Preferred sulfo-betaines and related zwitterionic compounds include, without limitation, N-Decyl-N,N-dimethyl-3-ammonio-1-propanesulfonate; Dimethylbenzyl-(3-sulfopropyl)ammonium; Dimethylethyl-(3-sulfopropypammonium; Dimethyl-(2-hydroxyethyl)-(3-sulfopropyl)ammonium; 4-n-Hexylbenzoylamido-, propyl-dimethylanunoniosulfobetaine; -Methyl-N-(3-sulfopropyl)morpholinium; 4-n-Octylbenzoylamido-propyl-dimethylammoniosulfobetaine; 1-(3-Sulfopropyl) pyridium; N-Tetradecyl-N,N-Dimethyl-3-Ammonio-1-Propanesulfonate, or the like or mixtures or combination thereof.

Detailed Description of Section I

Materials and Method

Materials

Polystyrene (PS) latex microbeads (0.5 μm in diameter, 2.5 wt % solids in aqueous suspension) are purchased from Polysciences, Inc. and are used without further purification. Acetonitrile (ACN), sodium n-dodecyl sulfate (SDS), and tetrabutylammonium hexafluorophosphate (TBAH) are obtained from Sigma-Aldrich. The glass slides (BK 7) are acquired from VWR. The gold surface is prepared by thermally evaporating gold (50 to 100 nm thick) under high vacuum ($10^{-6}$ bar) onto a BK 7 glass slide with chromium adhesion layer (~10 nm thick). The Cr and Au deposition is done at a rate ~0.4 $sec^{-1}$ and ~1.1 $sec^{-1}$, respectively, using a thermal evaporator (Edwards). The deionized water (resistivity ~18 mΩ) used for the dilution of PS particles is purified by a Milli-Q Academic® system (Millipore Cooperation) with a 0.22 micron Millistack filter at the outlet. The monomers used in the electrochemical polymerization are synthesized in our laboratory. The synthetic details of ethyl 2-(2,5-di(thiophen-2-yl)thiophen-3-yl)acetate (Monomer 1, G0-3TCOOR where R=$CH_2CH_3$), and 2-(2,5-di(thiophen-2-yl)thiophen-3-yl)acetic acid (Monomer 2, G0-3TCOOH) were performed according to the synthetic Scheme I.1:

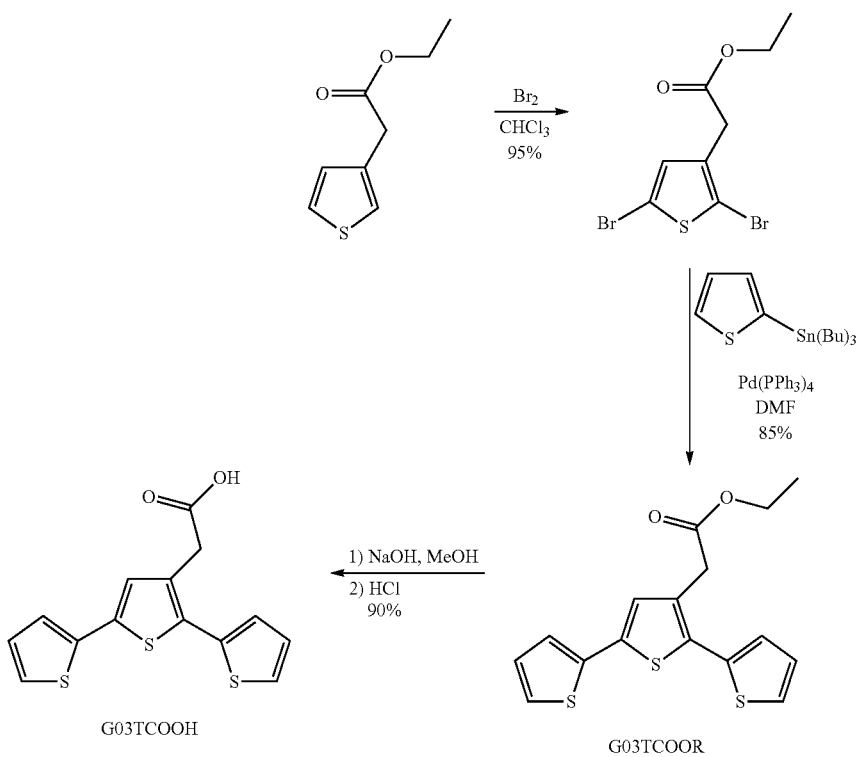

Synthesis of ethyl 2-(2,5-di(thiophen-2-yl)thiophen-3-yl)acetate (G0-3TCOOR, where R = CH$_2$CH$_3$)

The synthesis of G0-3TCOOR is carried out by first synthesizing ethyl 2-(2,5-dibromothiophen-3-yl)acetate as reported in the literature.[1] The same literature procedure is modified to synthesize G0-3TCOOR. Ethyl 2-(2,5-dibromothiophen-3-yl)acetate (6.4 g, 10 mmol) and 2-(tributylstannyl) thiophene (15 g, 20 mmol) are added to a 30 mL dry DMF solution of dichlorobis(triphenylphosphine)palladium (1.3 g, 1.5 mmol). After three freeze thaw cycles, the mixture is heated at 100° C. for 48 h. The mixture is cooled to room temperature and poured into a beaker containing 150 mL of water and subsequently extracted with CH$_2$Cl$_2$. The extracted CH$_2$Cl$_2$ mixture is dried with Na$_2$SO$_4$. After filtering and evaporation of the solvent, the crude product is purified by chromatography on silica gel using toluene as an eluent. The final product is obtained in 85% yield as pale yellow oil. The characterization of the compound is found in accordance with the literature.[1]

Synthesis of 2-(2,5-di(thiophen-2-yl)thiophen-3-yl) acetic acid (G0-3TCOOH)

A total of 4 g of G0-3TCOOR is dissolved in methanol and added to a 20% aqueous sodium hydroxide solution (200 mL). The mixture is then refluxed for 4 h. After removal of methanol, the aqueous solution is washed with ether, acidified with concentrated HCl to pH 1 and extracted by ether. The ether solution is washed several times with water and evaporation of ether yielded 3.4 g G0-3TCOOH. The characterization of the compound is found in accordance with the literature.[2]

Method of Preparing Superhydrophobic Films

Figure 1:
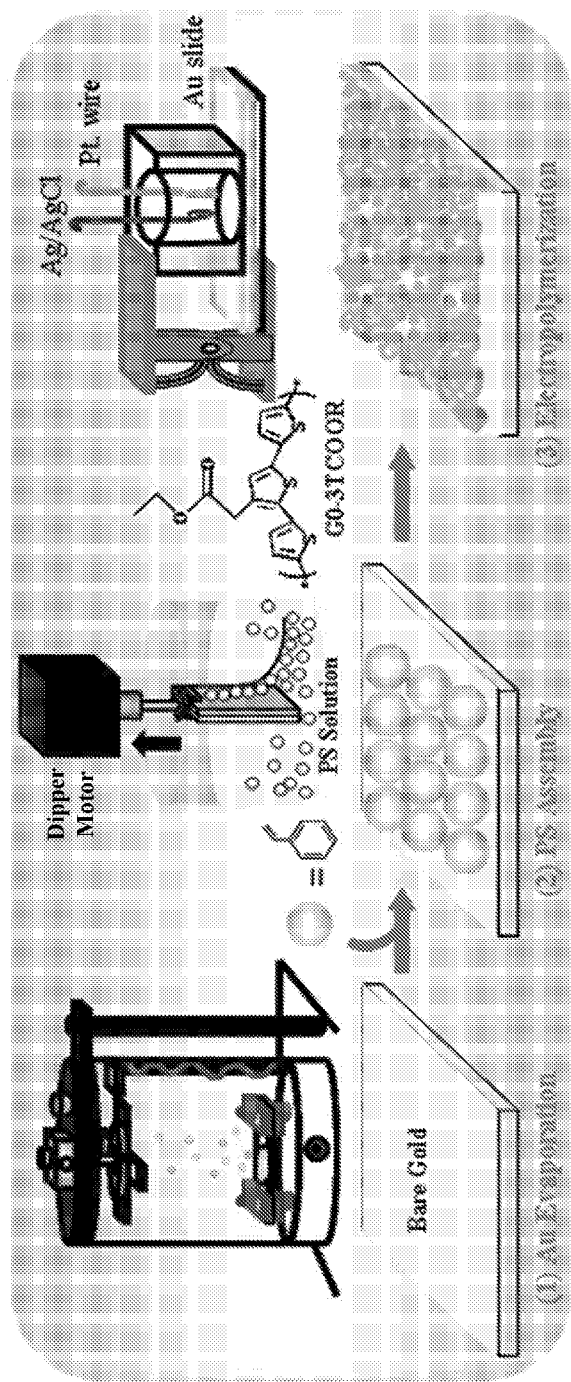
FIG. 1 depicts synthetic Scheme 2 illustrating the method of fabrication to create surface coatings that are superhydrophobic and superliphophilic and conducting.

The superhydrophobic-and-superlipophilic conducting surface is fabricated by simple two-step process such as (1) layering of PS latex microbeads onto conducting substrates like Au and ITO, and (2) electropolymerization of the monomer into the PS coated surface as illustrated in Scheme 2 as shown in FIG. 1. The layering of PS latex beads is prepared using a similar procedure described earlier by Grady and co-workers.[3] As shown in Scheme I.2, the substrate is attached into the dipper motor via a Teflon clip and is dipped into a solution of PS particles (1 wt % in Milli-Q water) and SDS (34.7 mM) as spreading agent. The substrate is then withdrawn vertically from the solution at a lift-up rate of 0.1-0.3 mm/s. The substrate is then dried by suspending it in air for a few minutes. After the layering of the latex microspheres, the monomer (5 mM in ACN with 0.1 M TBAH) is electropolymerized onto the PS coated conducting surface (Au or ITO) as the working electrode in a standard three electrode measuring cell with platinum wire as the counter electrode and Ag/AgCl wire as the reference electrode. The electropolymerization is done using cyclic voltammetric technique in a fabricated electrochemical cell (Teflon made). The potential is scanned between 0 V to 1.1 V (and also 0V to 1.5 V) for 15 cycles at a scan rate of 5 mV/s. The use of very low scan rate will result to the formation of thicker polymer coatings. Note that it is also possible to do this deposition of polymer by chronoamperometric or potentiostatic methods. After electrodeposition, the film is washed in ACN (3 times) to remove the excess monomer and physically adsorbed polymer or oligomer, and a monomer free scan (in a solution of ACN with 0.1 M TBAH as supporting electrolyte) is performed by using exactly the same electrochemistry set-up and settings but for 1 CV cycle only. Finally, the electropolymerized film is thoroughly dried in vacuum for at least one hour prior to any characterizations.

Instrumentation
Electrochemistry

Cyclic voltammetry is performed in a fabricated electrochemical cell (Teflon-made, with a diameter of 1.0 cm and volume of 0.785 cm$^3$) using a conventional three-electrode cell using an Autolab PGSTAT 12 potentiostat (Brinkmann Instruments). The potentiostat is controlled by GPES software (version 4.9).

Static Contact Angle

Contact angle measurements are done using a CAM 200 optical contact angle meter (KSV Instruments Ltd) with CAM 200 software. The experiment is carried out by slowly moving upward the sample stage with the sample on top to come into contact with the liquid droplet (~1 µL) that was suspended at the tip of the micro syringe (200 µL). When using water for contact angle measurements, the sample is only brought at a distance of few millimeters below the water droplet, and then the droplet is carefully released to the surface. Unlike the other solvents, the water droplet will not adsorb or fall from the tip of the needle when in contact with the as-prepared superhydrophobic surface of poly(G0-3TCOOR)/PS (500 nm size) coated Au. The reading of the contact angle is done after 30 seconds when the droplet has been made into the surface, and at least three trials are performed at various positions of the surface. The solvents used for contact angle measurements are Milli-Q water, hexadecane and diiodomethane.

Profilometry

The thickness of the films is acquired by surface profilometry using the Alpha-Step 200 profilometer. The Alpha-Step 200 accurately measures surface profiles below 200 and up to 200 µm. A low stylus force of 5 mg is used during the scanning to avoid damaging the polymer surface. The measurements are done at least five times on different areas of the film under ambient and dry conditions.

Atomic Force Microscopy (AFM)

AFM analysis is carried out in a piezo scanner from Agilent Technologies. The scanning rate is between 0.8-1.5 lines/s, and the scanning area is 5 µm×5 µm. Commercially available tapping mode tips (TAP300, Silicon AFM Probes, Ted Pella, Inc.) are used on cantilevers with a resonance frequency in the range of 290-410 kHz. The scanning of the PS coated Au and ITO is performed under ambient and dry conditions. All AFM topographic images (AAC tapping mode) are filtered and analyzed by using Gwyddion software (version 2.19). Note: Only the PS coated substrates are scanned in the AFM. Because of the formation of a very rough surfaces, the electropolymerized films on PS coated substrates are scanned in the SEM.

Four-Point-Probe

The conductivity measurements are determined with a four point probe technique using the Keithley 2700 Multimeter Intergra Series. All films are measured at least five times on different area under ambient and dry conditions.

Attenuated Total Reflectance Fourier Transform Infrared (ATR-FTIR)

The ATR FIR spectra are obtained on a Digilab FTS 7000 equipped with a HgCdTe detector from 4000 to 600 (cm-1) wavenumbers. All spectra are taken with a nominal spectral resolution of 4 cm$^{-1}$ in absorbance mode. All films are measured under ambient and dry conditions.

Scanning Electron Microscopy

The morphology of the samples is examined by field emission scanning electron microscopy (FE-SEM) using a JSM 6330F JEOL instrument operating at 15 kV. Prior to SEM analysis, the films are thoroughly dried under vacuum for at least 24 hrs.

Analysis of Coatings

Figure 2:
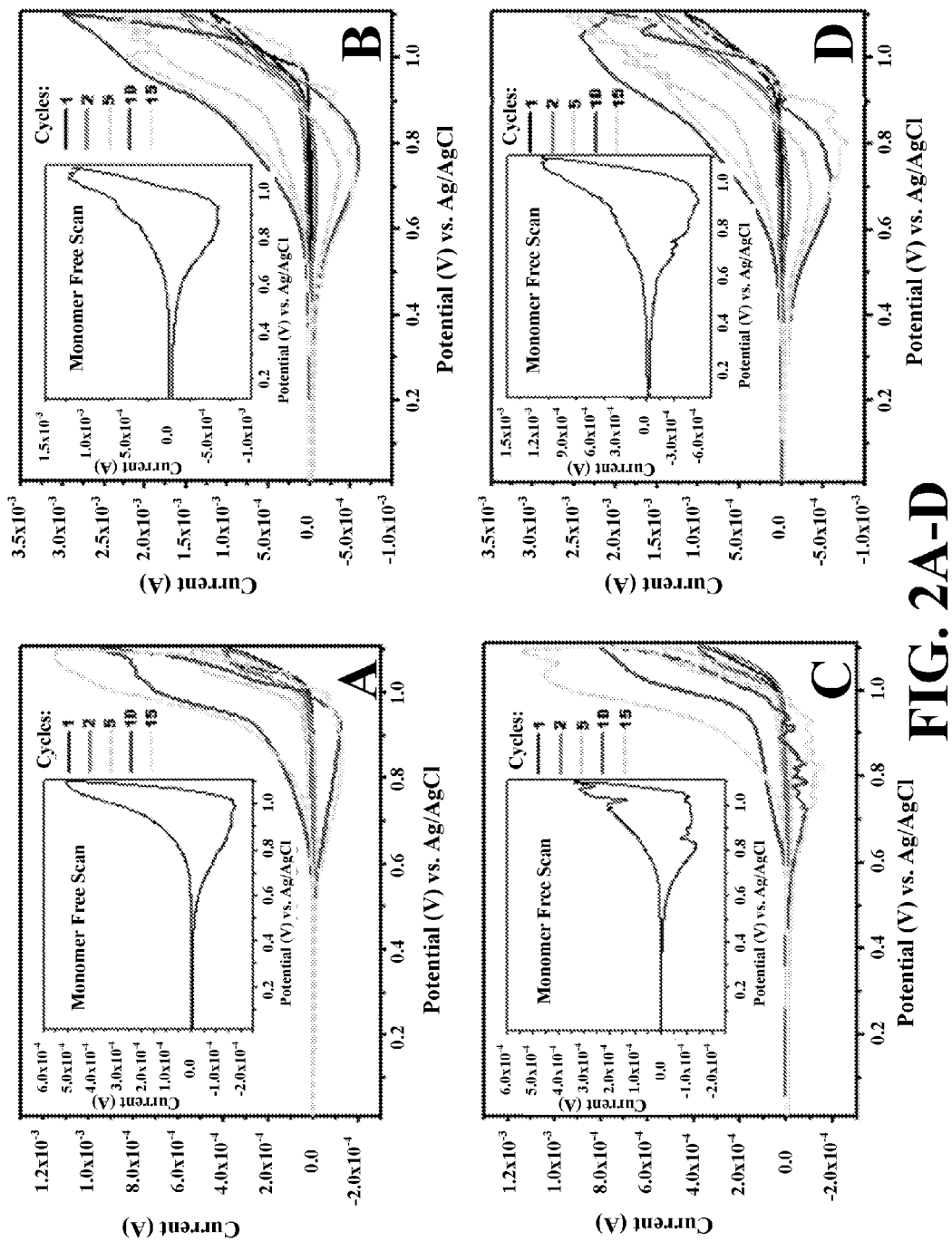
FIGS. 2A-D depict CV diagrams (monomer free scan on inset) of the eletropolymerization of monomers: (1) G0-3TCOOR (5 mM) onto (A) PS coated Au and (B) bare Au and (2) G0-3TCOOH (5 mM) onto (C) PS coated Au and (D) bare Au.

Referring now to FIG. 2, the cyclic potential deposition of the poly(terthiophene) derivatives onto PS coated Au and bare Au using monomers 1 and 2 are shown. For the electropolymerization of G0-3TCOOR (FIGS. 2A and 2C), a constant increase of the oxidation peak (between 0.95 V to 1.1 V) of the terthiophene monomer is observed from the 1$^{st}$ cycle to the 15$^{th}$ cycle. After the first cycle, a new oxidation peak with an onset ~0.6 V appears. This anodic peak at a lower potential, which increases from the 2$^{nd}$ cycle onwards, is attributed to the oxidation of the polymer. It has been reported before that the oxidation of the monomer is higher than the oxidation of the polymer, which is a more conjugated specie.[4] Other anodic electropolymerizable monomers can be used which incorporates thiophene, aniline, pyrrole, fluorene, and its fused heteroaromatic, oligomeric, and copolymeric derivatives. While the present invention describes the use of conducting polymers via anodic polymerization, it is possible to extend such design and sensing concept to non-conducting polymers such as, but not limited to acrylate, styrene, vinyl functional groups via cathodic electropolymerization. Lastly, the electrochemical principles and methods described herein can also be done using potentiostatic or chronoamperometric methods.

In the case of the electropolymerization of G0-3TCOOH onto PS coated Au and bare Au (FIGS. 1B and 1D), the oxidation peak of terthiophene monomer increases and then decreases at higher CV cycles. Furthermore, rough CV curves are observed in both polymerizations, possibly due to the formation of non-homogenous and coarse surfaces. The scanning electron microscopy (SEM) analysis shows a rough surface has been formed. The profilometry measurement validates that thicker films are formed with the electropolymerization of G0-3TCOOH than G0-3TCOOR.

The deposition of the conducting polymer onto the substrate is confirmed by doing a monomer free scan, sweeping the potential on same voltage window as the electropolymerization but for 1 CV cycle in the solvent with the supporting electrolyte only. The appearance of similar CV diagrams (inset of FIGS. 2A-D) with the same reduction-oxidation (redox) couple as the electropolymerizations in the four CV curves (FIG. 2A-D) demonstrates the successful deposition of the conducting polymers onto PS coated Au and bare Au in a stable and controlled manner. These results are also confirmed with the various characterization techniques done below.

Figure 3:
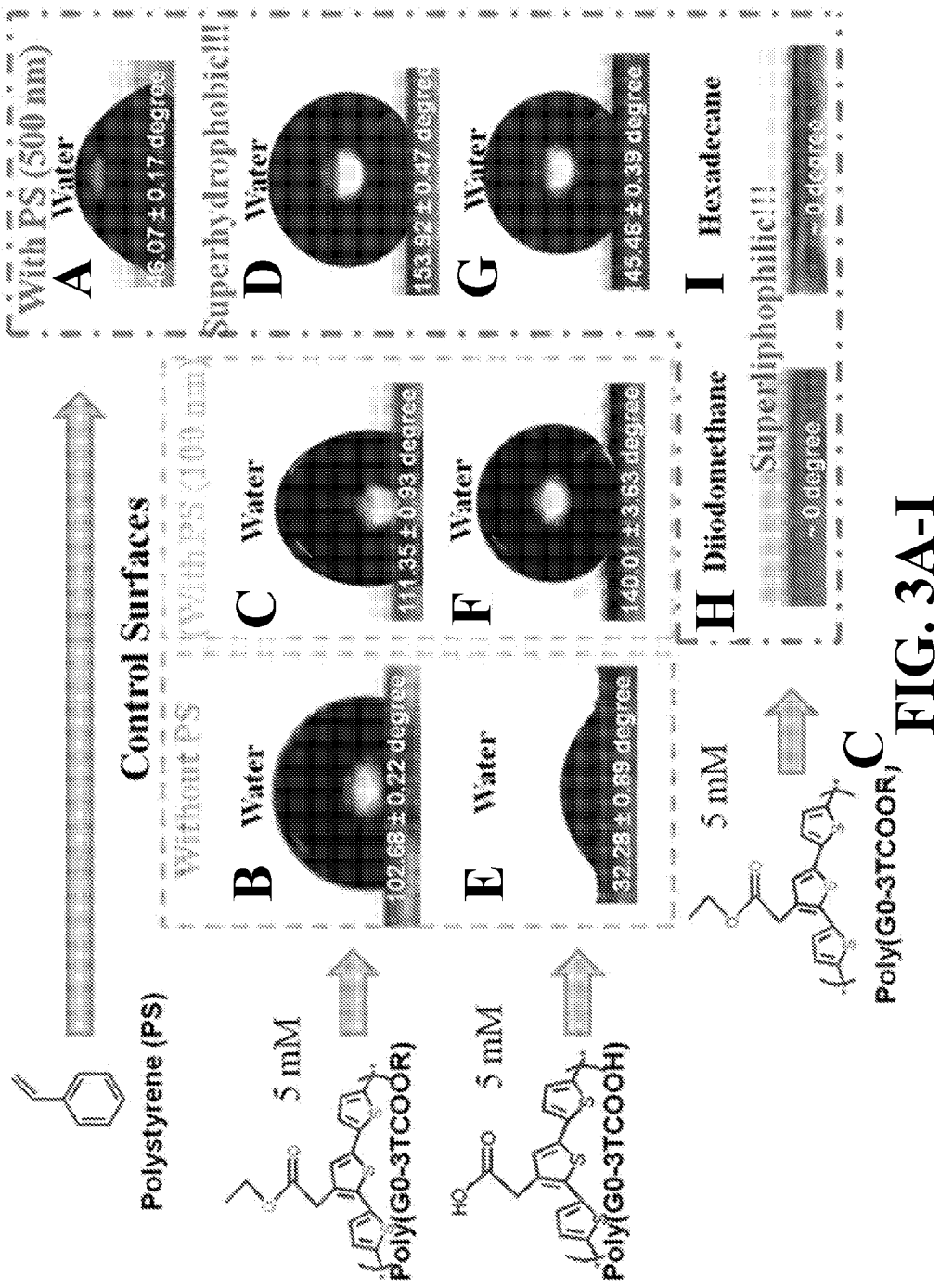
FIGS. 3A-I depict static contact angle measurements in water of (A) PS (500 nm size)-coated Au/BK 7, (B) poly(G0-3TCOOR) on Au/BK 7, (C) poly(G0-3TCOOR) on PS (100 nm size)-coated Au/BK 7, (D) poly(G0-3TCOOR) on PS (500 nm size)-coated Au/BK 7, (E) poly(G0-3TCOOH) on Au/BK 7, (F) poly(G0-3TCOOH) on PS (100 nm size)-coated Au/BK 7, (G) poly(G0-3TCOOH) on PS (500 nm size)-coated Au/BK 7, in diiodomethane of (H) poly(G0-3TCOOR) on PS (500 nm size)-coated Au/BK 7, and in hexadecane of (I) poly(G0-3TCOOR) on PS (500 nm size)-coated Au/BK 7.

Referring now to FIG. 3, the static water contact angle measurements of the electropolymerized films are shown. The electropolymerization of G0-3TCOOR on 500 nm size PS coated Au shows the highest contact angle with a value of ~154° (FIG. 3D), and thus considered superhydrophobic surface. The electropolymerization of the less hydrophobic monomer (G0-3TCOOH) onto 500 nm size PS coated Au depicts a water contact angle of ~145° (FIG. 3G). The electropolymerization of both monomers G0-3TCOOR and G0-3TCOOH on bare Au gives water contact angle values of 103° (FIG. 3B) and 32° (FIG. 3E), respectively. This result illustrates clearly that the layers of the micron size particles play a very important role in significantly increasing the water contact angle of the surface. Like the micron-sized features on the surface of a lotus leaf, the 500 nm size PS enhances the water resistivity of the artificial surface. To examine the effect of the size of the particles in relation to the superhydrophobic nature of the surface, the same conducting polymers (poly (G0-3TCOOR) and poly(G0-3TCOOH)) are deposited onto layers of PS microbeads with 100 nm size. These films reveal higher water contact angle than the films directly electropolymerized on bare Au (FIGS. 3C and 3F). Their values are less than the films electropolymerized on PS with 500 nm size. Thus, the contact angle of the electropolymerized surfaces increases with the size of the particles for both polymers (G0-3TCOOR and G0-3TCOOH), and the superhydrophobic surface is only attained with the layers of 500 nm size PS microbeads and with the electropolymerization of the more hydrophobic monomer, G0-3TCOOR. As a control, the water contact angle of the 500 nm size PS is also determined, and the value is ~46° (FIG. 2A). The as-prepared superhydrophobic surface is also tested for static contact angle measurements using non-polar solvents with very low surface tension. Interestingly, the electropolymerized superhydrophobic film shows complete absorption of the diiodomethane (FIG. 3H) and hexadecane (FIG. 3I) with ~0° contact angle, indicating superlipophilic behavior. This demonstrates the extreme wetting properties of the films. With this finding, the fabricated film has potential applications for the effective separation of organic solvents and possibly oils from water during an industrial discharge and oil-spills.

Table I.1 summarizes the dynamic water contact angle of the superhydrophobic[5] polymer surface. The advancing and receding angles are ~154.0° and ~151.0°, respectively.

TABLE I.1

Dynamic Contact Angle Measurements in Water (advancing and receding angle) of Poly (G0-3TCOOR) on 500 nm size PS Coated Au

| Dynamic Water Contact Angle | Contact Angle (degrees) |
|---|---|
| Advancing | 154 |
| Receding | 151 |
| Hysteresis (Advancing-Receding) | 3 |

The hysteresis[6] of dynamic contact angle is determined to be the difference between the advancing and receding angles, and is equivalent to 3°. With very low hysteresis (>5°), the superhydrophobic surface has potential of rolling off the water droplet from its surface at very low sliding angle.[6,7] To test this premise, the superhydrophobic surface is tilted at an angle about 2.0°±0.5°, and water droplet is slowly release from its surface. A movie clip is obtained, which confirms the rolling of the water droplet from its surface at very low sliding angle. Therefore, the superhydrophobic surface can be used for self-cleaning purposes like the lotus leaf.[8]

Table I.2 summarizes the thickness and conductivity measurements of the poly(G0-3TCOOR) on bare Au and 500 nm size PS coated Au at 0 V (dedoped state) and 1.05 V (doped state).

TABLE I.2

Summary of Thickness and Conductivity Measurements of the Electropolymerized Films (Poly(G0-3TCOOR) and Poly(G0-3T COOH) on PS Coated (500 nm) and Bare Au

| # Electropolymerized Film | Thickness* (μm) | Resistivity** (ohm/square) | Conductivity (Siemens cm$^{-1}$) |
|---|---|---|---|
| 1 5 mM G0-3TCOOR on bare Au CV: 5 mV/sm 15 cycles, 0 V to 1.1 V | 4-12 | 184.21 | 4.52-13.57 |
| 2 5 mM G0-3TCOOR on PS Coated Au CV: 5 mV/sm 15 cycles, 0 V to 1.1 V | 2.5-6.5 | 362.56 | 4.24-11.03\ |
| 3 5 mM G0-3TCOOR on PS Coated Au CV: 5 mV/sm 15 cycles, 0 V to 1.1 V Apply + 1.05 V, 30 mins. | 2.5-6.5 | 166.17 | 9.25-24.07 |
| 4 5 mM G0-3TCOOR on PS Coated Au CV: 5 mV/sm 15 cycles, 0 V to 1.1 V Apply + 0.85 V, 30 mins. | 2.5-6.5 | 308.18 | 4.99-12.98 |
| 5 5 mM G0-3TCOOH on bare Au CV: 5 mV/sm 15 cycles, 0 V to 1.1 V | 30-50 | 67.89 | 2.94-4.90 |
| 6 5 mM G0-3TCOOR on PS Coated Au CV: 5 mV/sm 15 cycles, 0 V to 1.1 V | 20.5-40.5 | 270.41 | 0.91-1.80 |

*Profilometry,
**Four Point Probe (measurements were done at least five times in different area)

The thickness measurements of the poly(G0-3TCOOR) on PS coated Au and bare Au are estimated to be between 2.5-6.5 μm and 4.0-12.0 μm, respectively. Thicker films are made with the electrodeposition of poly(G0-3TCOOH) on PS coated Au and bare Au (~30-50 μm and ~20.5-40.5 μm, respectively) than the poly(G0-3TCOOR). The conductivity measurements of poly(G0-3TCOOR) on PS coated Au at neutral state (0V) is determined to be between ~4.24-11.03 Scm$^{-1}$. The conductivity of the film increases upon doping at 1.05 V, and its value is estimated to be 9.25-24.07 Scm$^{-1}$. At 0.85 V, the conductivity of the film slightly increased (4.99-12.98 S cm$^{-1}$) as compared to the dedoped state (~4.24-11.03 Scm$^{-1}$). By applying a constant positive potential (doping), the conductivity of the conjugated polymers is known to change. For instance, its conductivity is largest for the doped state and decreases for the dedoped state.[9] The conductivity values of poly(G0-3TCOOH) are less than the conductivity of poly(G0-3TCOOR). This highlights the role of conductivity and doping towards the wetting behavior. This results show the variable electrical conductivity of the film.

Figure 4:
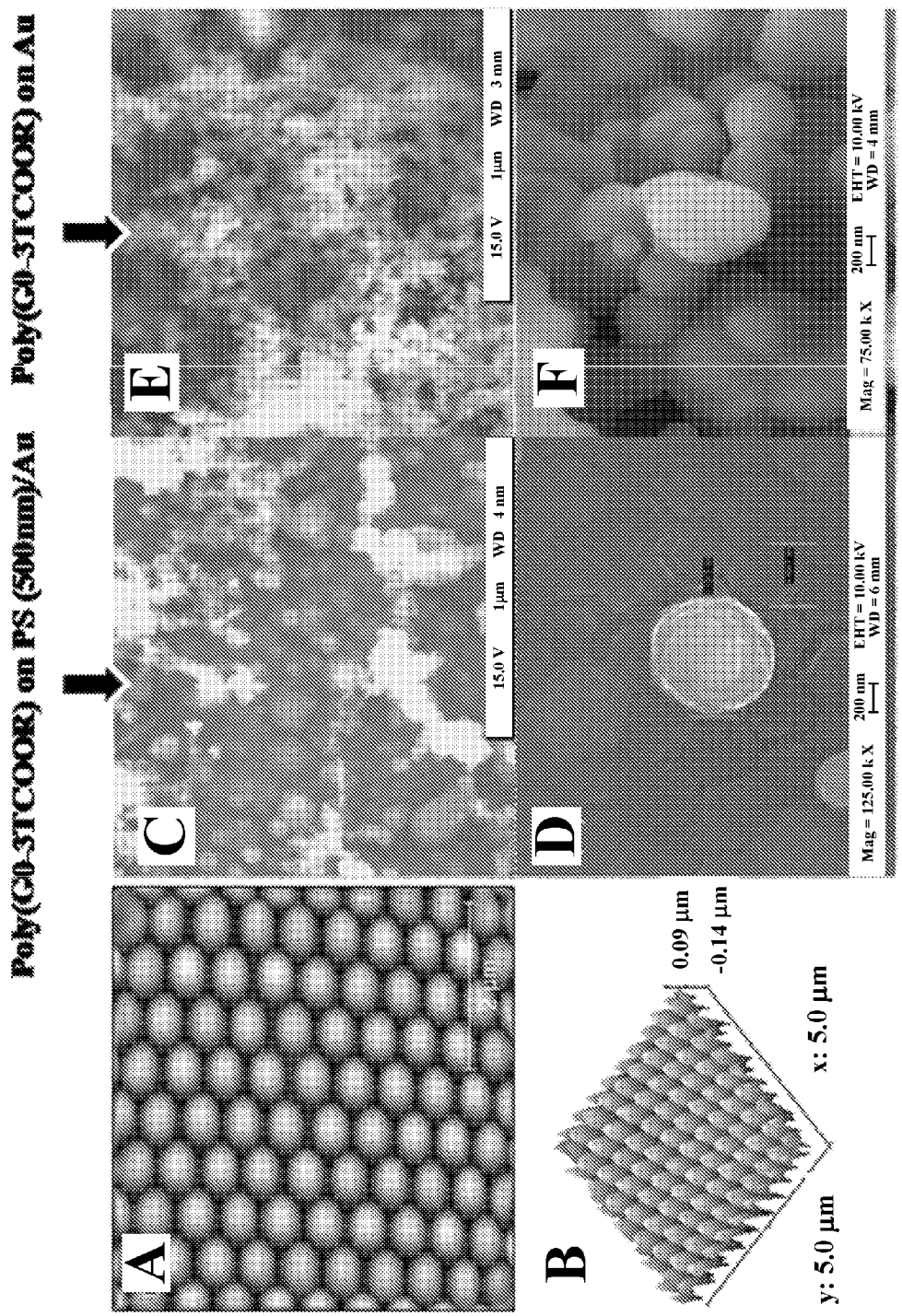
FIG. 4A-F depict surface morphology studies: AFM micrograph (A) 2D and (B) 3D of PS (500 nm size)-coated Au/BK 7 and SEM micrographs (C), (E) low and (D), (F) high magnification of poly(G0-3TCOOR) on PS-coated Au/BK 7, and poly(G0-3TCOOR) on bare Au/BK 7, respectively.

Referring now to FIG. 4, the surface morphology studies of the different surfaces using AFM and SEM microscopies are shown. The AFM reveals (FIGS. 4A and 4B) highly ordered and closely-packed monolayer arrays of latex microspheres on Au substrate. Upon electrodeposition of the conducting poly(terthiophene) on PS coated Au, the morphology of the surface changes as seen in the SEM images (FIGS. 4C and 4D). A hierarchical two scale features are observed in the surface of the superhydrophobic polymer film (poly(G0-3TCOOR)/PS (500 nm size) coated Au). This finding explains the superhydrophobicity of the surface that resembles the lotus leaf with micron and nanometer scale roughness. A rougher surface (FIGS. 4E and 4F) is noticed with the electropolymerization of the same monomer on bare Au. These measurements confirm the role of morphology in observing the unique wetting behavior.

Figure 5:
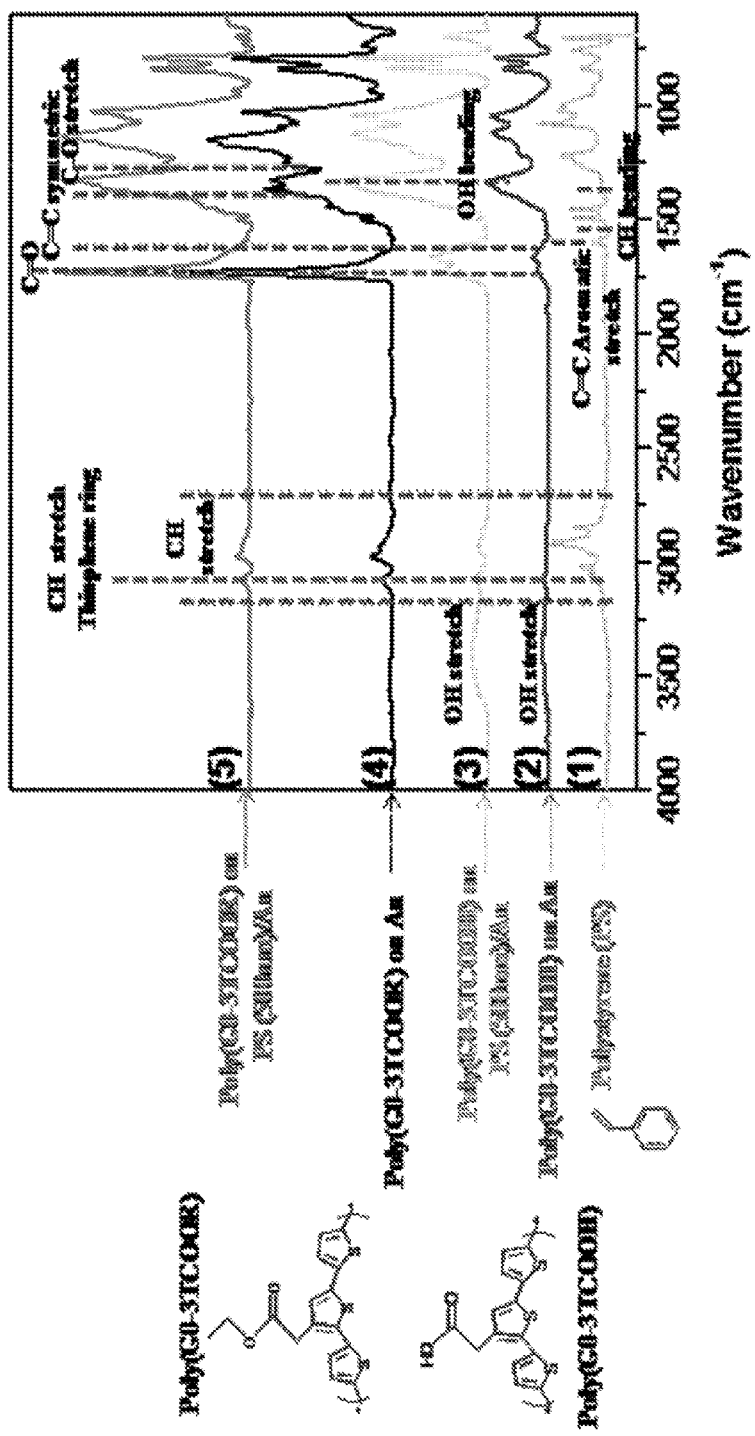
FIG. 5 depict ATR IR spectra of (red) poly(G0-3TCOOR) on 500 nm size PS Au, (black) poly(G0-3TCOOR) on bare Au, (green) poly(G0-3TCOOH) on 500 nm size PS Au, (blue) poly(G0-3TCOOH) on bare Au, and (gray) 500 nm size PS coated Au (control film).

Referring now to FIG. 5, the ATR IR analysis of the electropolymerized films are described: (1) poly(G0-3TCOOR) on PS coated Au and bare Au and (2) poly(G0-3TCOOH) on PS coated Au and bare Au. CH stretching vibrations (between 2800-3000 cm$^{-1}$) are shown in all electropolymerized films. Moreover, higher CH stretching vibration appears (above 3000 cm$^{-1}$) in the electropolymerized poly(terthiophene) films, which is reported as the CH stretch in the thiophene ring.[10] A strong C=O peak is observed with the electrodeposition of poly(G0-3TCOOR) on PS coated and bare Au. This peak is also seen in the poly(G0-3TCOOH). With the poly (G0-3TCOOH) film, a broad OH stretching vibration is discerned, which does not appear with the poly(G0-3TCOOR) film. The spectrum of the 500 nm sized layers of PS is also taken to compare with the electropolymerized poly(terthiophene) films. It also shows CH and C=C stretching vibrations and a doublet peak at ~1500 cm$^{-1}$ that is assigned to CH bending vibration.[11] XPS measurements are also performed to confirm the presence of the poly(terthiophene) on the surface (discussed below). These measurements confirm the composition and the incorporation of polystyrene and conducting polymer in the same film.

Table I.3 summarizes the static contact angle of the artificial superhydrophobic conducting polymer surface at different pH values of water. From pH ~1.0 to pH ~13.0, the poly(G0-3TCOOR)/PS (500 nm size) coated Au demonstrates superhydrophobicity with contact angle greater than 150°.

TABLE I.3

Static Contact Angle Measurements
of the Electropolymerized G0-3TCOOR onto PS
(500 nm size) Coated Au Using Water with Different pH

| pH | $\theta_{Left}$ (degree) | $\theta_{Right}$ (degree) |
|---|---|---|
| 0.99 | 150.04 ± 0.66 | 150.15 ± 0.10 |
| 2.08 | 152.89 ± 1.07 | 151.44 ± 0.90 |
| 2.92 | 150.57 ± 0.28 | 152.59 ± 1.88 |
| 4.05 | 152.46 ± 2.72 | 152.94 ± 3.01 |
| 5.02 | 151.33 ± 2.31 | 150.86 ± 2.97 |
| 6.14 | 151.66 ± 1.85 | 152.50 ± 0.66 |
| 7.08 | 153.04 ± 1.90 | 153.06 ± 2.83 |
| 8.78 | 154.28 ± 0.34 | 153.55 ± 0.59 |
| 9.98 | 151.11 ± 0.82 | 151.00 ± 0.18 |
| 11.02 | 153.49 ± 0.37 | 151.64 ± 1.18 |
| 12.00 | 151.27 ± 2.40 | 151.52 ± 2.04 |
| 13.07 | 151.15 ± 2.93 | 150.89 ± 2.24 |

These results show the pH dependence of the wetting behavior of the films. This result shows that the as-prepared surface can be possibly used for water resistivity even at corrosive environments and wide pH range.

Figures 6A, 6B:
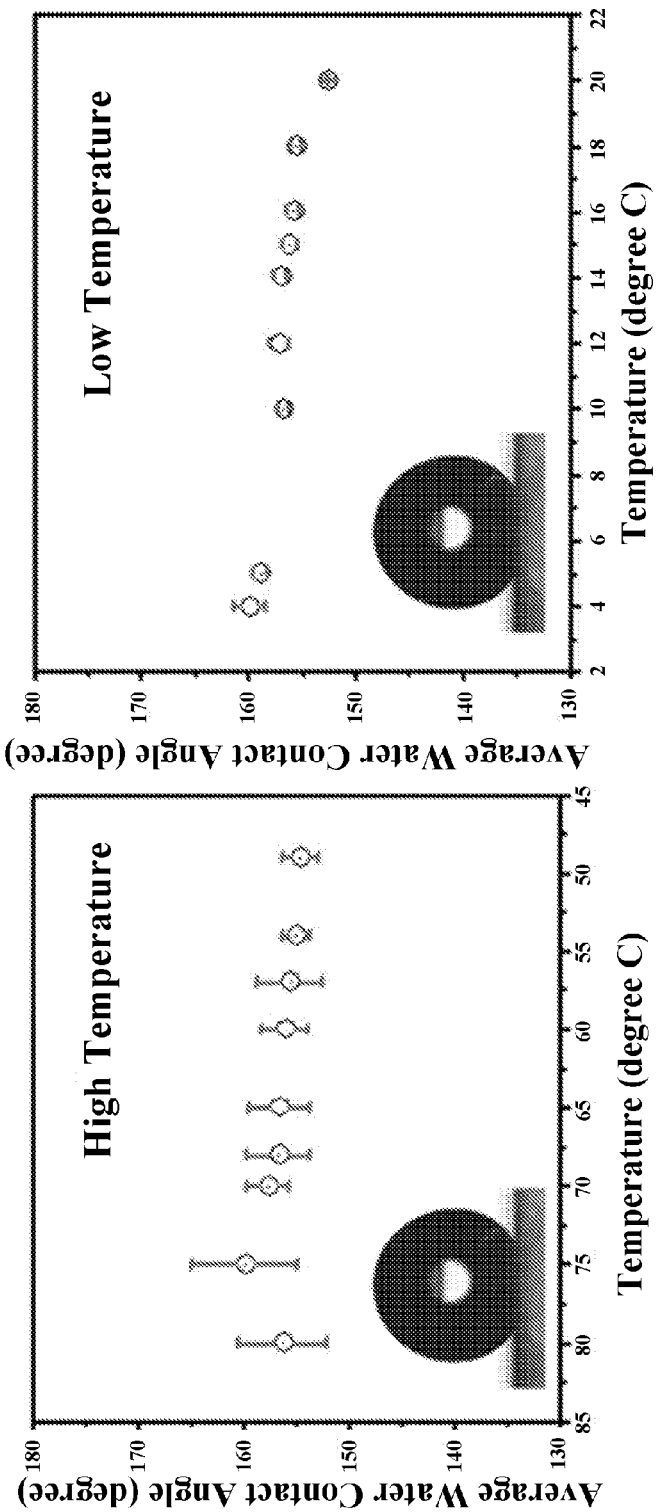
FIGS. 6A&B depicts static contact angle measurements of the electropolymerized G0-3TCOOR onto PS (500 nm size) coated Au using water at different temperatures.

Referring now to FIG. 6, the static contact angle of the superhydrophobic surface at different temperatures of water are summarized. At low temperatures (starting at ~4° s), its superhydrophobicity is maintained. Similarly, at high temperatures (~80° and below), a water contact angle above 150° is also sustained. This result proves the thermal stability of the superhydrophobic surface at a wide range of temperatures.

Figure 7:
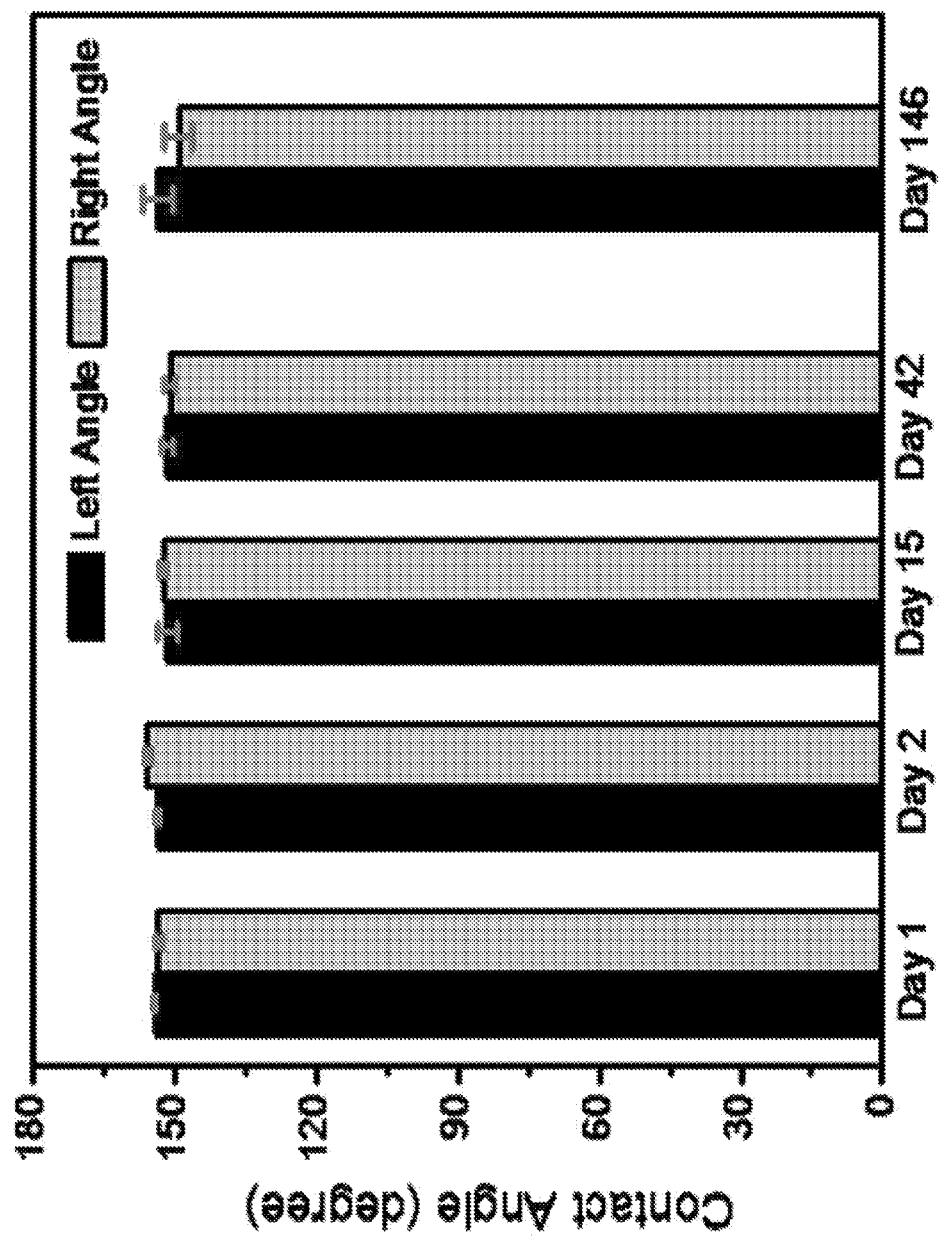
FIG. 7 depicts static water contact angle measurements of the electropolymerized G0-3TCOOR onto PS (500 nm size) coated Au to study its long term stability in dry and ambient conditions.

Referring now to FIG. 7, the long term stability of the superhydrophobic surface, poly(G0-3TCOOR)/PS (500 nm size) coated Au are demonstrated. This study is accomplished by measuring the static water contact angle of the surface over time. The film is kept under dry and ambient conditions when not analyzed by contact angle. After keeping the film in the said condition for about 5 months, the surface still upholds its superhydrophobicity with water contact angle value of ~150°.

Figure 8:
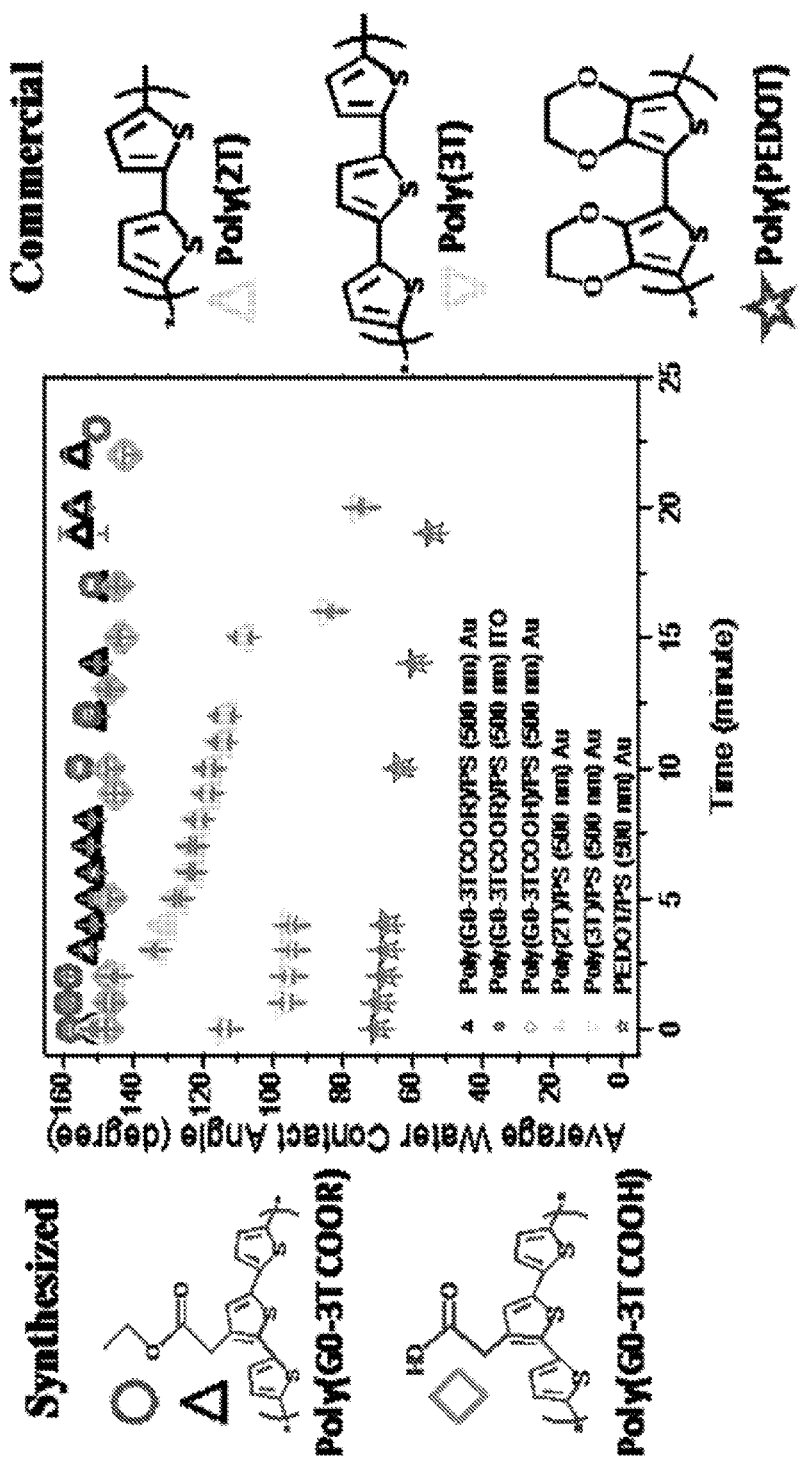
FIG. 8 depicts static water contact angle measurements of the electropolymerized G0-3TCOOR onto PS (500 nm size) coated Au as compared to the other electropolymerized surfaces, prepared by electrodeposition of commercially available monomers onto 500 nm size PS coated Au.

Referring now to FIG. 8, the stability of the superhydrophobic property of the electrodeposited poly(G0-3TCOOR) onto 500 nm size PS coated substrates as compared to other electropolymerized films (using commercially available monomers) fabricated using the same scheme (Scheme 1) are illustrated. This study is carried out by allowing the water droplet to sit on the electropolymerized films and simultaneously measuring the static contact angle over time. For the poly(G0-3TCOOR) on PS (500 nm size) coated Au, its superhydrophobicity is maintained for at least 20 minutes. The electropolymerization of poly(G0-3TCOOR) is also performed onto 500 nm size PS coated ITO to confirm the earlier result with the PS coated Au. Likewise, a water contact angle greater than 150° is preserved with the electropolymerized film on PS coated ITO for at least 20 minutes. In the case of poly(G0-3TCOOH) on 500 nm size PS coated Au (starting water contact angle of ~445°), its contact angle slowly decreases over time and the value drops to ~125° after 20 minutes. It is possible that the COOH functional groups of the polymer film slowly forms H-bonding with the water droplet, and hence allowing the slow penetration of the water into the polymer film. With the other electropolymerized films (also deposited on 500 nm size PS coated Au) using the commercially available monomers, their contact angle dramatically decreases over time and are eventually considered hydrophilic surfaces (water contact angle<100°). This result highlights the advantage of using the synthesized and designed monomers of the aforementioned thiophene derivatives for the fabrication of stable superhydrophobic surfaces with long term water resistivity. Other anodic electropolymerizable monomers can be used which incorporates thiophene, aniline, pyrrole, fluorene, and its fused heteroaromatic, oligomeric, and copolymeric derivatives.

Figure 9:
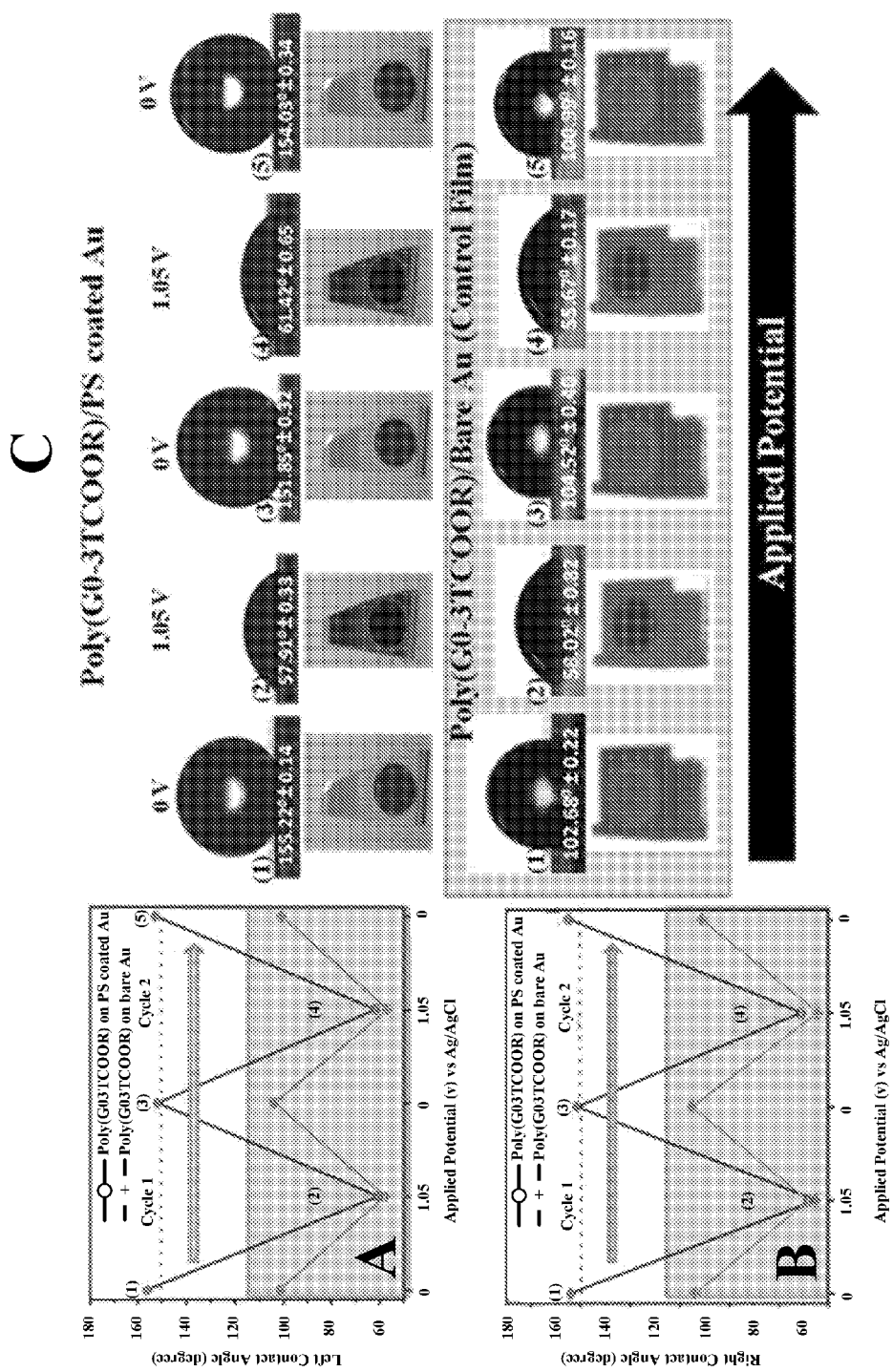
FIGS. 9A-C depict reversible wettability and electrochromic properties: (A) Left and (B) right water contact angle at 0 V and 1.05 V of the poly(G0-3TCOOR) on PS (500 nm size) coated-Au and poly(G0-3TCOOR) on bare Au as control. (C) Water contact angle and their photo images of the electropolymerized films, poly(G0-3TCOOR) on PS (500 nm size) coated-Au and poly(G0-3TCOOR) on bare Au at 0 V and 1.05 V.

Referring now to FIG. 9, the reversible wettability, from superhydrophobic to hydrophilic, and the relation to the reversible electrochromic properties of the poly(G0-3TCOOR)/PS coated Au. After a constant oxidation potential of 1.05 V (doping) is applied to the film, its water contact angle decreases to ~60° are depicted. With the same surface and applying 0 V to dedope the polymer film, its constant angle returns back to >150°. For two consecutive cycles, the water contact angle of the poly(G0-3TCOOR)/PS (500 nm size) coated Au is able to reverse back and forth from superhydrophobic) (>150° to hydrophilic) (<65° status depending upon the potential applied to the polymer film. Accompanying the change in the wettability of the surface is also the change in the electrochromic property upon doping (apply 1.05V) and dedoping (apply 0V). Photo images of the same polymer film at dry state are taken immediately after applying a doping and dedoping potentials. From the images, the polymer film exhibits a distinct orange color at neutral (dedoped) state and dark green to black color at charged (doped) state. To verify the reversible wettability and electrochromic properties of the polymer film, the poly(G0-3TCOOR) is deposited on bare Au. Likewise, the electropolymerized film on Au is subjected to doping and dedoping by applying 1.05 V and 0 V, respectively. The film also showed reversible wettability from hydrophobic) (~100° to hydrophilic states) (~60° for the same number of cycles. The reversible electrochromic property of the film is also displayed by the change in color of the film from orange (at 0 V) to dark green (at 1.05V). This result indicates that the reversibility of the wettability and electrochromic properties of the surface is only due to the poly (terthiophene) and there is no contribution from the underlying PS layers. The wettability and electrochromism of the surface can be easily tuned and controlled by simply adjusting the potential of the film. This also implies that other electro-optical properties (transmission/absorption, fluorescence, charge transfer, non-linear optical properties, etc.) of the conducting polymer film can be tuned together with the wetting/surface energy properties of the film.

Figure 10:
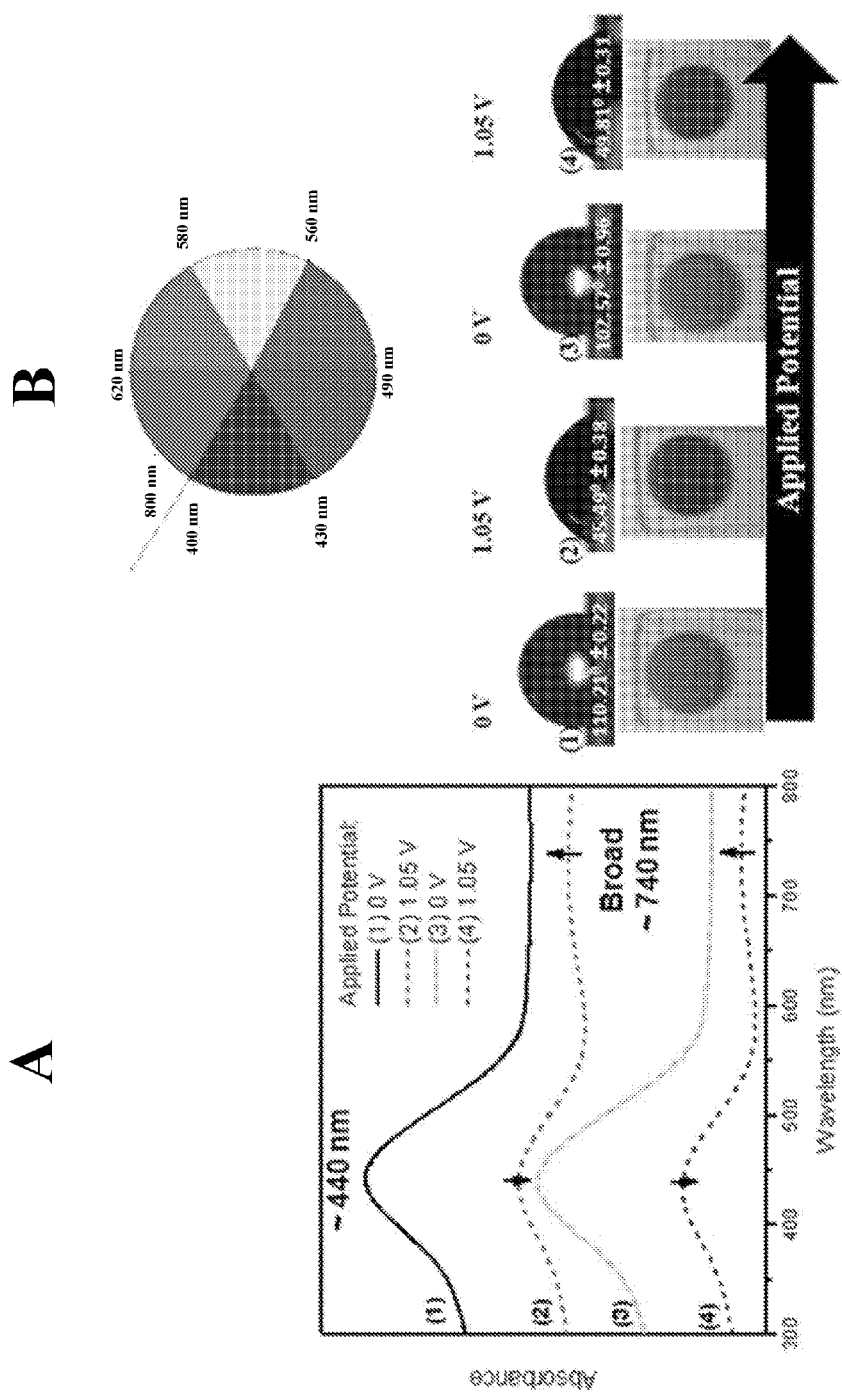
FIGS. 10A&B depict (A) UV-Vis spectrum of poly(G0-3TCOOR) on bare ITO; (B) Photo images of poly(G0-3TCOOR) on bare ITO as it undergoes dedoping and doping for 2 cycles.

To study further the electrochromic property of the polymer film, the electrodeposition of poly(G0-3TCOOR) is done on bare ITO so that UV-Vis measurements can be performed as shown in FIG. 10. The change in color of the film from orange to dark green is again observed upon dedoping/doping. The contact angle is able to reverse from 110° (dedoped state) to 50° (doped state). From the UV-Vis spectrum, a broad peak ($\lambda_{max}$~440 nm) is shown with the film at neutral state (0 V), which is due to the absorption of the poly(terthiophene) ring.[12] This peak decreases and another broad peak appears at ~740 nm at doped state (1.05 V). The broad peak at ~740 nm is attributed to the formation of the radical cation called polaron.[13]

Figure 11:
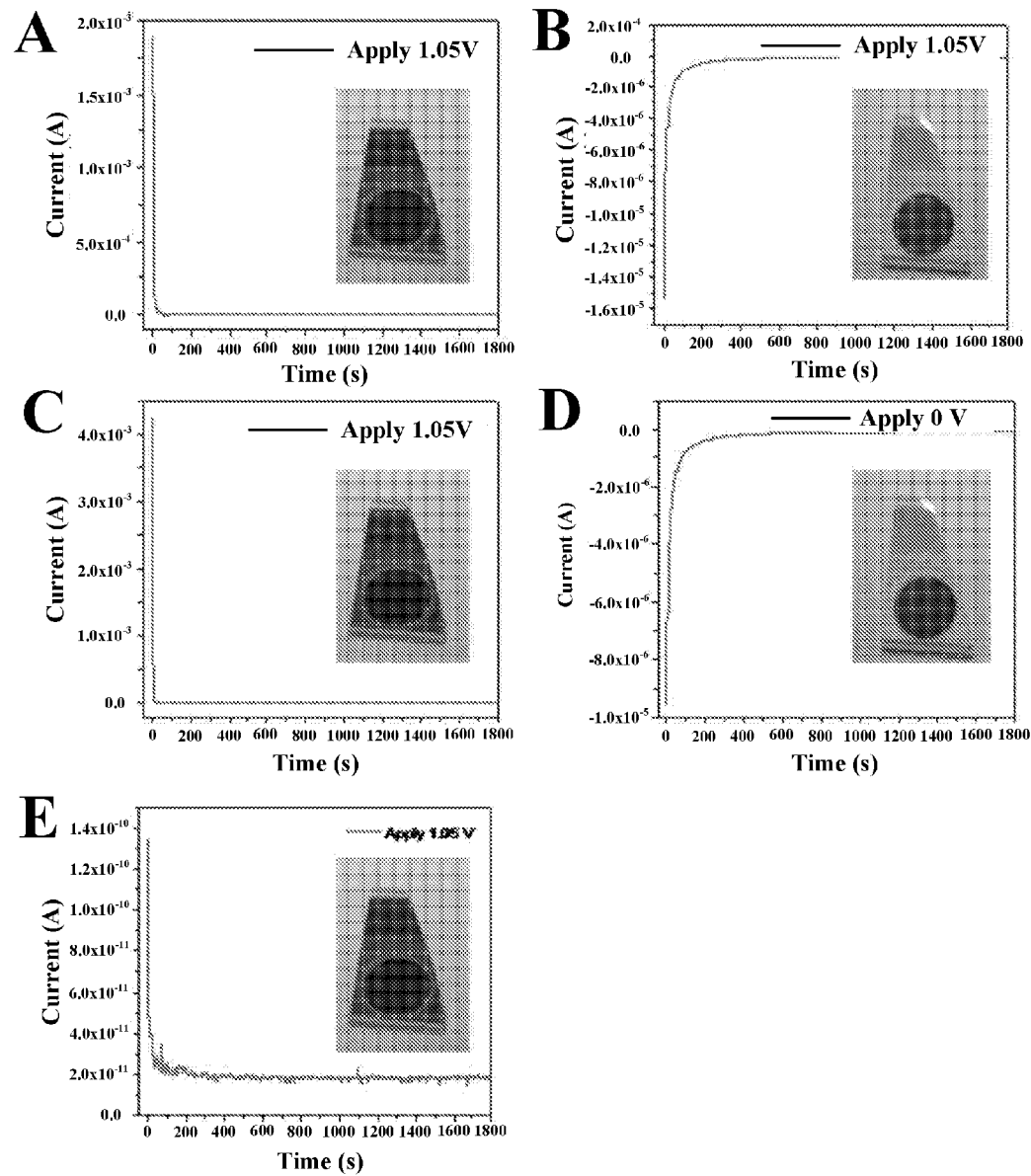
FIGS. 11A-E depict applications of constant potential (0 V or 1.05 V) by chronoamperommetric measurements to poly(G0-3TCOOR) on PS (500 nm size) coated Au (A) and bare Au (B).

Referring now to FIG. 11, the current response versus time (chronoamperommetric measurements) upon applying 1.05 V and 0 V to the poly(G0-3TCOOR) onto 500 nm size PS coated Au are shown. The same profile is observed with application of 1.05 V and 0 V to the poly(G0-3TCOOR) on bare Au and bare ITO.

Figure 12:
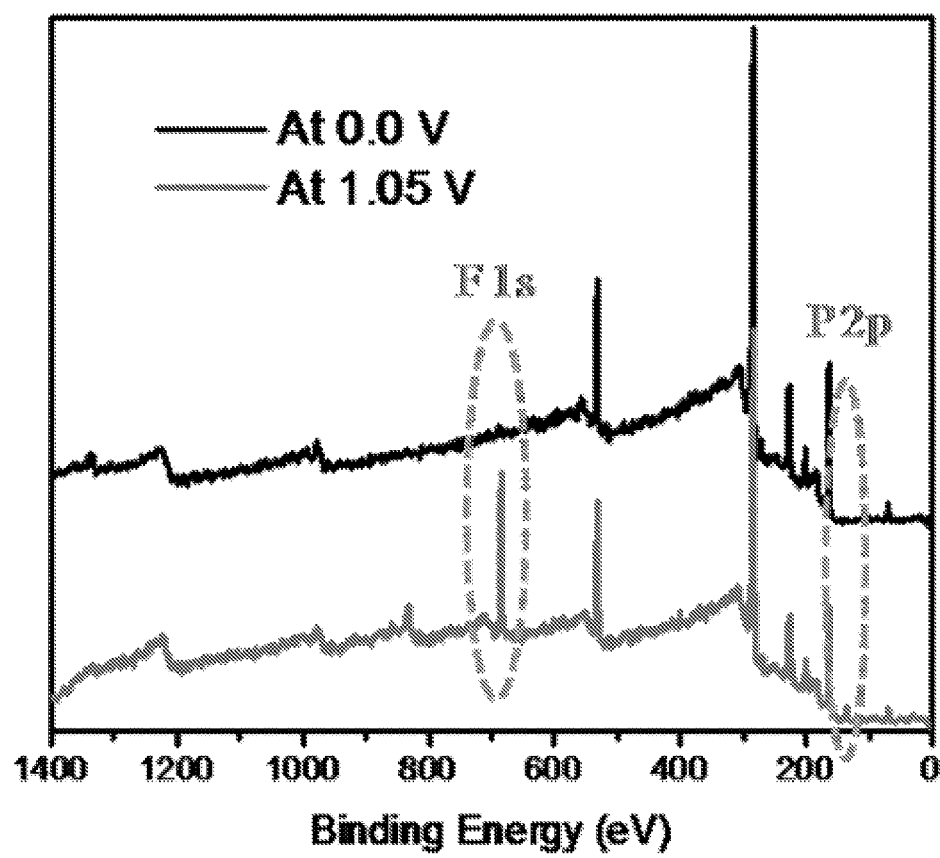
FIG. 12 depict an XPS survey scans of the poly(G0-3TCOOR) on PS (500 nm size) coated Au at 0 V (dedoped state) and 1.05 V (doped state).

Referring now to FIG. 12, the XPS survey scan of the superhydrophobic film poly(G0-3TCOOR)/PS coated Au before and after doping are presented. The conversion of the superhydrophobic surface into hydrophilic after applying a constant oxidation potential is possibly due to the charging[14] of the polymer film. Consequently, the negatively charged counter ion ($PF^{6-}$ from the TBAH supporting electrolyte) in solution will be inserted into the positively charged polymer film to maintain its neutrality. The appearance of F 1s and P 2p peaks in the survey scan after doping (apply 1.05 V) the polymer film validated the insertion of the $PF^{6-}$ counter ion as a result of the charging of the polymer film. These peaks are not shown at dedoped state (0 V).

Figure 13:
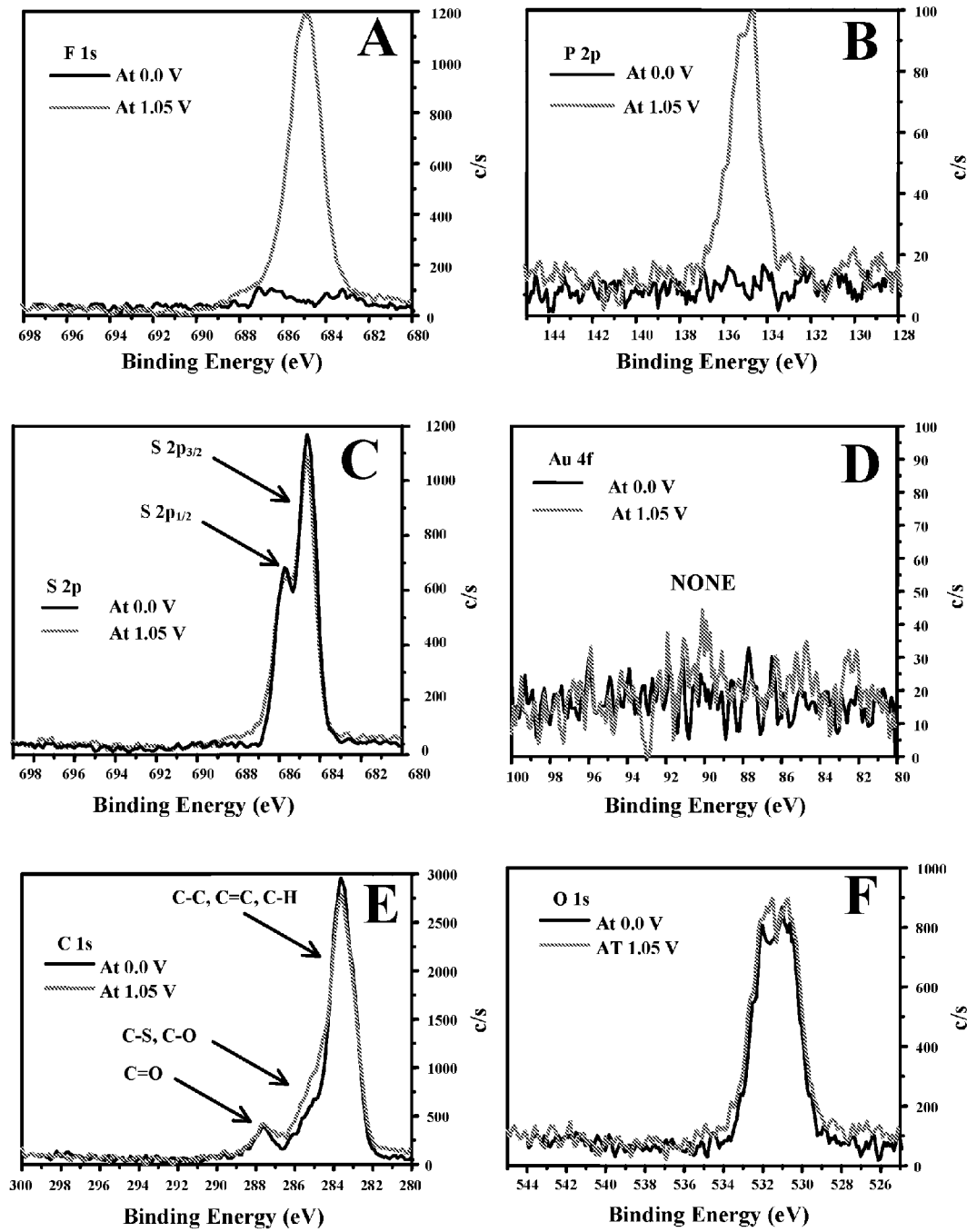
FIGS. 13A-F depict XPS high resolution scans of the poly(G0-3TCOOR) on PS (500 nm size) coated Au at 0V and 1.05 V: (A) F 1s, (B) P 2p, (C) S 2p, (D) Au 4f, (E) C 1s, and (F) O 1s.

The high resolution XPS scans as shown in FIG. 13 confirm the results of the survey scan. After applying 1.05 V to the poly(G0-3TCOOR)/PS Au, an obvious F 1s and P 2p peaks appear on the high resolution XPS spectrum. Furthermore, the S 2p, C 1s, and O 1s peaks remain constant, signifying the stability of the poly(terthiophene) even with the application of a doping potential. The presence of S 2p peak suggests the formation of the poly(terthiophene) films onto the PS coated Au. And the electropolymerized film is thick since the Au 4f peak is no longer seen by the XPS scan, which corroborates the profilometry measurement. This data authenticates the results of the other characterization techniques based on the doping and dedoping mechanisms of the conducting polymer.

Figure 14:
FIG. 14 depicts contact angle measurements proving the conversion of the superhydrophobic and superlipophilic conducting surface (poly(G0-3TCOOR/PS (500 nm) Au)) into superhydrophilic and lipophobic conducting surface by one simple step, spincoating of fluorinated surfactants (S 760P).

Referring now to FIG. 14, the contact angle measurements of poly(G0-3TCOOR)/PS (500 nm) Au and other substrates as control are illustrated. After the spin coating of a fluorinated surfactant (S 760P), the once superhydrophobic-and-superliphophilic surface is now converted into superhydrophilic and liphophobic. This novel behavior showing the transformation from superhydrophobic (WCA>150°) to superhydrophilic (WCA~0°) and from superliphophilic (~0 degree CA in hexadecane and diiodomethane) into liphophobic (>80° CA in hexadecane and diiodomethane) is only exhibited by poly(G0-3TCOOR)/PS (500 nm) Au. The same experiment is also done with the other substrates to compare the earlier film (poly(G0-3TCOOR)/PS (500 nm) Au. This highlights the possibility of using surfactants to modify the wetting behavior of the existing system based primarily on changes in the surface energy or morphology with the use of other surfactants.

Other Embodiments

Other anodic electropolymerizable monomers can be used which incorporates thiophene, aniline, pyrrole, fluorene, and its fused heteroaromatic, oligomeric, and copolymeric derivatives. While this work emphasizes the use of conducting polymers by anodic polymerization, it is possible to extend this method and desigh to non-conducting polymers such as acrylate, styrene, vinyl functional groups via cathodic. It should also be noted that electrochemistry can be done in various shapes, sizes, and geometries of the electrode including a choice between potentiodynamic and potentiostatic or chronoamperometric methods. It is possible that this work can be extended to large area surfaces or confined dimensional surfaces and interfaces where the above mentioned embodiments are possible. Important applications of such coatings can be in the form of anti-wetting, filtration, anti-corrosion, de-icing, anti-microbial, electrochromic, and electrophoretic or electro-wetting applications where the wetting properties of the film play an important role.

REFERENCES CITED IN SECTION I

The following references were cite in the section of the specification:
1 Taranekar, P.; Fulghum, T.; Baba, A.; Patton, D. and Advincula, R. *Langmuir* 2007, 23, 908-917.
2 Yassar, A.; Moustrou, C.; Youssoufi, H. K.; Samat, A.; Guglielmetti, R.; F. Garnier, F. *Macromolecules* 1995, 28, 4548-4553.
3 Marquez, M.; Grady, B. P. *Langmuir* 2004, 20, 10998-11004.
4 Roncali, J., *Chem. Rev.* 1992, 92, 711-738
5 Qu, M.; Zhao, G.; Cao, X.; Zhang, J. *Langmuir* 2008, 24, 4185-4189.
6 Darmanin, T.; Guittard, F. *J. Am. Chem. Soc.* 2009, 131, 7928-7933.
7 Synylska, A.; Ionov, L.; Grundke, K.; Stamm, M. *Langmuir* 2009, 25, 3132-3136.
8 Blossey, R. *Nat. Mater.* 2003, 2, 301-306.
9 Georgiadis, R.; Peterlinz, K. A.; Rahn, J. R.; Peterson, A. W.; Grassi, J. H. *Langmuir.* 2000, 16, 17, 6759-6762.
10 Fabre, B.; Lopinski, G. P.; Wayne, D. M. *J. Phys. Chem. B.* 2003, 107, 14326-14335.
11 Lu, X.; Zhou, J.; Zhao, Y.; Qiu, Y.; Li, *J. Chem. Mater.* 2008, 20, 3420-3424.
12 Xia, C.; Park, M-K.; Advincula, R. *Langmuir* 2001, 17, 7893-7898.
13 Ikeda, T.; Higuchi, M.; Kurth, D. G. *J. Am. Chem. Soc.* 2009, 131, 9158-9159.
14 (a) Schopf, G.; Koβmehl, G. *Advances in Polymer Science: Polythiophenes-Electrically Conductive Polymers. Spinger.* 1997, 80. (b) Koβmehl, G.; Kabbeck-Kupijai, D.; Niemitz, M. *Chiuz.* 1990, 24, 106. (c) Niemitz, M.; Koβmehl, G. *Angew. Makron. Chem.* 1991, 185-186, 147. (d) Koβmehl, G.; Niemitz, M. *Synth. Met.* 1991, 41, 1065.

Detailed Description of Section II

Superhydrophobic-Superoleophilic Polythiophene Films with Tunable Wetting and Electrochromism Summary of Invention of Section II A non-fluorinated polythiophene film with dual superhydrophobic and superoleophilic wetting properties involving 2-D assembly of polystyrene (PS) latex particles and electropolymerization was demonstrated. The phenomenon is stable at wide temperatures and pH ranges. It is easily and rapidly reversed with voltage or surfactant coincident with electrochromism.

Introduction of Section II

There is much interest in superhydrophobic surfaces as inspired by the non-wetting properties of the lotus leaf.[1] It can give a water contact angle greater than 150° with only 2-3% of the water droplet coming into contact with its surface—a common test for designating synthetic superhydrophobic surfaces.[1] The high water repellency is well worth mimicking because of the myriad industrial and practical applications namely self-cleaning coatings, anti-fouling marine coatings, microfluidics, anti-biofouling, and anti-ice adhesion properties.[2] Here we report a novel and facile preparation of a non-fluorinated superhydrophobic-superoleophilic polythiophene coating with reversibility to a superhydrophilic-and-oleophobic surface via electrochemical polymerization on a two-dimensionally (2-D) layered colloidal particle template. Interestingly, such films exhibit both simultaneous reversible electrochromic and extreme wettability properties by simply changing the voltage (potential) ex-situ. Such reversible wettability property can result in highly controlled wetting behavior with possible dual applications in self-cleaning coatings, channeling of flow properties, controlled membrane separations, and regenerable surfaces together with electro-optical functionality (electrochromic)—by a mere switch of the applied potential.

Artificial superhydrophobic surfaces can be accomplished by developing a dual-scale roughness structure and tuning of surface energy.[3] Most reports[2,3] on synthetic superhydrophobic surfaces have been fabricated using fluorinated polymers and small molecule compounds, which are markedly known as low surface energy coating materials.[4] Fluorinated small molecule compounds in particular are more expensive and deemed to have some detrimental effects with bio-accumulation to the environment.[5,6] Therefore, these concerns necessitate the development of non-fluorinated superhydrophobic coatings with other inherently useful functionality or properties.[7,8]

To date, electrodeposited electrically conducting polymers mostly with fluorinated functional group have been demonstrated to confer water and also oil resistance.[9] There are only few accounts on non-fluorinated conducting polymers usually with longer alkyl side chain that show high water repellency.[10] However, earlier reports about the use of non-fluorinated conducting polymers for anti-wetting surface coatings have not illustrated superhydrophobicity and superoleophilicity (co-existence of two surface properties) with reversible wettability and electro-optical properties via ex-situ potential switching. Conducting polymers in general and polythiophenes in particular, have unique electro-optical and mechanical properties making them useful for display materials, semi-conductors, electrochromic devices, fluorescent materials, non-linear optical materials, and various types of industrial coatings for anti-corrosion and anti-static purposes etc.[11]

Unlike other methods of creating synthetic superhydrophobic coatings such as laser/plasma/chemical etching, electrospinning, and layer-by-layer assembly,[12] electrochemical deposition of conducting polymers has remained relatively unexplored for such applications. The electropolymerization technique offers several advantages in that it can be site-directed and deposited over large surface areas. It has been applied on a variety of electrode surfaces mostly based on metal or semi-conductor or transparent substrates like Au, Ag, Al, stainless steel, indium tin oxide (ITO), etc.,[13] and it can be done by cyclic voltammetry or potentiostatic methods. Moreover, electropolymerization can enable the control of thickness, surface growth, and morphology using various parameters (e.g., scan rate, potential window, etc.).[13] For patterning and creating surface features, the vertical deposition method of 2-D nanoparticle colloidal layering using a Langmuir-Blodgett (LB) like-technique[14] has not been broadly used for site directed or templated electrodeposition. Yet, this technique has proven to be effective in making highly-ordered and closely packed array features of latex nanospheres on flat surfaces that can influence film morphology through periodic surface structures.

Referring to FIGS. 15A-H, a two-step process towards the formation of superhydrophobic-and-superoleophilic conducting polymer nanostructured surface is shown. AFM topography 2D images (3D on inset) of LB-like surface layering of PS nanoparticles: (B) 200 nm size, (C) 350 nm, and (d) 500 nm. IR imaging showing (E) 2D and (F) 3D images with IR spectra focused on (G) C—H stretch (area in dark gray or green) and (H) C=O stretch (area in light gray or cyan) regions. Note: Scanning area is 176×176 $\mu m^2$.

Figure 15:
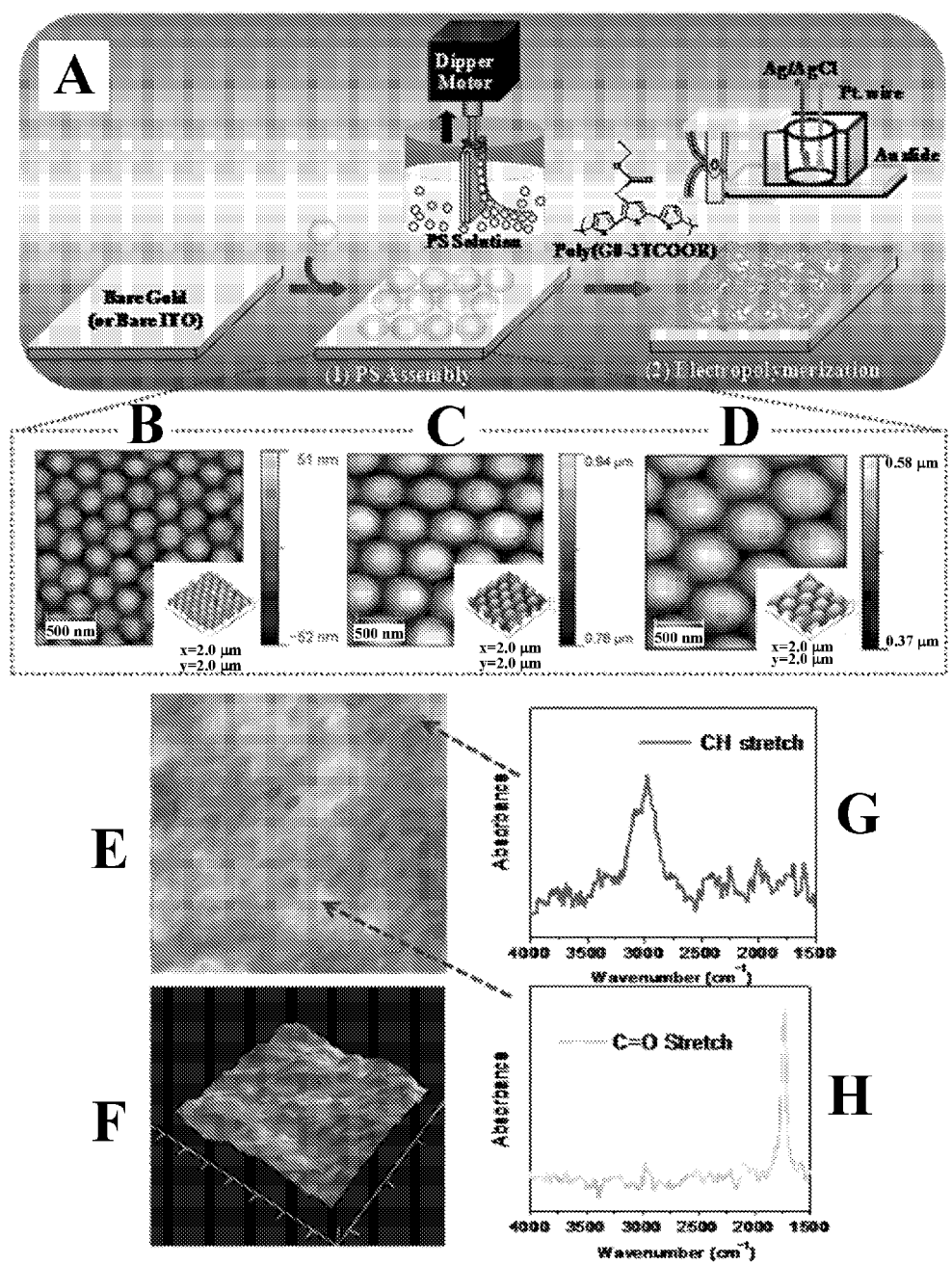
Figure 16:
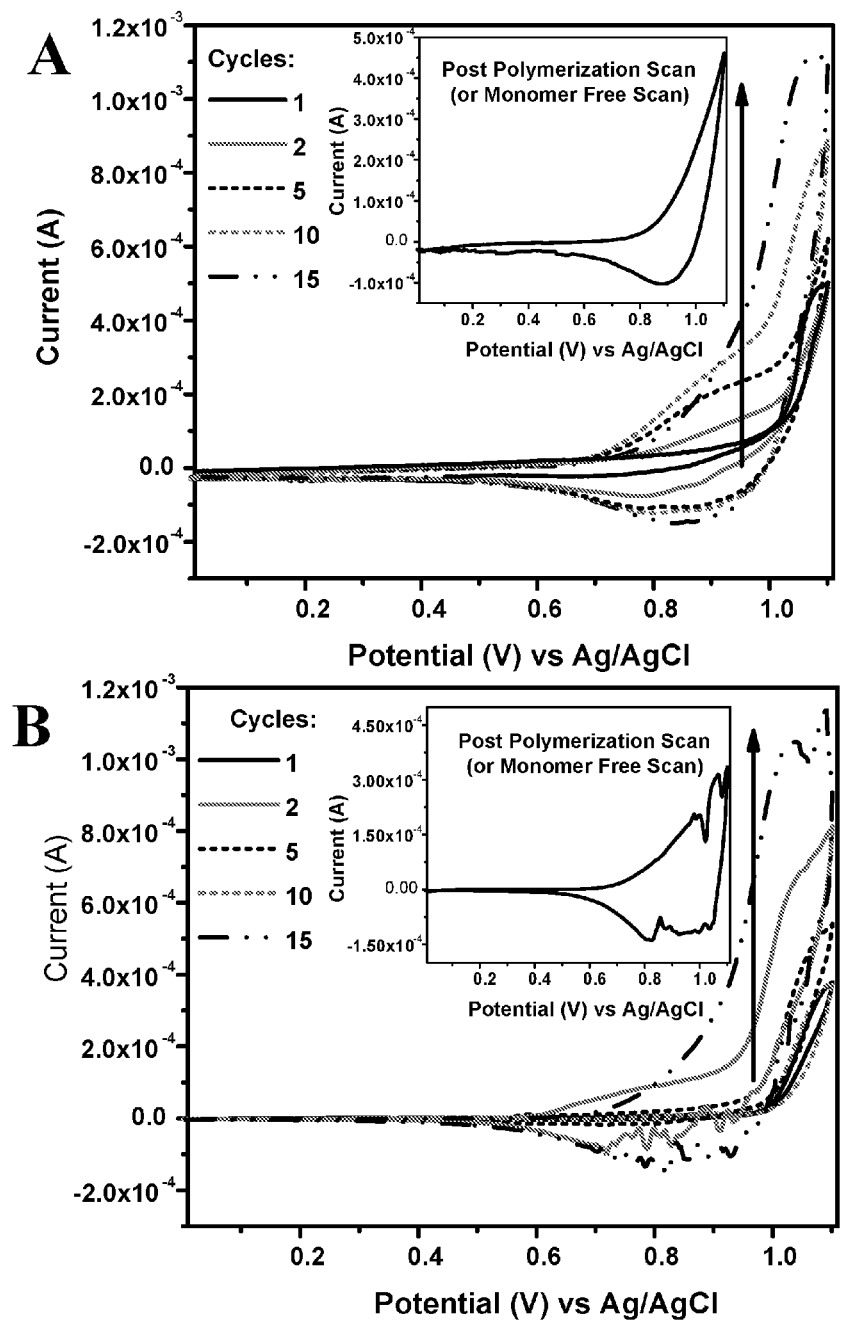

To create a surface energy controlled and morphologically nanostructured polythiophene film, a two-step approach was applied starting with the latex assembly of polystyrene (PS) nanoparticles onto a flat conducting substrate. This created a 2D surface with high regularity of PS ordering. A highly-ordered and closely-packed monolayer assembly of the colloidal crystals in hexagonal packing arrangement is shown in FIG. 15B-D of various nanoparticle sizes. The monolayer ordering of the spherical nanoparticles had been previously reported to be dependent on the vertical withdrawing speed of the LB-like technique and the concentration of the nanoparticles and surfactant (sodium n-dodecyl sulfate or SDS) in solution.[14] To complete the formation of the nanostructured film, this was then followed by a cyclic voltammetric (CV) electrodeposition as shown in FIG. 16 of the polythiophene film (structure in FIG. 15A). After washing with a solvent similar to that used for CV, the film was characterized and immediately investigated for its wetting behavior. For compositions, the attenuated total reflectance infrared (ATR IR) spectra are shown FIG. 17 confirms the electrodeposition of the polythiophene or poly(G0-3TCOOR) atop the layer of PS nanoparticle as shown by the characteristic peaks of poly (thiophene): C=O stretch (1729 $cm^{-1}$), linear CH stretch (2847-3028 $cm^{-1}$), aromatic CH stretch (3035-3161 $cm^{-1}$), C=C stretch (~1660 $cm^{-1}$) and O—C stretch (~1275-1391 $cm^{-1}$). Moreover, the FT-IR imaging in micron scale (FIG. 15E and 15F) reveals a high amount of C—H functional groups (FIG. 15G) on the surface (dominance in the dark gray or green color region, FIG. 15E), which occurs in the region of 2829-3159 $cm^{-1}$ (average of several measurements on different regions). Also, the C=O signature peak (FIG. 15H) of poly(G0-3TCOOR) is more pronounced in the light gray (blue color) region and minimally present in some areas of the dark gray (green colored) region. Thus, from the IR chemical map (FIG. 15E), a high or complete coverage of poly(G0-3TCOOR) is achieved on the surface. Also, the as-prepared polymeric surface is rough, as clearly seen in the IR 3D image (FIG. 15F).

Referring to FIGS. 18A-G, contact angle measurements of poly(G0-3TCOOR) onto 500 nm PS/Au in (A) water, (B) diiodomethane, and (C) hexadecane are shown; while (D) shows low 24×36 mm and (E) high magnification SEM images of poly(G0-3TCOOR) onto 500 nm PS/Au at 4×3 mm. Also a distinction between the: (F) Doped (1.05 V, 30 mins), and (G) dedoped (0 V, 30 mins) morphologies at wide area of 800×900 μm. Sub-micron scale roughness can be observed in FIG. 19.

As shown in FIG. 18A, a superhydrophobic film is created as evidenced by the high advancing ($\theta_{adv}$) and receeding ($\theta_{rec}$) contact angle values of 154°±1 and 151°±1, respectively. Similarly, the film attains a water contact angle of 154°±1 in static measurements. With a very low hysteresis ($\theta_{adv}$ minus $\theta_{rec}$) of only ~3°, the film is expected to exhibit a self-cleaning effect. To validate this claim, the film was tested by dropping the water (~1-2 μL) onto its surface when the substrate was inclined at a very low angle (as shown in FIG. 20). The water droplet freely rolls off the surface at the sliding angle of 2°±1. These evidences suggest that the superhydrophobic nanostructured film behaves along the Cassie-Baxter model[15,16] (Equation II.1), which describes the liquid droplet to be sitting and not pinned atop the nanocomposite surface of the solid protuberances and air:

$$\cos\theta^* = -1 + \phi_s(1 + \cos\theta)$$

where $\theta^*$ is defined as the apparent contact angle, $\theta$ as equilibrium contact angle, and $\phi_s$ as the fraction of solid-liquid contact. This model assumes that a certain percentage of the liquid-solid interface is replaced with a liquid-gas interface.[15] The artificial superhydrophobic surface reveals a hierarchical roughness that comprises of a regular globular structures (>500 nm size) smeared with smaller nanometer scale asperities (FIG. 18D and FIG. 19). Foam-like structures are also seen in the morphology, which are typical for polymer coatings fabricated under these controlled conditions.[16] Moreover, the SEM images divulge that the polythiophene converges or aggregates around the PS particles creating nanometer roughness (FIG. 18E). The importance of the underlying layer PS particles to enable superhydrophobicity is demonstrated by measuring the contact angle of an electropolymerized film (poly(G0-3TCOOR)) on planar Au substrate without the colloidal nanoparticles. This film depicts a water contact angle of only 103°±1 (FIG. 21). On the other hand, the contact angle augments to 111°±1 when the same polymer film was electrodeposited even onto the layers of disordered 100 nm PS particles on Au substrate. Thus, the contact angle increases with increasing roughness as augmented by the PS particles even at this size and organization. This trend is also observed with the electropolymerization of a more hydrophilic polythiophene (poly(G03TCOOH) e.g., contact angle has increased to 140°±4 from 32°±1. These results further validate the behavior of the film following the Cassie-Baxter model since both hydrophilic (poly(G03TCOOH) on Au) and hydrophobic (poly(G0-3TCOOR) on Au) films has shown a considerable increase in contact angle. The increase in contact angle has been explained to be a contribution of surface roughness and air cavities that are trapped between the droplet and solid surface minimizing the contact area.[17] This is unlike the Wenzel's model (Equation II.2),[16,18] which suggests that the contact angle of the surface will increase or decrease upon surface texturing when the original surface (without roughness) is hydrophobic (water contact angle (WCA)>90°) or hydrophilic (WCA<90°), respectively:[17]

$$\cos\theta^* = r\cos\theta \qquad (II.2)$$

where r is defined as the ratio of the actual over apparent surface area of the substrate. Note that the superhydrophobicity is not attained with the layers of 500 nm PS particles alone (WCA~46°±1) and even with the hydrophilic electropolymerized film (poly(G03TCOOH) onto the layers of 500 nm PS particles (140°±4). These results confirm that the superhydrophobicity is due to the synergistic effect of the two important factors namely: (1) hierarchical roughness, which are the nanometer scale asperities within the sub-micron scale geometrical structures and (2) low surface energy on the surface, both attributes that have been found in a lotus leaf.[1,3]

Figure 22B:
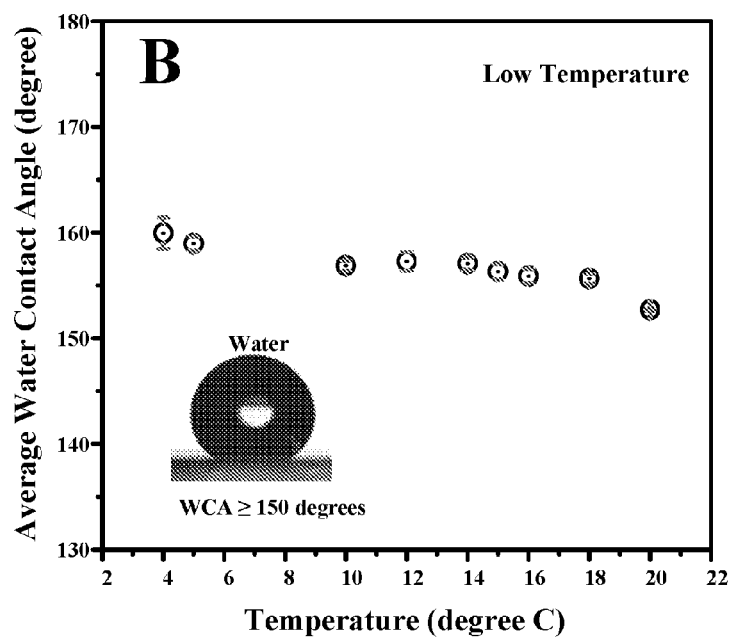

Interestingly, the film maintains its superhydrophobicity even with high (~80° C.) and low (~4° C.) temperatures of water (FIG. 22), which is not easily attained by many artificial superhydrophobic polymer surfaces. With this behavior, the film may find potential applications particularly in thermal and anti-ice adhesion coatings (to be explored in future). The film also shows a strong repellency to water (WCA>150°) at very low (pH ~1.0) and very high (pH ~13.0) pH values, such as in a corrosive environments (Table II.1).

TABLE II.1

Static Water Contact Angle Measurements
of the Superhydrophobic Film
(poly(G0-3TCOOR) onto 500 nm PS layer on Au)
at Different pH Values of Water

| pH | $\theta_{Left}$ (degree) | $\theta_{Right}$ (degree) |
|---|---|---|
| 1.00 | 151 ± 1 | 151 ± 1 |
| 2.08 | 153 ± 1 | 151 ± 1 |
| 2.92 | 151 ± 1 | 153 ± 2 |
| 4.05 | 153 ± 3 | 153 ± 3 |
| 5.02 | 151 ± 2 | 151 ± 1 |
| 6.14 | 152 ± 2 | 153 ± 1 |
| 7.08 | 153 ± 1 | 153 ± 3 |
| 8.78 | 154 ± 1 | 154 ± 1 |
| 9.98 | 151 ± 1 | 151 ± 1 |
| 11.02 | 154 ± 1 | 152 ± 1 |
| 12.00 | 151 ± 2 | 152 ± 2 |
| 13.07 | 151 ± 2 | 151 ± 1 |

Thus, the film has attractive properties for potential applications to many industrial and marine coatings. Moreover, the superhydrophobicity of the nanostructured film can be sustained for a longer period of time about >146 days. This is done by measuring repeatedly over time the water contact angle of the same film, which was kept under dry and ambient conditions. The fabrication scheme was also reiterated by electropolymerization of commercially available thiophene monomer derivatives to form poly(bithiophene), poly(terthiophene), and poly(3,4-ethylenedioxythiophene) onto the layers of 500 nm PS particles. The electropolymerization of the synthesized monomer of terthiophene-ester derivatives or G0-3TCOOR (see Scheme II.1) shows superior quality that exhibits longer superhydrophobicity compared to the commercially available monomers (FIG. 23). The pre-grafted ester moieties of the terthiophene electropolymerizable pendant group may have contributed to the formation of a rougher and porous surface. Moreover, no fluorination or silane treatment was employed unlike most reported schemes for superhydrophobic surfaces including the use of conducting polymers.[9,17,19]

The same film was also examined for static contact angle measurements in diiodomethane ($\equiv_L$=50.0 mN/m) and hexadecane ($\gamma_L$=27.6 mN/m). These are commonly used solvents to test for surface oleophobicity (oil resistance) with surface tension ($\gamma_L$) much lower than water ($\gamma_L$=72.8 mN/m).[9] Interestingly, this superhydrophobic films also exhibited superoleophilic character (thus coexistence of superhydrophobic and superoleophilic) as shown by the nil contact angle values in both organic solvents (FIG. 16B and 16C)—a rare and unique property exhibited by the same surface. This means that the film may be useful for the selective separation of organic solvents or oils in an organic solvent or oil and water mixtures. The real time video clip of the contact angle measurements clearly demonstrates the strong defiance of the film to water and complete intake of the hexadecane and diiomethane (FIG. 24).

Referring now to FIGS. 25A-C, reversible wettability and electro-optical properties are shown. FIG. 25A shows static water contact angle analysis of poly(G0-3TCOOR) on PS-templated Au (solid line) and poly(G0-3TCOOR) on bare Au (broken line) via potential switching between 1.05V (doping) and 0V (dedoping) are shown. FIG. 25B shows UV-Vis measurements of the doped (light gray orange colored film) and dedoped (dark gray or dark green colored film) poly(G0-3TCOOR) electrodeposited on ITO are shown. FIG. 25C shows XPS survey scans of the doped (broken line curve) and dedoped (solid line curve) film are shown. Note the doping and dedoping of the films were carried out in ACN with the supporting electrolyte (0.1 M TBAH) using the same electrochemistry set-up (FIG. 15A) having three electrode system with the electrodeposited film on Au as the working electrode.

One of the many advantages of using a conducting polymer for coatings is possibility to control the wettability and electro-optical properties of the surface at the same time. In principle, this can be done simply by adjusting the electrical potential, which may be a faster way (e.g., ~few seconds) to switch surface wettability unlike other methods, which require high temperature, UV irradiation, change in chemical composition of surface, or surfactant treatment.[20] This dual property is of significant interest in switchable wettable surfaces for applications in dual smart or stimuli-responsive devices such as intelligent microfluidic switches, semiconductor transparent coatings, sensors, electrochromic devices, and so on.[17,20] Previously, Lahann et al.[21] demonstrated reversibly wettable switching surfaces by controlling the electrical potential of a low dense carboxylate-terminated self-assembled monolayer (SAM)s on Au surface. However, the change in surface wettability is small (~20°), which limits its practical applications and possibly regenerability. Also, Manukyan et al.[22] recently reported the local reversible switching of wetting states (from Cassie-Baxter state to Wenzel state and reverse) in a superhydrophobic surface using an electrical potential. Nevertheless, a dramatic change in the surface wettability of their film was not illustrated.

FIG. 25A shows the significant change in the wettability of the poly(G0-3TCOOR) film upon changing the electrical potential ex-situ, which is reversible for several cycles. Upon application of 1.05 V (doping) using the same electrochemistry set-up with the three electrode system on FIG. 15A, the superhydrophobic film becomes hydrophilic (~60°) with a dramatic decrease in water contact angle by more than 90°. Similarly, the contact angle of the poly(G0-3TCOOR) on Au (control film) has changed from ~100° to ~60° (CA change by 40°). These results demonstrate that increasing the surface roughness amplifies the contact angle switching range. We attribute the change in the wettability of the surface primarily to be due to the significant changes in its surface morphology or surface roughness as a result of the doping and dedoping of the conducting polymer.[23] This is clearly observed in the wide scan SEM images. For instance, a rougher and highly porous surface is seen with the dedoped film (FIG. 18G), resulting to greater volume of trapped-air (Cassie-Baxter model). At the same time, the surface of the dedoped film contains smaller hierarchical roughness of the submicron range (FIG. 18D and 18E and FIG. 19). Upon doping such as the application of 1.05 V, the poly(thiophene) film may have possibly collapsed and the counter ions may have occupied the pores, and thus the surface is seen to be relatively less rough (FIG. 18F). Then upon dedoping the conducting polymer such as the application of 0 V, its morphology with a very rough and porous surface is restored (FIG. 18G) as a result of the removal of the counter ions, and hence the film returns to its superhydrophobic state with water contact angle greater than 150° (FIG. 25A). To briefly explain the doping process, the conducting polymer will become positively charged due to the removal of an electron from the polymer backbone upon application of a constant oxidation potential by an electrochemical methods e.g., potentiometry, and hence it will accept negatively charged counter ions (called dopants) from the bulk solution to maintain its neutrality.[24,25] Further, upon dedoping such as the application of a constant zero potential, the conducting polymer will eventually return to its neutral state, and therefore will eject the counter ions back into the solution.[24,25] The said doping/dedoping process was validated by X-ray Photoelectron Spectroscopy (XPS), wherein the negatively charged counter ion (in this case $PF_6^-$ from the TBAH supporting electrolyte) was confirmed to be present only in the wettable polymer nanostructured film state during doping as shown by the presence of the fluorine (F 1s) and phosphorus (P 2p) peaks (FIG. 25C).[26] The high resolution XPS scans clearly show that these unique elemental peaks (due to the dopant) are present only in the wetting film, but are not found in the non-wetting polymer film state after dedoping at 0V (FIG. 26). Thus, the superhydrophobic property is actually observed on a non fluorinated film, which is rare compared to most artificial superhydrophobic surfaces previously reported.

The change in wettability is also accompanied by the change in the optical property of the nanostructured film as observed by the electrochromism of the poly(G0-3TCOOR) film (FIG. 25B, right inset). The electropolymerized film has a distinct orange color that changes to dark green upon doping. Note that the change in color of the film occurs about 1-2 seconds after applying a doping potential of 1.05 V. Similar to the wetting behavior, the switching in color from orange to dark green is reversible for several cycles. To understand more about this behavior of the conducting polymer, the same poly(G0-3TCOOR) film was electrodeposited on ITO in order to conduct spectroelectrochemistry during the doping and dedoping process. The poly(G0-3TCOOR) film at neutral state (dedoped) shows a $\lambda_{max}$ at 440 nm (FIG. 25B), which is known to be the TC-π-π* transition of the poly(thiophene).[27] Upon doping (1.05 V), the poly(G0-3TCOOR) film depicts a broad band between 600 to 800 nm range (FIG. 25B), which is due to the formation of radical cations (called polarons).[28] Also, the doping is further evidenced by the increase[29] in conductivity of the poly(G0-3TCOOR). The bulk conductivity of the film is determined from the resistance using a four-point probe and thickness using a profilometry (Table II.2).

TABLE II.2

Summary of Thickness and Conductivity Measurements of the Film

| Electropolymerized Film | Thickness[1] (μm) | Resistivity[2] ohm/square) | Conductivity (Siemens/cm) |
|---|---|---|---|
| 5 mM G0-3TCOOR on Bare Au CV: 5 mM/s, 15 cycles, 0 V to 1.1 V | 4-12 | 184.21 | 4.52-13.57 |
| 5 mM G0-3TCOOR on PS coated Bare Au CV: 5 mM/s, 15 cycles, 0 V to 1.1 V | 2.5-6.5 | 362.56 | 4.24-11.03 |
| 5 mM G0-3TCOOR on PS coated Bare Au CV: 5 mM/s, 15 cycles, 0 V to 1.1 V Apply +1.05 V, 30 mins | 2.5-6.5 | 166.17 | 9.25-24.07 |
| 5 mM G0-3TCOOR on Bare Au CV: 5 mM/s, 15 cycles, 0 V to 1.1 V Apply +0.85 V, 30 mins | 2.5-6.5 | 308.18 | 4.99-12.98 |

Notes:
[1]Thickness measured using profilometry at different areas (at least 10 areas) of the films.
[2]Resistivity measured using Four-Point Probe at different areas (at least 10 areas) of the films.

Upon applying a doping potential (1.05 V), the conductivity of the film (poly(G0-3TCOOR) onto 500 nm PS layer on Au) has increased to values between 9.25-24.07 S cm$^{-1}$ (doped) from 4.24-11.03 S cm$^{-3}$ (dedoped film). The measured thickness of this film is in the range of 2.5 to 6.5 μm.

Referring now to FIGS. 27A-D, contact angle measurements of poly(G0-3TCOOR) onto 500 nm PS coated Au in (A) water before and after spin coating of S 760P in (B) water, (C) hexadecane, and (D) diiodomethane are shown.

Finally, as an extension of this work, a facile and rapid approach of converting the superhydrophobic-and-superoleophilic nanostructured film (state 1) into the superhydrophilic-and-oleophobic (state 2), i.e., completely reversing the order of wetting, was also demonstrated. At either states of the film, separation of oils or organic solvents from water or vice versa in an oil or organic solvent and water mixture using the film should be possible. The switching of the wettability was done by merely spin coating a commercially available fluorinated surfactant (S 760P) as shown in FIG. 27A inset.

Clearly, the superhydrophobic-and-superoleophilic nanostructured film is instantly converted into superhydrophilic (zero water contact angle) without further surface treatments and modifications (FIG. 27B). Also, this nanostructured film then becomes oleophobic (as opposed to superoleophilic prior to the surfactant treatment) since a contact angle≥90° is shown with hexadecane (FIG. 27C) and diiodomethane (FIG. 27D). The oleophobicity of the nanostructured film is not only due to the combined effect of the hydrophobic polymer (poly(G0-3TCOOR) and presence of the underlying PS nanoparticles (FIG. 29), but also with the presence of the fluorinated surfactant (S 760P). The fluorinated surfactant treatment results in a hydrophilic and oleophilic wetting behavior since the water and organic solvents (hexadecane and diiodomethane) contact angles of the spin coated surfactant on flat Au are 0°, ~0°, and 33°±1, respectively. Moreover, this process of surfactant incorporation might be influenced by the morphology and the presence of cracking on the doped film (FIG. 29). Current effort is underway to understand the role of other surfactants and to develop a superoleophobic film using the same methodology.

In conclusion, a non-flourinated superhydrophobic-and-superoleophilic polythiophene film with simultaneous and reversible potentially-induced wetting (switching from >150° to <60° for several cycles) and electrochromic (switching from orange to dark green color of the surface also for several cycles) properties was fabricated for the first time using a facile and innovative approach of combining the LB-like technique and electropolymerization process. The fabricated nanostructured surface with unique dual wetting properties demonstrated superhydrophobicity at very low (<5°) and high (>70°) temperatures, very low (pH 1) and high (pH 13) pH values, and for longer times (~150 days). Furthermore, the as-prepared superhydrophobic-and-superoleophilic (state 1) nanostructured surface is also easily reversed to a superhydrophilic-and-oleophobic (state 2) surface simply by spin coating of a commerically available surfactant (S 760P). At either states of the surface, separation of oils or organic solvents from water and vice versa in an oil or organic solvent and water mixture is feasible. Thus, this study may prove particularly useful in the effective removal of oil and organic solvents for water recycling. It may also find many practical applications as coatings for anti-ice adhesion, marine coatings, anti-corrosion, stimuli responsive surfaces such as intelligent microfluidic switches, etc. Several of these applications are currently being pursued by our group.

Experiments of Section II

Materials

Polystyrene (PS) latex particles (2.5 wt % solids in aqueous suspension) are purchased from Polysciences, Inc. and were used without further purification. Acetonitrile (ACN), sodium n-dodecyl sulfate (SDS), and tetrabutylammonium hexafluorophosphate (TBAH) were obtained from Sigma-Aldrich. The glass slides (BK 7) were acquired from VWR. The gold surface was prepared by thermally evaporating gold (50 to 100 nm thick) under high vacuum (10$^{-6}$ bar) onto a BK 7 glass slide with chromium adhesion layer (~10 nm thick). The Cr and Au depositions were done at a rate ~0.4 Å sec$^{-1}$ and ~1.1 Å sec$^{-1}$, respectively, using a thermal evaporator (Edwards). The deionized water (resistivity ~18 mΩ·cm) used for the dilution of PS particles was purified by a Milli-Q Academic® system (Millipore Cooperation) with a 0.22 micron Millistack filter at the outlet. The fluorinated surfactants (S 760P) were obtained from Chemguard, Inc. The monomers used in the electrochemical polymerization were synthesized in our laboratory. And the details of the synthesis of ethyl 2-(2,5-di(thiophen-2-yl)thiophen-3-yl)acetate (Monomer 1, G03TCOOR where R=CH$_2$CH$_3$), and 2-(2,5- di(thiophen-2-yl)thiophen-3-yl)acetic acid (Monomer 2, G03TCOOH) are described below (Scheme II.1).

Synthesis of the Monomers

Synthesis of ethyl 2-(2,5-di(thiophen-2-yl)thiophen-3-yl)acetate (G03TCOOR, where R=CH$_2$CH$_3$)

The synthesis of G03TCOOR was carried out by first synthesizing ethyl 2-(2,5-dibromothiophen-3-yl)acetate as reported in the literature.[30] $^1$H NMR (CDCl$_3$): 6.94 (s, 1H), 4.17 (q, 2H, J=7.15 Hz), 3.55 (s, 2H), 1.27 (t, 4H, J=7.14 Hz) as shown in FIG. 28.

The procedure described by Taranekar et al[30] was modified to synthesize G03TCOOR. Ethyl 2-(2,5-dibromothiophen-3-yl)acetate (6.4 g, 10 mmol) and 2-(tributylstannyl) thiophene (1.5 g, 20 mmol) were added to a 30 mL dry dimethylformamide (DMF) solution of dichlorobis(triphenylphosphine)palladium (Pd(dpp)Cl$_2$) (1.3 g, 1.5 mmol). After three freeze thaw cycles, the mixture was heated at 100° C. for 48 hr. The mixture was cooled to room temperature and poured into a beaker containing 150 mL of water and subsequently extracted with CH$_2$Cl$_2$. The extracted CH$_2$Cl$_2$ mixture was dried with Na$_2$SO$_4$. After filtration and evaporation of the solvent, the crude product was purified by chromatography on silica gel using toluene as an eluent. The final product was obtained in 85% yield as pale yellow oil. The characterization of the compound was found in accordance with the literature.[1] $^1$H NMR (CDCl$_3$): δ 6.8-7.2 (m, 7H), 4.19 (q, 2H, J=7.15 Hz), 3.72 (s, 2H), 1.27 (t, 41-1, J=7.14 Hz) as shown in FIG. 29.

A total of 4 g of G03TCOOR was dissolved in methanol and added to a 20% aqueous sodium hydroxide solution (200 mL). The mixture was then refluxed for 4 hr. After removal of methanol, the aqueous solution was washed with ether, acidified with concentrated HCl to pH 1.0 and extracted by ether. The ether solution was washed several times with water and evaporation of ether yielded 3.4 g G03TCOOH. The characterization of the compound was found in accordance with the literature[2] as shown FIG. 30.

Instrumentation

Electrochemistry

Cyclic voltammetry was performed in a fabricated electrochemical cell (Teflon-made, with a diameter of 1.0 cm and volume of 0.785 cm$^3$) using a conventional three-electrode cell using an Autolab PGSTAT 12 potentiostat (MetrOhm, USA). The potentiostat is controlled by GPES software (version 4.9).

Static and Dynamic Contact Angle

The static contact angle measurements were done using a CAM 200 optical contact angle meter (KSV Instruments Ltd) with CAM 200 software. The experiment was carried out by slowly moving upward the sample stage with the sample on top to come into contact with the liquid droplet (~1 µL) that was suspended at the tip of the micro syringe (200 µL). When using water for contact angle measurements for the superhydrophobic surface, the sample was only brought at a distance of few millimeters below the water droplet, and then the droplet was carefully released to the surface. Unlike the other solvents, the water droplet will not adsorb or fall from the tip of the needle when in contact with the as-prepared superhy-

SCHEME II.1

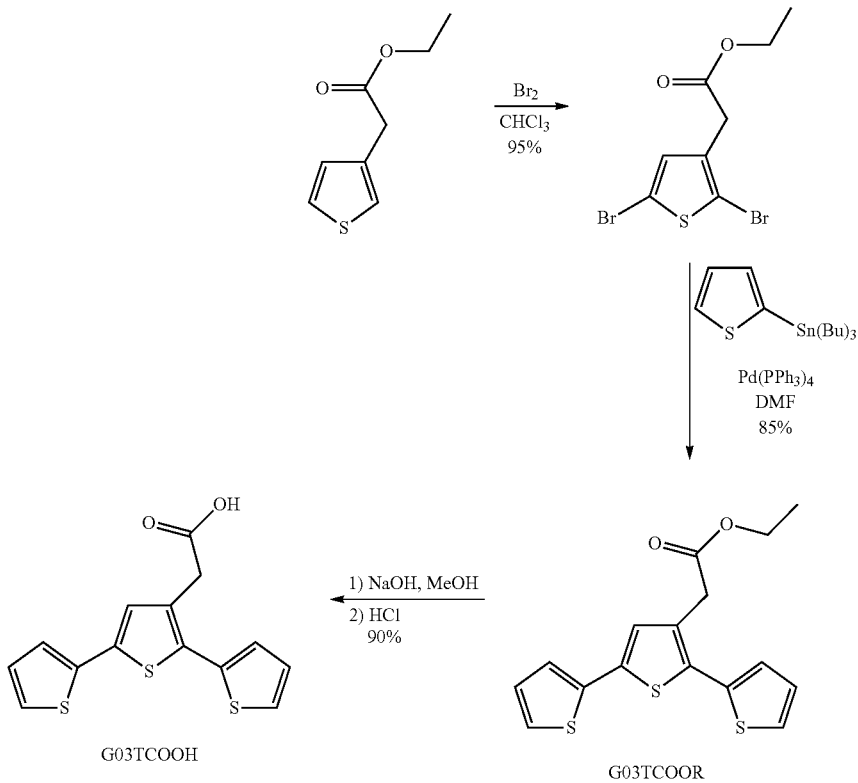

Synthesis of 2-(2,5-di(thiophen-2-yl)thiophen-3-yl)acetate (G03TCOOH) and
ethyl 2-(2,5-di(thiophen-2-yl)thiophen-3-yl)acetate (G03TCOOR, where R = CH$_2$CH$_3$)
Synthesis of 2-(2,5-di(thiophen-2-yl)thiophen-3-yl)acetic acid (G03TCOOH)

drophobic surface of poly(G0-3TCOOR)/PS (500 nm size) coated substrate. The reading of the contact angle was done after 30 seconds when the droplet has been made into the surface, and at least three trials were performed at various positions of the nanostructured surface. The solvents used for contact angle measurements were Milli-Q water, hexadecane and diiodomethane. For dynamic contact angle measurements, the angles were measured using a Ramé-Hart model 100 contact angle goniometer. The liquids were dispensed and withdrawn using a Matrix Technologies micro-Electrapette 25. Contact angles were collected and averaged from measurements on four distinct slides using three separate drops per slide. FIG. 31 shows the results of the static contact angle measurements.

Profilometry

The thickness of the nanostructured films was acquired by surface profilometry using the Alpha-Step 200 profilometer. The Alpha-Step 200 accurately measures surface profiles below 200 Å and up to 200 µm. A low stylus force of 5 mg was used during the scanning to avoid damaging or scratching the polymer surface. The measurements were done at least 10 times on different areas of the film under ambient and dry conditions.

Atomic Force Microscopy (AFM)

AFM analysis was carried out in a piezo scanner from Agilent Technologies. The scanning rate was between 0.8-1.5 lines/s. Commercially available tapping mode tips (TAP300, Silicon AFM Probes, Ted Pella, Inc.) were used on cantilevers with a resonance frequency in the range of 290-410 kHz. The scanning of the PS coated Au and ITO was performed under ambient and dry conditions. All AFM topographic images (AAC tapping mode) were filtered and analyzed by using Gwyddion software (version 2.19). Note: Only the PS coated substrates were scanned in the AFM. Because of the formation of very rough surfaces, the electropolymerized films on PS coated substrates were then scanned in the SEM.

Four-Point-Probe

The conductivity measurements were determined with a four point probe technique using the Keithley 2700 Multimeter Intergra Series. All films were measured at least five times on different area under ambient and dry conditions.

Attenuated Total Reflectance Fourier Transform Infrared (ATR-FTIR)

The ATR FTIR spectra were obtained on a Digilab FTS 7000 equipped with a HgCdTe detector from 4000 to 600 (cm-1) wavenumbers. All spectra were taken with a nominal spectral resolution of 4 $cm^{-1}$ in absorbance mode. All films were measured under ambient and dry conditions.

FTIR Imaging

FT-IR imaging was performed on a Digilab Stingray imaging system consisting of a Digilab FTS 7000 spectrometer, a UMA 600 microscope, and a 32×32 mercury-cadmium-telluride IR imaging focal plane array (MCT-FPA) image detector with an average spatial area of 176 µm×176 µmin transmission mode. An 8 $cm^{-1}$ nominal spectral resolution and an under sampling ratio (UDR) of 4 for the imaging were set up, and the spectral data were collected with 1240 scans. All image processing and data extraction were obtained using the Win-IR Pro 3.4 software package.

Scanning Electron Microscopy

The morphology of the samples was examined by field emission scanning electron microscopy (FE-SEM) using a JSM 6330F JEOL instrument operating at 15 kV. Prior to SEM analysis, the films were thoroughly dried under vacuum for at least 24 hrs.

Instrumentation and Analysis

CV was performed in a fabricated electrochemical cell (Teflon-made, with a diameter of 1.0 cm and volume of 0.785 $cm^3$) using a conventional three-electrode cell using an Autolab PGSTAT 12 potentiostat (MetroOhm, Inc). AFM measurements were done on a PicoScan 2500 AFM from Agilent Technologies using tapping mode with scanning rate between 1-1.5 lines/s. Commercially available tapping mode tips (TAP300-10, silicon AFM probes, Tap 300, Ted Pella, Inc) were used on cantilevers with a resonant frequency in the range of 290-410 kHz. All AFM topographic images were filtered and analyzed using the Gwyddion software (version 2.19). Static water contact angle (WCA) measurements were accomplished on a CAM 200 optical contact angle meter (KSV Instruments Ltd). Note that the WCA value was acquired only when the water droplet was dropped at a relatively far distance (ca 0.3 cm) away from the surface since no reading can be measured if the droplet is to come into contact with the substrate. For dynamic contact angle measurements, the angles were measured using a Ramé-Hart model 100 contact angle goniometer. The liquids were dispensed and withdrawn using a Matrix Technologies micro-Electrapette 25. Contact angles were collected and averaged from measurements on four distinct slides using three separate drops per slide. XPS measurement (at take off angle of 45° from the surface) were carried out on a PHI 5700 X-ray photoelectron spectrometer with a monochromatic Al Ka X-ray source (hn=1486.7 eV) incident at 90° relative to the axis of a hemispherical energy analyzer. The ATR IR spectra of the film on Au and ITO substrate were obtained on a Digilab FTS 7000 equipped with a HgCdTe detector from 4000 to 600 ($cm^{-1}$) wavenumbers with a nominal spectral resolution of 4 $cm^{-1}$ in absorbance mode. FT-IR imaging was performed on a Digilab Stingray imaging system consisting of a Digilab FTS 7000 spectrometer, a UMA 600 microscope, and a 32×32 mercury-cadmium-telluride IR imaging focal plane array (MCT-FPA) image detector with an average spatial area of 176 µm×176 µm in transmission mode. SEM analysis was done in field emission scanning electron microscopy (FE-SEM) using a JSM 6330F JEOL instrument operating at 15 kV. Profilometry of model Alpha-Step 200 was used to measure the thickness of the polymeric surface. A low stylus force of 5 mg was used during the scanning to avoid damaging the polymer surface. The conductivity measurements were determined with a four point probe technique using the Keithley 2700 Multimeter Intergra Series. Complete details about the instrumentation are found in the supporting document.

Film Preparation

The superhydrophobic-and-superoleophilic conducting surface was fabricated by simple two-step process such as (1) layering of PS latex microbeads onto conducting substrates like Au and ITO slides, and (2) electropolymerization of the monomer into the PS-coated slides. The layering of PS latex beads was prepared using a similar procedure described earlier by Grady and co-workers.[14] The substrate was attached vertically into the dipper motor via a Teflon clip and was dipped into a solution of PS particles (1 wt % in Milli-Q water) and SDS (34.7 mM) as spreading agent. The substrate was then withdrawn vertically from the solution at a lift-up rate of 0.1-0.3 mm/s. The substrate was then dried by suspending it in air for a few mM. After the layering of the latex spheres, the monomer (5 mM G0-3TCOOR in ACN with 0.1 M TBAH as supporting electrolyte) was electropolymerized onto the PS-coated substrate (Au or ITO) as the working electrode in a standard three electrode measuring cell with platinum (Pt) wire as the counter electrode and Ag/AgCl wire as the reference electrode. The electropolymerization was done using CV technique in a fabricated electrochemical cell (Teflon made). The potential was scanned between 0 V to 1.1 V (and also 0V to 1.5 V) for 15 cycles at a scan rate of 5 mV/s. Note that the use of very slow scan rate will result to the formation of thicker polymer coatings. Also, it is also possible to do this deposition of polymer by chronoamperometric or potentiostatic methods. After electrodeposition, the film was thoroughly washed in ACN (at least 3 times) to remove the excess monomer and loosely adsorbed polymer or oligomer, and a monomer free scan (in a solution of ACN with 0.1 M TBAH as supporting electrolyte) was performed by using exactly the same electrochemistry set-up (FIG. 15A) and settings but for 1 CV cycle only. Finally, the electropolymerized film was thoroughly dried in vacuum for at least 1 hr prior to any characterizations. To perform the doping and dedoping of the conducting polymer, a constant potential was applied to the film when it is immersed into the ACN with the supporting electrolyte (0.1 M TBAH). The same electrochemistry set-up on FIG. 15A with the three electrode system (electropolymerized colloidally template substrate as working electrode, Pt wire as counter electrode, and Ag/AgCl wire as reference electrode) was used for the application of the constant potential of 0V (dedoping) and 1.05 V (doping). A normal beaker instead of the fabricated electrochemistry cell can also be used to do the experiment. To convert the superhydrophobic-and-superoleophilic nanostructured film into superhydrophilic-and-oleophobic as an extension work, a fluorinated surfactant (S 760P) was spin coated on top of the film. The spin coating was done 2 times at 4000 rpm for 120 sec followed by drying the film in vacuum for at 1 hr.

Surfactant Information on S760P

It is a class of commercially available perfluoro derivatives with CAS#s. It is a mixture of these two: CAS 65530-72-5 has a chemical name of Poly(difluoromethylene), alpha-fluoro-omega-(2-(phosphonooxy)ethyl)-, diammonium salt. CAS 65530-70-3 has a chemical name of Poly(difluoromethylene), |alpha-fluoro-|omega-(2-((2-methyl-1-oxo-2-propenyl)oxy)ethyl).

We also used a mixture of PFOA=perfluorooctanoic acid and DCC=dicyclohexylcarbodiimide, but did not report the results here. It also worked, but not as hydrophilic as the first two. In which case, we see that the mixture of any of these perfluorinated surfactants or its class will give different degrees of reversibility of wetting behavior.

REFERENCE CITED IN SECTION II

The following references were cite in the section of the specification:
1 C. Barthlott, C. *Planta* 1997, 201, 1.
2 R. Blossey, *Nature Mater.* 2003, 2, 301-306.
3 L. Feng, S. H. Li, Y. S. Li, H. J. Li, L. J. Zhang, J. Zhai, Y. L. Song, B. Q. Liu, L. Jiang, D. B. Zhu, *Adv. Mater.* 2002, 14, 1857.
4 T. Nishino, M. Meguro, K. Nakamae, M. Matsushita, Y. Ueda, *Langmuir* 1999, 15, 4321.
5 M. Houde, J. W. Martin, R. J. Letcher, K. R. Solomon, D. C. G. Muir, *Environ. Sci. Technol.* 2006, 40, 3463.
6 J. P. Giesy, K. Kannan, *Environ. Sci. Technol.* 2001, 35, 1339.
7 B. L. Upham, N. D. Deocampo, B. Wurl, J. E. Trosko, *Int. J. Cancer* 1998, 78, 491.
8 A. K. Sohlenius, A. M. Eriksson, C. Hogstrom, M. Kimland, J. W. DePierre, *Pharmacol. Toxicol.* 1993, 72, 90.
9 a) K. Chiba, K. Kurogi, K. Monde, M. Hashimoto, M. Yoshida, H. Mayama, K. Tsujii, *Colloids Surf A* 2010, 354, 234; b) T. Darmanin, F. Guittard, *J. Am. Chem. Soc.* 2009, 131, 7928; c) T. Darmanin, F. Guittard, *J. Mater. Chem.* 2009, 19, 7130.
10 a) T. Darmanin, E. T. de Givenchy, S. Amigoni, F. Guittard, *Langmuir* 2010, 26, 17596; b) K. Kurogi, H. Yan, H. Mayama, K. Tsujii, *J. Colloids Interfaces Sci.* 2007, 312, 156; c) H. Yan, K. Kurogi, H. Mayama, K. Tsujii, *Angew. Chem. Int. Ed.* 2005, 44, 3453.
11 J. Roncali, *Chem. Rev.* 1992, 92, 711.
12 T. L. Sun, L. Feng, X. F. Gao, L. Jiang, *Acc. Chem. Res.* 2005, 38, 644.
13 U. Lange, N. V. Roznyatouskaya, V. M. Mirsky, *Ana. Chim. Acta* 2008, 614, 1.
14 M. Marquez, B. P. Grady, *Langmuir* 2004, 20, 10998.
15 A. B. D. Cassie, S. Baxter, *Trans. Faraday Soc.* 1944, 40, 546.
16 A. Steel, I. Bayer, E. Loth, *Nano Lett.* 2009, 9, 501.
17 X. Feng, L. Jiang, *Adv. Mater.* 2006, 18, 3063.
18 R. W. Wenzel, *Ind. Eng. Chem.* 1936, 28, 988.
19 M. Ma, R. M. Hill, *Curr. Opin. Colloid. In.* 2006, 11, 193.
20 a) X. J. Feng, L. Feng, M. H. Jin, J. Zhai, L. Jiang, D. B. Zhu, *J. Am. Chem. Soc.* 2004, 126, 62; b) S. T. Wang, L. Feng, H. Liu, T. L. Sun, X. Zhang, L. Jiang, D. B. Zhu, *ChemPhysChem.* 2005, 6, 1475, c) T. L. Sun, G. J. Wang, L. Feng, B. Q. Liu, Y. M. Ma, L. Jiang, D. B. Zhu, *Angew. Chem. Int. Ed.* 2004, 43, 357.
21 J. Lahann, S. Mitragotri, T-N. Tran, H. Kaido, J. Sundaram, I. S. Choi, S. Hoffer, G. A. Somorjai, R. A. Langer, *Science* 2003, 299, 371.
22 G. Manukyan, J. M. Oh, D. van den Ende, R. G. H. Lammertink, F. Mugele, *Phys. Rev. Lett.* 2011, 106, 014501-1.
23 Q. Fu, G. V. R. Rao, S. B. Basame, D. J. Keller, K. Artyushkova, J. E. Fulghum, G. P. Lopez, *J. Am. Chem. Soc.* 2004, 126, 8904.
24 B. Deore, Z. Chen, T. Nagaoka, *Anal. Sci.* 1999, 15, 827.
25 J. L. Bredas, G. B. Street, *Acc. Chem. Res.* 1985, 18, 309.
26 X. Pei, Y. Xia, W. Liu, B. Yu, J. Hao, *J. Polym Sci A1*, 2008, 46, 7225.
27 C. Xia, M-K. Park, R. C. Advincula, *Langmuir* 2001, 17, 7893.
28 T. Ikeda, M. Higuchi, D. G. Kurth, *J. Am. Chem. Soc.* 2009, 131, 9158.
29 R. Georgiadis, K. A. Peterlinz, J. R. Rahn, A. W. Peterson, J. H. Grassi, *Langmuir* 2000, 16, 6759.

Detailed Description of Section III

Tunable Protein and Bacterial Cell Adsorption on Colloidally-Templated Superhydrophobic Polythiophene Films Summary of the Invention Section III A facile approach for enabling or inhibiting the adsorption of protein and adhesion of bacterial cells on a potential-induced reversibly wettable polythiophene film is described. The superhydrophobic polymeric surface was first prepared by a two-step process that combines the layering of polystyrene (PS) latex particles via a Langmuir-Blodgett (LB)-like technique followed by Cyclic Voltammetric (CV)—electrodeposition of polythiophene from a terthiophene ester monomer. The polythiophene conducting polymer coating enabled control of the wettability of the surface by simply changing its redox property via potential switching. The influence of morphology on this switching behavior is also described. The wettability in return controls the adsorption of protein and adhesion of bacterial cells. For instance, the undoped polythiophene film, which is superhydrophobic, inhibits the adhesion of fibrinogen proteins and *Escherichia coli* (*E. coli*) cells. On the other hand, the doped film, which is hydrophilic, leads to increased attachment of both protein and bacteria. Unlike most synthetic anti-wetting surfaces, the as-prepared superhydrophobic coating is non-fluorinated. It maintains its superhydrophobic property at a wide range of pH (pH 1-13) and temperature (below −10° C. and between 4° C. and 80° C.). Moreover, the surface demonstrated self-cleaning properties at a sliding angle as low as 3°±1. The proposed methodology and material should find application in the preparation of smart or tunable biomaterial surfaces that can be either resistant or susceptible to proteins and bacterial cell adhesion by a simple potential switching.

Introduction Section III

The phenomenon of superhydrophobicity and the preparation of synthetic superhydrophobic surfaces have recently attracted much attention due to its potential industrial and biomedical applications.[1] The design of artificial anti-wetting surfaces is nature inspired. For instance, the natural superhydrophobic surfaces, which are found in many plant leaves like the Lotus leaf,[2] the Lady's Mantle,[3] and in many insects[4] like the water strider, butterfly, and the cicada, contain hierarchical roughness that has been mimicked in hydrophobic materials. Ma and Hill[5] summarized the different materials and the common strategies utilized for structuring the surface to template the natural design. Most of these methods include tedious lithographic steps and require intricate instrumental set-up, which can limit their realistic application for surface coatings. Although not widely reported, electrochemical polymerization or electrodeposition of polymers can be an alternative for making superhydrophobic surfaces.[6] However, most of the reports on electrodeposition of π-conjugated polymers for anti-wetting purposes use fluorinated substituents, which are not only more expensive but bio-accumulates in the environment.[7] Therefore, these concerns necessitate the search for non-fluorinated π-conjugated polymer alternatives. Among the π-conjugated polymers, poly(thiophenes) and its derivatives are well-known and are relatively stable for practical applications.[8]

Despite the numerous and successful bio-mimetic efforts to achieve superhydrophobic surfaces,[5,6] there are only few studies on investigating their potential for biomaterial applications. Genzer and Efimenko[9] reported recent developments on superhydrophobic coatings and noted the limited work on their applications to prevent biofouling on surfaces or on biomedical devices.[10] The resistance as well as the adsorption of protein or bacteria to material surfaces can have diverse medical, industrial, and environmental applications and implications. For instance, the adsorption of protein to surfaces is important to the development of biosensors and immunoassays.[11] Materials like di-block copolymers that are physically or chemically adsorbed to the surface have been used for controlling the adhesion of proteins.[12] In the case of bacterial adhesion to surfaces and biofilm formation, these phenomena can help in the degradation of organic matter in wastewater treatment,[13] bioremediation,[14] selective extraction of metals from ores,[15] and on basic studies for in vitro growth of bacterial cells. On the other hand, the adhesion of proteins or bacteria can cause impairment of the surface functionality of biomedical devices[16] such as of catheters,[17] implants,[18] and artificial organs.[17a,19] Furthermore, adhesion of bacteria on the water distribution system can clog pipes and generate corrosion.[20,21] Therefore, numerous efforts have been directed to modify the surface with a material that would resist bacterial adsorption and colonization, as well as adsorption of proteins.[22] One possible approach to prevent biofouling is to make the surface superhydrophobic, i.e. by controlling the surface energy and surface topography of the substrate.[23] Marmur[24] claimed that biofouling hindrance can be obtained by minimizing the contact between water and surface using a superhydrophobic coating, since foulers are generally biological materials suspended in water with high affinity for hydrophilic surfaces. Moreover, Rubner et al.[25] underscored that superhydrophobic surfaces can actually provide resistance or reduced capacity of bacteria to achieve stage I and/or stage II in bacterial adhesion.

Since material surfaces that control adhesion of protein and bacteria cells are medically, industrially, and environmentally relevant, it will be interesting to create a tunable surface that can also facilitate self-cleaning. So far, most reports have focused only on making a surface that is either resistant or susceptible to protein or bacteria adhesion but not tunable. In the present work, we developed a facile approach to enable controlled adhesion of proteins and bacterial cells to surfaces. These surfaces are coated with highly stable and albeit non-fluorinated electrodeposited superhydrophobic polythiophene, utilizing a colloidal template-assisted electropolymerization technique. This study also provides an insight on controlling the wettability of the surface by a simple potential switching of the redox property of the conducting polymer surface. Finally, the effect of changing the redox property of the polymeric surface was explored with the adsorption or inhibition of fibrinogen and *E. coli* attachment to the surfaces. To the best of our knowledge, this is one of the first reports on controlled attachment and prevention of protein and bacteria adhesion utilizing a potential-induced and reversibly-wettable polythiophene film. The advantage of using a conducting polymer coating is the ability to control the wettability and electro-optical properties of the polymeric surface simultaneously by simply changing its redox property, i.e., enabling self-cleaning function by an ex-situ change in potential. Recently, we have demonstrated the effect of altering the redox property of polythiophene film that is electrodeposited on flat surfaces to facilitate the effective release of drug molecules from an ultrathin film of molecularly imprinted polythiophene surface.[26]

Results and Discussion Section III

Film Preparation and Characterization

The anti-wetting surface was fabricated using a two-step approach. FIG. 32 depicts the schematic representation of the film fabrication starting with the colloidal template (PS particle) layering onto a planar conducting substrate by a Langmuir-Blodgett (LB)-like technique.[27] This method was used because it allows two dimensional (2D) monolayer and closely-packed ordering of particles on flat surfaces, which is dependent on the vertical lifting speed of the substrate and colloidal particle and surfactant concentrations.[27] FIGS. 33A-D displays the atomic force microscopy (AFM) topography 2D (FIG. 33A) and 3D (FIG. 33B) images of the single layer 500 nm sized PS particles adsorbed on Au substrate and the scanning electron microscopy (SEM) images after polythiophene electrodeposition (FIG. 33C and 33D) of the doped and undoped films, respectively. The AFM images reveal a highly ordered monolayer assembly of colloidal particles in hexagonal packing or honeycomb arrangement as clearly seen in the high magnification image (inset of FIG. 33A). Similar surface patterns were also observed for other sizes of PS when the deposition was done on an Indium Tin Oxide (ITO) substrate (FIGS. 34A-D). Attenuated total reflection infrared (ATR IR) spectrum of the PS layer on Au is presented in FIG. 34D, which shows the signature peaks of PS, confirming its presence on the surface.

Figure 33A:
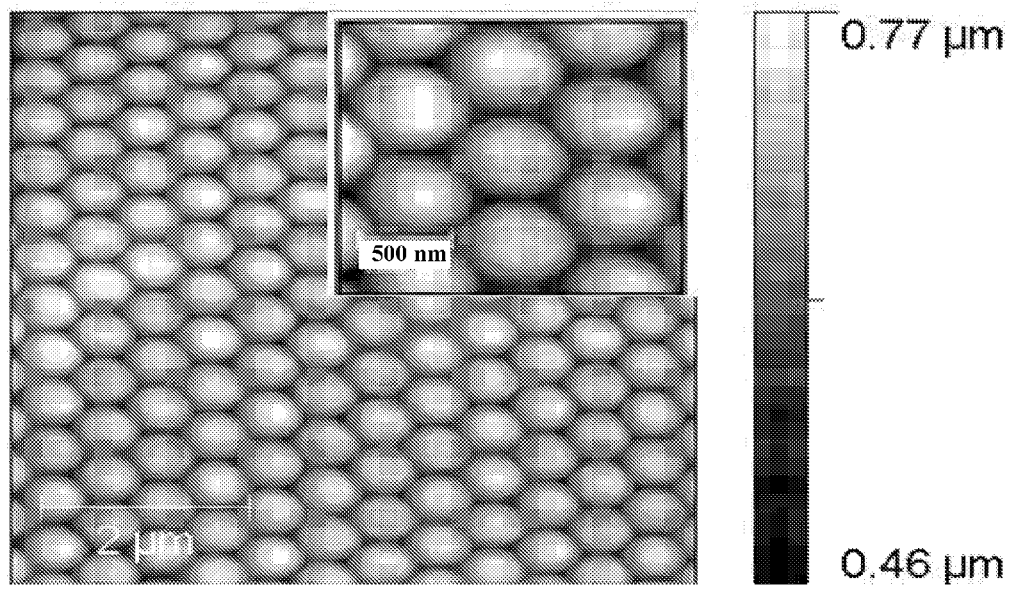
Figure 33B:
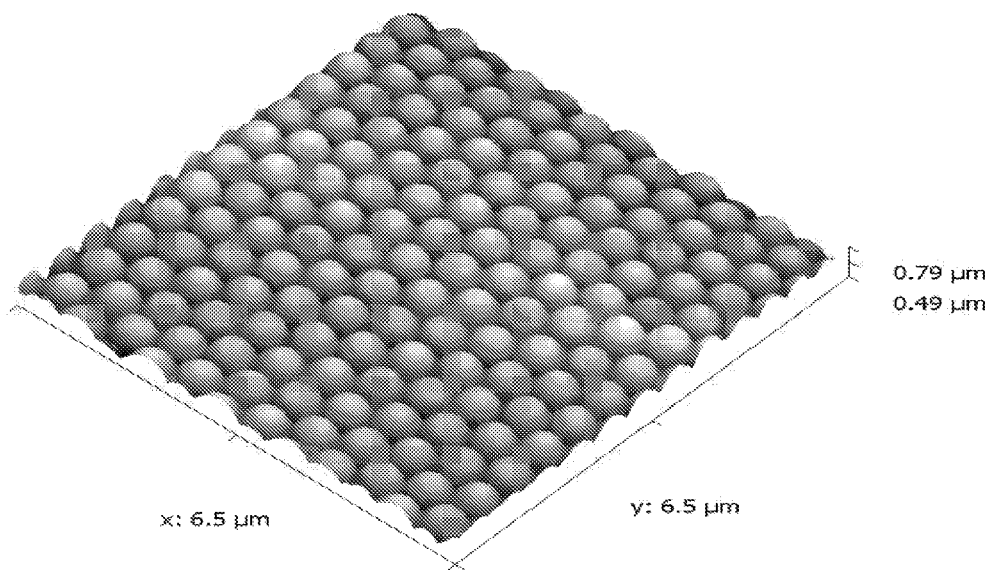
Figure 33C:
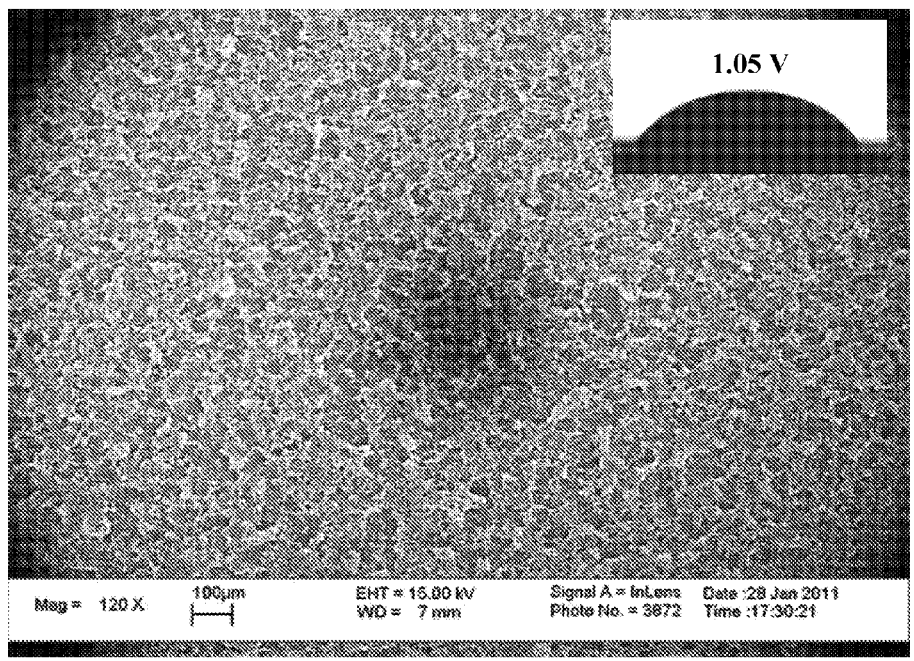
Figure 33D:
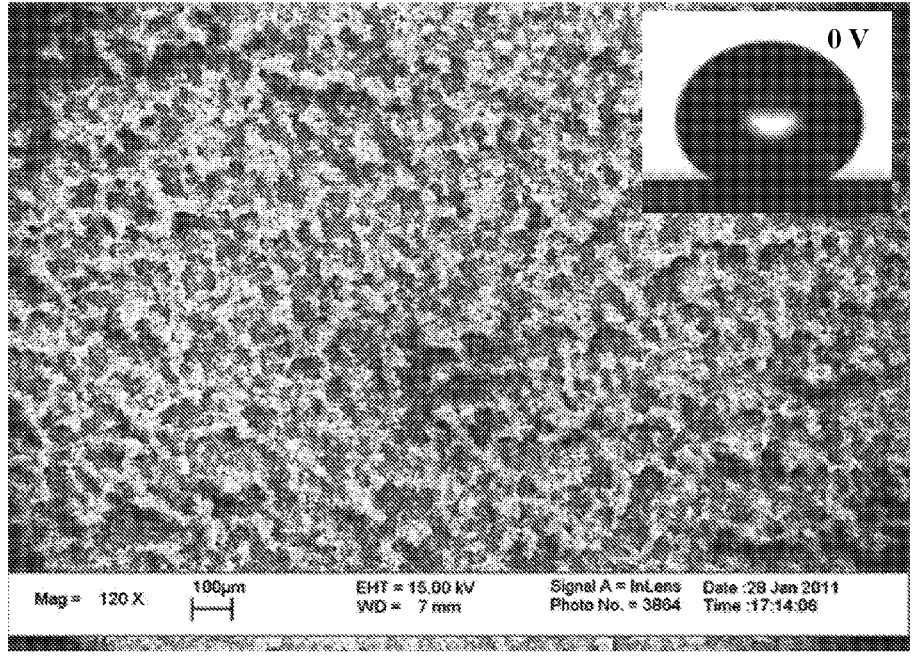

Electrodeposition of the polythiophene layer on the PS-coated conducting substrate was performed by CV technique. This method allows direct grafting of the conducting polymer onto the electrode surface, control of polymer film thickness, surface growth, and morphology by varying various set-up parameters such as scan rate, CV cycles, and potential window.[28] The morphology by SEM imaging is shown in FIGS. 33C and 33D for the doped and dedoped films, respectively. Further discussion on morphology vis-à-vis wetting properties is elaborated on the succeeding sections. FIG. 35A presents the typical CV diagram of the anodic electropolymerization of the (ethyl 2-(2,5-di(thiophen-2-yl)thiophen-3-yl) acetate (G0-3TCOOR) monomer.[29] The advantage of using the terthiophene monomer for electropolymerization is the lower oxidation potential compared to its mono or bithiophene counterparts.[30] This process is evidenced by the increasing current in the oxidation (between 0.8 V to 1.1 V) and reduction (between 0.6 V to 1.0 V) peaks until the 15' cycle (FIG. 35A), which is attributed to the linking of the terthiophene units and electrodeposition of the material onto the electrode substrate.[29] The current increase in the anodic scan that occurs from the $2^{nd}$ cycle with an onset potential of ~0.6 V is attributed to the oxidation of the more conjugated species.[29] The deposition of the polymer film onto the electrode substrate was confirmed by the appearance of the same redox couple in the monomer-free post-polymerization scan (inset of FIG. 35A). During the electropolymerization, a very slow scan rate (5 mV/s) was applied to enable deposition of a thicker polymer film on top of the colloidally-templated electrode substrate. A film thickness between 2.5 to 6.5 μm was determined from profilometry measurements.

The electrodeposition of the conducting polymer onto the PS-coated substrate was verified by X-ray photoelectron spectroscopy (XPS). The survey scan (FIG. 35B) exhibits the expected elemental composition for poly(G0-3TCOOR) such as carbon (C), oxygen (O), and sulfur (S) atoms.[26a] The S 2p peak (inset of FIG. 35B) in the high resolution scan at the range of 162-165 eV is a signature peak for polythiophene,[26a] which is due to the sulfur atom of the thiophene ring.

Testing for Superhydrophobicity and Self-Cleaning Effect

The wettability of the poly(G0-3TCOOR)/PS surface was evaluated. The surface exhibited a static water contact angle (WCA) value of 154°±1 (FIG. 36A) at ambient conditions, which is attributed to the synergestic effect of the combined heirarchical roughness, which is seen in the scanning electron microscopy (SEM) images, and the presence of the hydrophobic conducting polymer coating on the surface. To underscore the importance of the PS template underlayer array, the poly(G0-3TCOOR) film was electrodeposited using the same CV condition on a flat surface, and the contact angle was also measured, which showed a value of only 103°±1. This result shows the importance of the 500 nm sized PS template array underlayer to give a superhydrophobic effect on the surface. The PS monolayer array actually provides an initial submicron scale roughness to enhance the hydrophobicity of the surface.

The structuring of the surface was determined by SEM analysis. The SEM imaging (FIG. 36) displayed an irregularly rough surface of the as-prepared superhydrophobic film. This complex surface morphology was expected because the electropolymerization was done in a non-planar 2D substrate with a very slow scan rate. Based from the SEM low magnification image (FIG. 36B), the irregular roughness on the surface shows hierarchy or stepping order, which can serve as a multiple barrier for resisting the adhesion of water to the surface. For instance, the topmost layer comprises mainly of highly porous foam-like features that are above the micron scale bumps with size much greater than the PS particle. In some regions, highly dense foam-like structures of the conducting polymer are also seen on the surface (FIG. 36C). The underlayer (at low region below the foam-like features) clearly shows the continuous honeycomb assembly of the PS particle that is smeared with nanometer-sized asperities due to the conducting polymer (FIG. 36D). This result proves that the superhydrophobicity is not necessarily dependent on the regularity of the surface roughness like the surface of the Lotus leaf[2] and many other synthetic analogues prepared by sophisticated lithographic techniques, but by the presence of hierarchical features contributing to the non-wetting phenomenon[5] which is essentially a Cassie-Baxter Model.[33]

These films showed superior temperature and pH stability. The superhydrophobicity of the poly(G0-3TCOOR)/PS surface was tested at various water droplet temperatures ranging from 4° C. to 80° C. It was observed that the surface remained superhydrophobic (WCA≥150°) at all measured temperatures (FIG. 37A). Furthermore, the superhydrophobicity was maintained even when the surface was incubated at below freezing condition (−10° C.) for 1 and 4 days giving WCA values of 152°±3 and 153°±2, respectively. The surface also maintained its superhydrophobicity at a wide pH range (pH 1-13) (FIG. 37B). The high water repellency of the same surface that is preserved at very low and very high pH values and at low and high temperatures of water is unusual and is not easily achieved in many synthetic superhydrophobic surfaces.

The static contact angle analysis was validated by dynamic measurement that displayed a high advancing ($\theta_{adv}$) and receding ($\theta_{rec}$) water contact angle values of 154°±1 and 151°±1, respectively. The difference in the two values is the contact angle hysteresis,[31] which is also used to gauge on whether the superhydrophobic surface will demonstrate the sliding of the water droplet.[1b,32] Since the superhydrophobic surface has a very low hysteresis of <5°, it will most likely exhibit the rolling of the water droplet akin to the Lotus leaf.[1a, 32a]

The self-cleaning property of the as-prepared superhydrophobic polythiophene surface was confirmed, which allowed the rolling of the water droplet at the sliding angle of 3°±1. FIG. 37C displays images of the water droplet, hanging at the tip of the needle and at the same time touching the polymeric surface on the other side, displaying its ability to move freely across the superhydrophobic surface. These images vividly reveal that the surface is highly repellent to water. Because the water droplet was able to roll freely on the surface at a very low sliding angle, the superhydrophobic surface is characterized by the Cassie-Baxter model,[32a,33] which explains that the water droplet is sitting and not pinned above the composite surface of the solid protuberances and air (described as heterogeneous wetting regime[34]). With the high porosity of the actual surface, as determined from the SEM analysis, the superhydrophobic surface is believed to entrap more air, particularly onto the micron scale asperities (FIG. 36B) and foam-like structures (FIG. 36C), and thus creating a liquid-gas layer upon contact with water, which is likely the reason for the sliding of the water droplet across the anti-wetting surface. FIG. 37D (top left) shows the image of the pristine superhydrophobic coating electrodeposited on ITO, while FIG. 37D (bottom left) displays the image of the same but dusted surface after rolling the water droplet. Clearly, it is shown that the dust particles are completely removed and picked up by the water droplet that rolled off the surface, and hence the superhydrophobic surface has been proven to be self-cleaning.

Switchable Surface Wettability

The redox property of the cross-linked conducting polymer film was investigated by applying a constant oxidation potential of 1.05 V using the same three electrode system in a monomer free condition. The applied voltage was determined from the peak potential of the CV diagram (FIG. 35A) in the anodic scan during the electropolymerization of the terthiophene monomer. Previously, our group has investigated the redox property of the conducting polymers of polycarbazole and polythiophene using in-situ measurements.[35] However, the surface wettability of the electrodeposited conducting polymers was not studied. In order to examine the change in the redox property of the polymer film, the electrodeposition of the conducting polymer was done in a transparent conducting substrate like ITO such that UV-Vis measurements can be performed. Prior to the application of the constant positive potential, the UV spectrum shows a maximum absorption peak ($\lambda_{max}$) at 440 nm, which is known as the $\pi$-$\pi$* transistion of the polythiophene film (upper curve of FIG. 38A).[36] At this condition of the film, the conducting polymer is considered to be neutral or undoped. Then after applying a potential of 1.05 V to the electrodeposited film, the spectrum displays a new broad peak between 600 to 800 nm (FIG. 38A bottom curve), which is due to the formation of polarons[37] of the conjugated polythiophene species and their complex redox ion couple with hexafluorophosphate ions ($PF_6^-$). During the application of the oxidation potential, the conducting polymer is known to become positively charged, and thus accepts the negatively charged counter ions (called dopants) from the supporting electrolyte in the bulk solution to maintain its neutrality and this process is referred as electrochemical doping.[38] As determined from the contact angle (inset of FIG. 38A), the doping of the poly(G0-3TCOOR) on PS coated substrate instigated the change in the wettability of the surface, which is attributed to the change in surface morphology and the effect of the dopant.[39] The change in surface morphology is evident in FIG. 33C and 33D over wide scan areas. For instance, a rougher and highly porous surface is seen with the dedoped film (FIG. 33D and FIG. 36B-D), resulting to greater volume of trapped-air (Cassie-Baxter model[33]). At the same time, the surface of the dedoped film contains smaller hierarchical roughness of the submicron range (FIG. 36B and 36D). Upon doping such as the application of 1.05 V, the polythiophene film may have possibly collapsed and the counter ions may have occupied the pores, and thus the surface is seen to be relatively less rough (FIG. 33C). Then upon dedoping the conducting polymer such as the application of 0 V, its morphology with a very rough and porous surface is restored (FIG. 33D). During the dedoping process, the polymer film is believed to eject the counter ion back into the bulk solution and returns to its neutral state,[38] which is proven by the appearance of the same UV spectrum with only one absorption peak maximum at 440 nm. The application of the oxidation potential of 1.05 V has easily converted the superhydrophobic surface (WCA≥150°) into hydrophilic surface with WCA of ~60°. Then upon dedoping the same surface, the polythiophene film is switched back to superhydrophobic state with a WCA equivalent to 152°±1. The reversibility of the surface wettability and color of the colloidally-templated polythiophene film via potential switching between 0 V and 1.05 V is shown in FIG. 39. Note that the reversible change in wetting (superhydrophobic to hydrophilic and back) with simultaneous change in color or electrochromism (orange to dark green and back) is also a unique aspect of these films. Based from these results, the poly(G0-3TCOOR)/PS surface can be considered as a stimuli responsive material.

The doping/dedoping of the polythiophene was further confirmed by XPS measurements. The high resolution XPS scans display the flourine (F 1s) peak (FIG. 38B) between 682-688 eV and phosphorus (P 2p) peak (FIG. 38C) between 133 to 137 eV in the doped polymer surface, which are due to the $PF_6^-$ (counter ion from the supporting electrolyte, TBAH). These peaks were not present upon dedoping of the same polymeric surface. The appearance of these unique elemental markers, which are due only to the counter ion, verifies the electrochemical doping of the electrodeposited conducting polymer. Interestingly, it is the absence of the fluorine peak (from TBAH dopant) that facilitates superhydrophobicity for this film. The sulfur peak (S 2p), which is the signature peak of the polythiophene, was also scanned in the XPS before and after doping to check for the stability of the conducting polymer. The presence of the S 2p peak (FIG. 40) at the same position and similar intensity signifies that the conducting polymer is highly stable and is not impaired by the electrochemical doping at the present condition.

Protein Adsorption Studies

The fabricated superhydrophobic surface was then tested for protein adsorption using fibrinogen protein as a model, which is a plasma protein present in relatively large quantities in the blood (0.2-0.4%), and plays a vital role in clot formation. This plasma protein has a size of 340 kDa and is commonly used to evaluate the biocompatibility or thrombogenesis of material surfaces, since it is known to absorb to most material surfaces.[40]

To determine the amount of protein adsorbed onto the electropolymerized colloidally-templated surface, quartz crystal microbalance (QCM) was used. The Sauerbrey equation was used to quantify the amount of fibrinogen adsorbed on different surfaces:

$$\Delta F = \frac{-2F_q^2 \Delta m}{A\sqrt{\rho_q \mu_q}}$$

where $\Delta F$ is the change in frequency in Hz, m is the mass change in g, $F_q$ (=5 MHz) is the resonant frequency of the QCM crystal, A (=1.37 cm$^2$) is the area of the electrode, $\rho_q$ (=2.65 g/cm$^3$) is the density of the quartz, and $\mu_q$ (=2.95×10$^6$ N cm$^{-2}$) is the shear modulus of the quartz. The negative sign in the formula denotes that the film is being adsorbed onto the QCM crystal. By substituting all the abovementioned values into the Equation III.2, the change in mass ($\Delta m$ in units of g) can be easily calculated using the simplified equation:

$$\Delta m = -2.40 \times 10^{-8} DF \quad \text{(III.3)}$$

The results are summarized in Table III.1.

TABLE III.1

Summary of the Qcm Measurements in Air of Fibrinogen Adsorption on Different Surfaces

| Substrate | $\Delta F$ (Hz) | Ave. Mass Density* ($\mu g \cdot cm^2$) |
|---|---|---|
| 1. Poly(G0-3TCOOR)/PS Au, Undoped Film | −99.64 | 1.75 |
| 2. Poly(G0-3TCOOR)/PS Au, Doped Film | −565.01 | 9.90 |
| 3. Bare Au | −308.29 | 5.40 |
| 4. Poly(G0-3TCOOR)/PS Au, Undoped Film Injection of PBS solution only (control) | −101.1 | 1.77 |

*Calculated using the Sauerbrey equation (Equation III.2).

The undoped poly(G0-3TCOOR)/PS Au surface, which was determined to be superhydrophobic, had the least change in delta frequency ($\Delta F$). Its measured value was similar to the ΔF when a PBS solution was injected into the same surface (control experiment). Furthermore, a positive control experiment was also done by simply injecting the same protein into the unmodified Au substrate. As expected, a higher change in ΔF was obtained, which is possibly due to the non-specific adsorption of protein. This finding implies that the undoped surface is highly resistant to the adsorption of fibrinogen. The change in the ΔF (~100 Hz) upon injection of the buffer to the undoped surface is attributed to the possible intake of PBS ions or water molecules into the surface. This is possible since the surface is highly porous as observed in the SEM (FIG. 36). Moreover, the $N_2$ drying after protein incubation may not be enough to completely dry the surface. However, upon doping the same surface, it allowed the adsorption of more protein with a significant decrease in the change in frequency (ΔF) by more than seven-fold. This result indicates that the same surface can be switched from inhibitory to adsorptive for proteins by simply doping/dedoping the polymeric surface, and thus potentially useful for making smart or tunable films that are stimuli responsive.

The QCM measurements in dry state was also validated by the analysis in solution (FIG. 41) that showed the same trend with the least and significant change in AF in the undoped superhydrophobic and in the doped surfaces, respectively. Also, the adsorption of fibrinogen onto the electrodeposited poly(G0-3TCOOR) on bare Au was measured, and the binding curve is shown in FIG. 42 that shows relatively protein adsorption resistancy of the surface as compared to the unmodified Au surface. The differences in the AF value between the QCM measurements in dry state and in solution can be credited to the effect of washing step (injection of milli-Q water to minimize/remove the salts) or $N_2$ drying after incubation with the protein solution.

The results of the QCM measurements were further verified by contact angle, ATR IR, and XPS analyses. From the static contact angle, the undoped polymeric surface remains superhydrophobic (WCA≥150°) even after incubation in the protein solution for ~950 minutes (FIG. 43A-top row), which means that the surface is highly repellent to fibrinogen over long periods of time. However, upon doping the same surface and incubating with a protein solution, the contact angle increased from 58°±1 to 96°±6 (FIG. 43A-bottom row), due to fibrinogen adsorption. The increased in contact angle is expected since the adsorbed fibrinogen will expose its hydrophobic domains in air.[41] The result of the contact angle was corroborated with the results of the ATR IR analysis (FIG. 43B). The undoped polymeric surface has shown similar IR spectrum even after dipping it in the protein solution. However, after doping the polymeric surface and immersing into a fibrinogen solution, the spectrum of the doped surface showed new peaks in the range of 3100-3600 $cm^{-1}$, attributed to the OH and NH stretching vibrations[42] from the protein.[41] Based on previous reports, the NH stretch correspond mostly to the lysine and arginine side groups of the αC domain of fibrinogen.[41] To further confirm that the protein is really adsorbed onto the doped polymeric surface, XPS analysis was also performed. The wide XPS scan (FIG. 43C) reveals a strong N 1s peak at 400 eV, which is an elemental marker for the fibrinogen proteins. This element is not present in the colloidally-templated electrodeposited polythiophene. A high resolution scan of the nitrogen element (inset of FIG. 43C) was also performed to verify the result. As expected, a prominent N 1s signal appears between 398-402 eV. Therefore, these results support that fibrinogen has adsorbed onto the doped polymeric surface.

The resistance to protein adsorption onto the undoped polymeric surface can be explained by the fact that superhydrophobic surfaces prevent attachment of the biofouler dissolved in aqueous solution,[24] i.e., the contact between water and surface is minimized possibly due to the formation of the gas-liquid interface[32a,33] with the muti-scale structuring.[10b] On the other hand, the adhesion of fibrinogen onto the doped polymeric surface can be ascribed to the increased contact between the aqueous media that contains the protein and the hydrophilic surface. Moreover, the adsorption of protein can also be related to the electrostatic interaction between the positively charged surface and the negatively charged protein. Note that fibrinogen has an isoelectric point of 5.5 and have a net negative charge in PBS buffer at pH 7.4.[43] Our results are consistent with the earlier findings of Chen and co-workers[1c] that their oxygen plasma treated Teflon superhydrophobic surface resisted the adsorption of protein similar to a PEG surface. However, upon switching the same surface into wettable state (more hydrophilic) by charging with an electric field, it promoted the adhesion of protein.

Bacteria Adhesion Studies

The ability of the surfaces to inhibit bacterial attachment was tested by incubating the films with the model bacteria *E. coli* for 2 h. FIGS. 44A-D present the fluorescent images of the *E. coli* adsorbed onto the undoped and doped colloidally-templated polymeric surfaces after staining with SYTO 9 dye. A control experiment was also performed by incubating the bacterial solution in an unmodified ITO surface. Significant reduction of bacterial adhesion was observed for the undoped surface (p<0.05) as compared to the control and the doped film. This outcome is consistent with the previous results of Liu et al.[44] that bacterial adhesion can be significantly reduced on a superhydrophobic surface.

Figure 44:
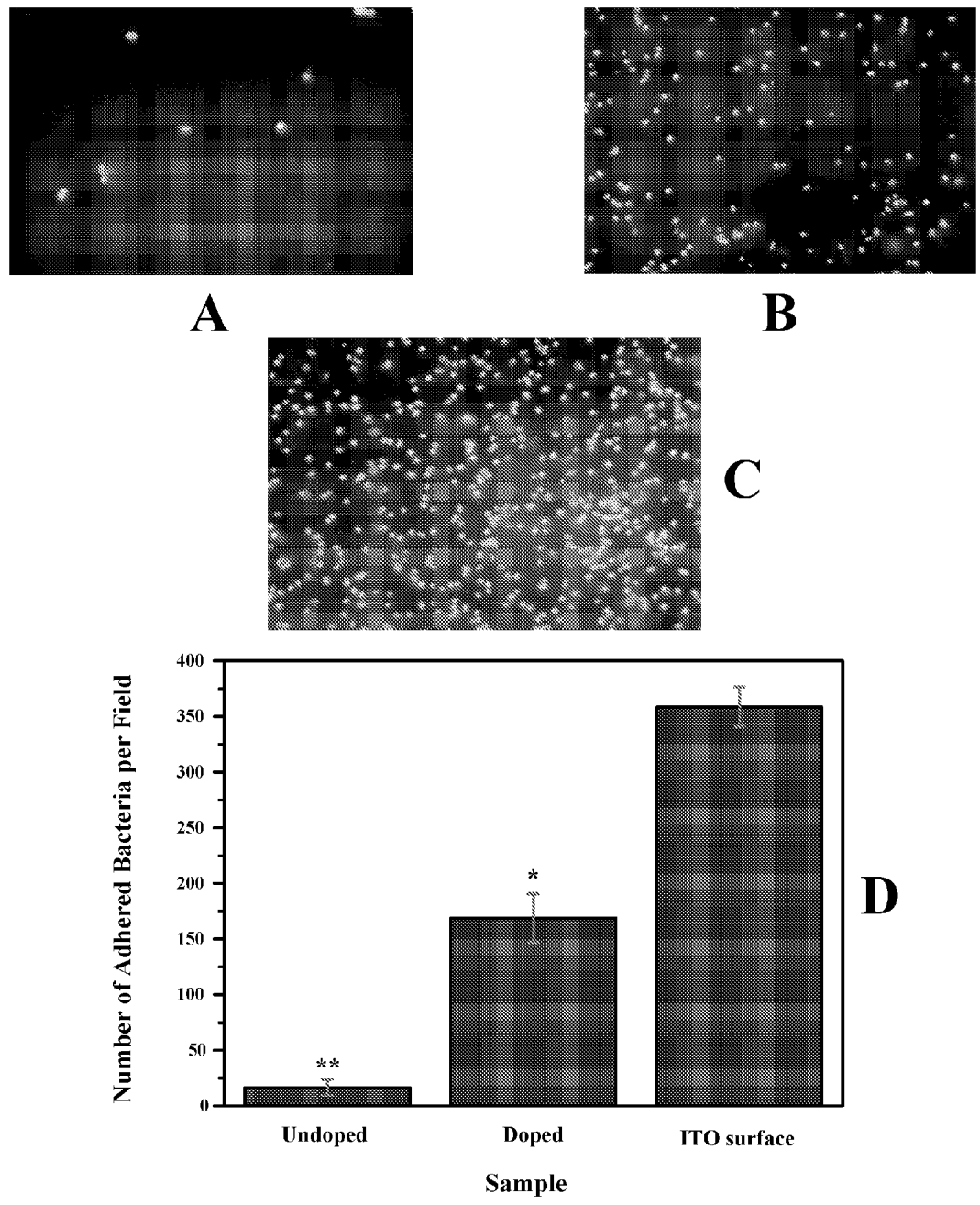

Based on the results, the prevention of bacterial cell adhesion on the dedoped surface can be explained by the low binding strength between the bacteria and the surface because of the minimized contact between the aqueous media that suspends the bacteria and the surface.[24] Nonetheless, the adhesion of more bacteria onto the doped surface is possibly due to the hydrophilic nature of the surface that favors a better contact between the aqueous media and the surface. This result is confirmed when the unmodified ITO, which is more hydrophilic and has a relatively smooth surface than the doped and undoped surfaces, adhered the highest amount of bacteria (FIG. 44D). Moreover, we cannot discount that the increased bacterial attachment can be related also to the electrostatic interaction between the net positively-charged polymeric surface, created upon doping and the negatively charged *E. coli*.[45] Although the determination of the exact mechanism of the bacterial adhesion is beyond the scope of this publication, it is possible that the doped surface would have some antimicrobial properties, with possible mechanisms similar to cationic peptides.[46]

Conclusions Section III

Prevention of protein and bacterial adhesion was demonstrated on an anti-wetting and self-cleaning superhydrophobic polythiophene film fabricated using a combined particle-layering by LB-like method and CV-electropolymerization technique. The fabricated colloidally-templated polymeric surface has proven to be highly stable and non-wetting over a wide pH range (pH 1-13), temperatures (between 4° C. and 80° C.) and even when the surface was frozen at −10° C. for more than 4 days. Furthermore, the superhydrophobic surface has demonstrated self-cleaning at a sliding angle of about 3°. By simply manipulating the redox property of the conducting polymer using an external stimuli (e.g. applying a constant potential), the wettability of the surface was easily changed, which affected the adhesion of fibrinogen and E. coli. Since the switching of the surface wettability can be easily achieved by simply changing the redox property of the conducting polymer, the proposed methodology maybe useful for fabricating smart coatings onto various conducting surfaces, which can be tuned to resist or adsorb protein and bacterial cell. Current effort is underway for testing the superhydrophobic surface on other proteins and bacterial cells and towards understanding the various mechanism of their adhesion and resistance.

Experiments of Section III

Materials and Reagents

Polystyrene (PS) latex microbeads (0.5 mm in diameter, 2.5 wt % solids in aqueous suspension) were purchased from Polysciences, Inc. and were used without further purification. Acetonitrile (ACN), sodium n-dodecyl sulfate (SDS), and tetrabutylammonium hexafluorophosphate (TBAH), fibrinogen protein, phosphate buffer saline (PBS) tablet were obtained from Sigma-Aldrich. The glass slides (BK 7) for gold (Au) depositions were acquired from VWR. The tin-doped indium oxide, ITO ($In_2[Sn_x]O_{3-y}$, one side coated on glass, sheet resistance≤30 $\Omega cm^{-2}$) used for the preparation of superhydrophobic surface was purchased from SPI Supplies/ Structure Probe, Inc. Prior to use, the ITO substrate was sonicated in Alconox detergent followed by rinsing with ultra pure water. The ITO was then sonicated for 10 min in isopropanol, hexane, and then toluene, respectively, prior to oxygen plasma cleaning for ~120 sec. The Au substrate also used for the fabrication of superhydrophobic surface was prepared by thermally evaporating gold of 99.99% purity (50 to 100 nm thick) under high vacuum ($10^{-6}$ bar) onto the BK 7 glass slide with chromium adhesion layer (~10 nm thick). The Cr and Au depositions were done at a rate of ~0.4 $Asec^{-1}$ and ~1.1 $Asec^{-1}$, respectively, using a thermal evaporator (Edwards). Prior to use, the Au-coated slide was also cleaned in the oxygen plasma cleaner for ~120 sec. The deionized water or ultra pure water (resistivity ~18.2 M$\Omega$·cm) used for the dilution of PS particles was purified by a Milli-Q Academic® system (Millipore Cooperation) with a 0.22 micron Millistack filter at the outlet. Fibrinogen solution was prepared in PBS solution at 1 mg/ml concentration. The PBS buffer solution (0.1 M concentration, pH 7.4) was prepared by dissolving 1 tablet of the PBS into 200 ml of Milli-Q water. The monomer used in the electrochemical polymerization was synthesized in our laboratory.

Scheme III.1

Synthesis Route of the Functional and Cross-Linking Monomer ethyl 2-(2,5-di(thiophen-2-yl)thiophen-3-yl)acetate (G0-3TCOOR)

Synthesis of the Monomer (G0-3TCOOR), where R=$CH_2CH_3$)

The synthesis of G0-3TCOOR was carried out by first synthesizing ethyl 2-(2,5-dibromothiophen-3-yl)acetate as reported in the literature.[35] $^1$H NMR (CDCl$_3$): 6.94 (s, 1H), 4.17 (q, 2H, J=7.15 Hz), 3.55 (s, 2H), 1.27 (t, 4H, J=7.14 Hz) as shown in FIG. 45A.

The procedure described by Taranekar et al[35] was used to synthesize G0-3TCOOR. Briefly, ethyl 2-(2,5-dibromothiophen-3-yl)acetate (6.4 g, 10 mmol) and 2-(tributylstannyl)thiophene (15 g, 20 mmol) were added to a 30 mL dry DMF solution of dichlorobis (triphenylphosphine) palladium (1.3 g, 1.5 mmol). After three freeze-thaw cycles, the mixture was heated at 100° C. for 48 hr. The mixture was cooled to room temperature and poured into a beaker containing 150 mL of water and subsequently extracted with $CH_2Cl_2$. The extracted $CH_2Cl_2$ mixture was dried with $Na_2SO_4$. After filtering and evaporating the solvent, the crude product was purified by chromatography on silica gel using toluene as an eluent. The final product was obtained in 85% yield as pale yellow oil. $^1$H NMR (CDCl$_3$): δ 6.8-7.2 (m, 7H), 4.19 (q, 2H, J=7.15 Hz), 3.72 (s, 2H), 1.27 (t, 4H, J=7.14 Hz) as shown in FIG. 45B.

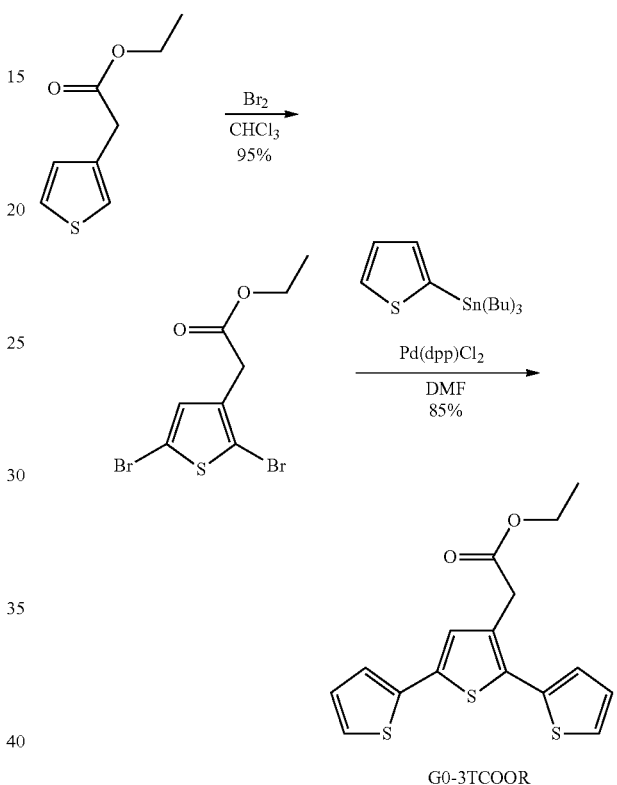

G0-3TCOOR

PS Particle Layering

The layering of PS microbeads (or formation of colloidal crystals) was accomplished using a similar procedure described by Grady and co-workers. The method is called Langmuir-Blodgett (LB)-like technique. It allows the formation of a monolayer of PS particles onto flat surfaces without using the conventional LB set-up, which employs floating barriers. Briefly, the LB-like technique involved the vertical lifting of the substrate at a controlled rate from a solution with dispersed colloidal particles. As shown in FIG. 32A, the substrate was attached into the dipper motor via Teflon clip and was dipped into an aqueous solution of PS particles (1 wt. %) and SDS (34.7 mM) as spreading agent. Note that much higher concentration than 34.7 mM of the SDS will result in multiple layers of highly disordered latex spheres while a low concentration will not form full area coverage in hexagonal array. Then the substrate was withdrawn vertically from the solution at a lift-up rate between 0.1 to 0.3 mm/min. Finally, the substrate was air dried for a few minutes.

The addition of anionic surfactant (SDS) has been explained to increase the ionic strength of the solution, and thus creating a driving force for the migration of particles from the bulk solution to the air-liquid interface.[27] Also, the surfactant molecules at the air-liquid interface has been reported to slow down the evaporation rate of the latex-surfactant solution with respect to the latex solution alone, giving more time for the particles to rearrange and form highly ordered arrays on the substrate as the liquid film evaporates.[27] The other roles of the surfactant towards the formation of well-ordered arrays of latex spheres have been elaborated elsewhere.

Preparation of Superhydrophobic Surface

The superhydrophobic conducting surface was fabricated by simple two-step process such as (1) layering of PS latex microbeads onto conducting substrates like Au and ITO slides, and (2) electropolymerization of the monomer into the PS-coated slides. The layering of PS latex beads was prepared using a similar procedure described earlier by Grady and co-workers.[27] The substrate was attached vertically into the dipper motor via a Teflon clip and was dipped into a solution of PS particles (1 wt % in Milli-Q water) and SDS (34.7 mM) as spreading agent. The substrate was then withdrawn vertically from the solution at a lift-up rate of 0.1-0.3 mm/s. The substrate was then dried by suspending it in air for a few min. After the layering of the latex spheres, the monomer (5 mM G0-3TCOOR in ACN with 0.1 M TBAH as supporting electrolyte) was electropolymerized onto the PS-coated substrate (Au or ITO) as the working electrode in a standard three electrode measuring cell with platinum (Pt) wire as the counter electrode and Ag/AgCl wire as the reference electrode. The electropolymerization was done using cyclic voltammetric technique in a fabricated electrochemical cell (Teflon made). The potential was scanned between 0 V to 1.1 V (and also 0V to 1.5 V) for 15 cycles at a scan rate of 5 mV/s. Note that the use of very low scan rate will result to the formation of thicker polymer coatings. Also, it is possible to do this deposition of polymer film by chronoamperometric or potentiostatic methods. After electrodeposition, the film was thoroughly washed in ACN (at least 3 times) to remove the excess monomer and physically adsorbed polymer or oligomer, and a post-polymerization monomer-free scan (in a solution of ACN with 0.1 M TBAH) was performed by using exactly the same electrochemistry set-up and settings but for 1 CV cycle only. Finally, the electropolymerized film was thoroughly dried in vacuum for at least 1 hr prior to any characterizations. To dope (or undoped) the polymeric surface, a constant oxidation potential of 1.05 V (or 0 V) was applied for 30 minutes onto the polymeric surface (working electrode), which was immersed in ACN with 0.1 M TBAH along with the reference (Ag/AgCl) and counter (Pt wire) electrodes.

Characterizations

Cyclic voltammetry (CV) was performed in a fabricated electrochemical cell (Teflon-made, with a diameter of 1.0 cm and volume of 0.785 cm$^3$) using a conventional three-electrode cell using an Autolab PGSTAT 12 potentiostat (Brinkmann Instruments now Metrohm USA, Inc.). The potentiostat is controlled by GPES software (version 4.9).

Profilometry of model Alpha-Step 200 was used to measure the thickness of the polymeric surface. The Alpha-Step 200 profilometer can accurately measure the surface profiles below 200 Å and up to 200 µm. A low stylus force of 5 mg was used during the scanning to avoid damaging the polymer surface. The measurements were done at least 10 times on different areas of the sample surface under ambient and dry conditions.

The static contact angle measurements were done using a CAM 200 optical contact angle meter (KSV Instruments Ltd) with CAM 200 software. The experiment was carried out by slowly moving upward the sample stage with the sample surface on top to come close onto the water droplet (~1 µL) that was suspended at the tip of the micro syringe (200 µL). The reading of the contact angle was done after, 30 seconds when the droplet has been made into the surface. The measurements were performed for at least five trials at different areas of the sample surface and were replicated in three more samples. Note that the WCA value was acquired only when the water droplet was dropped at a relatively far distance (ca 0.3 cm) away from the surface since no reading can be measured if the droplet is to come into contact with the substrate. For dynamic contact angle measurements, the angles were measured using a Ramé-Hart model 100 contact angle goniometer. The liquids were dispensed and withdrawn using a Matrix Technologies micro-Electrapette 25. Contact angles were collected and averaged from measurements on four distinct slides using three separate drops per slide.

Atomic force microscopy (AFM) analysis was carried out in a piezo scanner from Agilent Technologies. The scanning rate was between 0.8-1.5 lines/s. Commercially available tapping mode tips (TAP300, Silicon AFM Probes, Ted Pella, Inc.) were used on cantilevers with a resonance frequency in the range of 290-410 kHz. The scanning of the PS-coated Au and ITO was performed under ambient and dry conditions. All AFM topographic images (AAC tapping mode) were filtered and analyzed by using Gwyddion software (version 2.19). Only the PS-coated substrates were scanned in the AFM. Because of the formation of very rough surfaces, the electropolymerized films on PS-coated substrates were only scanned in the SEM.

The attenuated total reflection infrared (ATR FTIR) spectra were obtained on a Digilab FTS 7000 equipped with a HgCdTe detector from 4000 to 600 (cm$^{-1}$) wavenumbers. All spectra were taken with a nominal spectral resolution of 4 cm$^{-1}$ in absorbance mode. All films were measured under ambient and dry conditions for several trials at different areas of the sample surface.

The morphology of the samples was examined by field emission scanning electron microscopy (FE-SEM) using a JSM 6330F JEOL instrument operating at 15 kV. Prior to SEM analysis, the films were thoroughly dried under vacuum for at least 24 hrs.

Quartz crystal microbalance (QCM) measurement was used for the adsorption of fibrinogen. The QCM apparatus, probe, and crystals were made available from Maxtek Inc. (Inficon). The AT-cut polished QCM crystals (5 MHz) was used as the working electrode. The data acquisition was done with an R-QCM system equipped with a built-in phase lock oscillator and the R-QCM Data-Log software. The QCM crystals were also cleaned (~120 sec) with an oxygen plasma etcher (Plasmod, March) immediately prior to use. The measurement was done by allowing a stable baseline in air prior to the injection of the protein solution. The QCM crystal with the polymeric surface was incubated in the fibrinogen solution (1 ml volume) for ~950 minutes. Afterwards, the protein solution was removed using micro pipette, and the crystal was rinsed with Milli-Q water to eliminate/minimize the salts from the PBS buffer. Then a stable baseline in air was again achieved after drying in the $N_2$ gas.

Bacterial Adhesion Measurements

Bacterial Culture

A single isolated *Escherichia coli* K12 MG1655 (*E. coli*) colony was inoculated in 5 mL Tryptic Soy Broth (TSB) overnight at 35° C. The bacterial culture was centrifuged at 3000 rpm for 10 minutes, and the bacteria pellet was resuspended in TSB. The optical density of the suspension was adjusted to 0.5 at 600 nm, which corresponds to a concentration of $10^7$ colony forming units per milliliters (CFU/ml). The doped, undoped colloidal-polymeric films and unmodified ITO substrate were individually placed in a 12 well-plate (Falcon). To each well was added 1.0 ml of bacterial culture and then incubated at 37° C. (without shaking) for 2 h. The samples were then removed and immediately prior to viewing were stained with 3 ml of SYTO 9 dye solution for 10 minutes from Molecular Probes (Leiden, The Netherlands) marking viable bacterial cells. The surfaces were placed in microscope slides, covered with a cover slip and imaged using BX 51 Olympus Fluorescent Microscope equipped with a DP72 digital camera under 100× objective. All images were acquired and analyzed using cell Sens Dimension software (Olympus).

Statistical analysis. The amount of attached bacterial cells was expressed as the mean number of bacteria±standard deviation of four experiments (3 replicates prepared at 2 different times). Statistical differences between median values were done using pair-wise comparison by ANOVA on ranks test using Sigma Plot Software (version 11). Significance was accepted at a level of $p<0.05$.

REFERENCES OF SECTION III

The following references were cited in this section.
1 (a) Feng, X. J.; Jiang, L. *Adv. Mater.* 2006, 18, 3063. (b) Blossey, R. *Nature Mater.* 2003, 2, 301. (c) Shiu, J-Y.; Chen, P. *Adv. Funct. Mater.* 2007, 17, 2680.
2 Barthlott, W.; Neinhuis, C. *Planta* 1997, 202, 1.
3 (a) Mock, U.; Förster, R.; Menz, W.; Rühe, J. *J. Phys. Condens. Matter* 2005, 17, S639. (b) Otten, A.; Herminghaus, S. *Langmuir* 2004, 20, 2405.
4 (a) Gao, X. F.; Jiang, L. *Nature* 2004, 432, 36. (b) Wagner, T.; Neinhuis, C.; Barthlott, W. *Acta Zool.* 1996, 77, 213. (c) Lee, W.; Jin, M. K.; Yoo, W. C.; Lee, J. K. *Langmuir* 2004, 20, 7665.
5 Ma, M.; Hill, M. *Curr. Opin. Colloid In.* 2006, 11, 193.
6 Darmanin, T.; Guittard, F. *J. Am. Chem. Soc.* 2009, 131, 7928.
7 (a) Houde, M.; Martin, J. W.; Letcher, R. J.; Solomon, K. R.; Muir, D. C. G. *Environ. Sci. Technol.* 2006, 40, 3463. (b) Giesy, J. P.; Kannan, K. *Environ. Sci. Technol.* 2001, 35, 1339.
8 (a) Huang, J-H.; Yang, C-Y.; Hsu, C-Y.; Chen, C-L.; Lin, L-Y.; Wang, R-R.; Ho, K-C.; Chu. C-W. *ACS Appl. Mater. Interfaces* 2009, 1, 2821. (b) Welsh, D. M.; Kloeppner, K. J.; Madrigal, L.; Pinto, M. R.; Schanze, K. S.; Abboud, K. A.; Powell, D.; Reynolds, J. R. *Macromolecules* 2002, 35, 6517. (c) Schwendeman, I.; Hwang, J.; Welsh, D. M.; Tanner, D. B.; Reynolds, J. R. *Adv. Mater.* 2001, 13, 634. (d) Gaupp, C. L.; Welsh, D. M.; Reynolds, J. R. *Macromol. Rapid Commun.* 2002, 23, 885. (d) Kumar, A.; Welsh, D. M.; Morvant, M. C.; Abboud, K.; Reynolds, J. R. *Chem. Mater.* 1998, 10, 896. (e) Kumar, A.; Reynolds, J. R. *Macromolecules* 1996, 29, 7629.
9 Genzer, J.; Efimenko, K. *Biofouling* 2006, 22, 339.
10 (a) Shiu, J-Y.; Kuo, C-W.; Whang, W-T.; Chen, P. *Lab Chip,* 2010, 10, 556. (b) Koc, Y.; de Mello, A. J.; McHale, G.; Newton, M. I.; Roach, P.; Shirtcliffe, N. J. *Lab Chip,* 2008, 8, 582.
11 Benmakroha, Y.; Zhang, S.; Rolfe, P. *Med. Bio. Eng. Comput.* 1995, 33, 811.
12 Kumar, N.; Parajuli, O.; Hahm, J-I. *J. Phys. Chem. B* 2007, 111, 4581. (b) Kumar, N.; Hahm, J.-I.; *Langmuir* 2005, 21, 6652. (c) Liu, D.; Wang, T.; Keddie, J. L. *Langmuir* 2009, 25, 4526.
13 (a) Park, J. Y.; Yoo, Y. J. *Appl. Microbiol. Biotechnol.* 2009, 82, 415. (b) Dash; R. R.; Gaur, A.; Balomajumder, C. *J. Hazard. Mater.* 2009, 163, 1.
14 (a) Yakimov, M. M.; Timmis, K. N.; Golyshin, P. N. *Curr. Opin. Biotechnol.* 2007, 18, 257. (b) Gavrilescu, M.; Pavel, L. V.; Cretescu, I. *J. Hazard. Mater.* 2009, 163, 475. (c) Vinther, F. P.; Brinch, U. C.; Elsgaard, L.; Fredslund, L.; Iversen, B. V.; Torp, S.; Jacobsen, C. S. *J. Environ. Qual.* 2008, 37, 1710. (d) Castillo Mdel, P.; Torstensson, L.; Stenstrom, J. *J. Agric. Food Chem.* 2008, 56, 6206.
15 (a) Close, M.; Dann, R.; Ball, A.; Pirie, R.; Savill, M.; Smith, Z. *J. Water Health* 2008, 6, 83. (b) Dopson, M.; Halinen, A. K.; Rahunen, N.; Bostrom, D.; Sundkvist, J. E.; Rieldcola-Vanhanen, M.; Kaksonen, A. H.; Puhakka, J. A. *Biotechnol. Bioeng.* 2008, 99, 811.
16 Shen, M.; Wagner, M. S.; Castner, D. G.; Ratner, B. D.; Horbett, T. A. *Langmuir* 2003, 19, 1692.
17 (a) Mrksich, M.; Sigal, G. B.; Whitesides, G. M. *Langmuir* 1995, 11, 4383. (b) Goodman, S. L.; Simmons, S. R.; Cooper, S. L.; Albrecht, R. M. *J. Colloid Interface Sci.* 1990, 139, 561.
18 (a) Sigal, G. B.; Mrksich, M.; Whitesides, G. M. *J. Am. Chem. Soc.* 1998, 120, 3464. (b) Baier, R. E.; Meyer, A. E.; Natiella, J. R.; Natiella, R. R.; Carter, J. M. *J. Biomed. Mater. Res.* 1984, 18, 337.
19 Frentzen, M.; Oxborn, J. F.; Nolden, R. *Dtsch. Zahnaerzd Z.* 1988, 43, 719.
20 Tsvetanova, Z. *Chemicals as Intentional and Accidental Global Environmental Threats*; Springer: Netherlands, 2006, 463.
21 (a) Chapman, R. G.; Ostuni, E.; Liang, M. N.; Meluleni, G.; Kim, E.; Yan, L.; Pier, G.; Warren, H. S.; Whitesides, G. M. *Langmuir* 2001, 17, 1225. (b) Sadana, A. *Chem. Rev.* 1992, 92, 1799.
22 (a) Banerjee, I.; Pangule, R. C.; Kane, R. S. *Adv. Mater.* 2011, 23, 690. (b) Pompe, T.; Zschoche, S.; Herold, N.; Salchert, K.; Gouzy, M-F.; Sperling, C.; Werner, C. *Biomacromolecules,* 2003, 4, 1072. (c) Johnell, M.; Larsson, R.; Siegbahn, A. *Biomaterials* 2005, 26, 1731. (d) Klement, P.; Du, Y. J.; Berry, L.; Andrew, M.; Chan, A. K. C. *Biomaterials* 2002, 23, 527. (e) Ferrer, M. C. C.; Yang, S.; Eckmann, D. M.; Composto, R. J. *Langmuir* 2010, 26, 14126. (f) Liu, M.; Yue, X.; Dai, Z.; Ma, Y.; Xing, L.; Zha, Z.; Liu, S.; Li, Y. *ACS Appl. Mater. Interfaces,* 2009, 1 113. (g) Rabinow, B. E.; Ding, Y. S.; Qin, C.; Mchalsky, M. L.; Schneider, J. H.; Ashline, K. A.; Shelbourn, T. L.; Albrecht, R. M. *J. Biomater. Sci. Polym. Ed.* 1994, 6, 91. (h) Lehmann, T.; Ruhe, J. *Macromol. Symp.* 1999, 142, 1. (i) Benhabbour, S. R.; Liu, L.; Sheardown, H.; Adronov, A. *Macromolecules,* 2008, 41, 2567. (k) Prime, K. L.; Whiteside, G. M. *J. Am. Chem. Soc.* 1993, 115, 10714. (c) Gombotz, W. R.; Guanghui, W.; Horbett, T. A.; Hoffman, A. S. *J. Biomed. Mater. Res.* 1991, 25, 1547. (1) Jeon, S. I.; Andrade, J. D.; de Gennes, P. G. *J. Colloid Interface Sci.* 1991, 142, 159. (m) Grunze, M.; Harder, P.; Spencer, N. D.; Hahner, G.; Feldman, K. *J. Am. Chem. Soc.* 1999, 121, 10134. (n) Prime, K. L.; Whitesides, G. M. *Science* 1991, 252, 1164. (o) Reisch, A.; Voegel, J-C.; Gonthier, E.; Decher, G.; Senger, B.; Schaaf, P.; Mesini, P. J. *Langmuir* 2009, 25, 3610. (p) Reisch, A.; Hemmerlé, J.; Voegel, J-C.; Gonthier, E.; Decher, G.; Benkirane-Jessel, N.; Chassepot, A.; Mertz, D.; Lavalle, P.; Mésini, P.; Schaaf, P. *J. Mater. Chem.* 2008, 18, 4242.
23 (a) Bers, A. V.; Wahl, M. *Biofouling* 2004, 20, 43. (b) Hoipkemeier-Wilson, L.; Schumacher, J. F.; Carmen, M. L.; Gibson, A. L.; Feinberg, A. W.; Callow, M. E.; Finlay, J. A.; Callow, J. A.; Brenan, A. B. *Biofouling* 2004, 20, 53. (c) Zhang, H.; Lamb, R.; Lewis, J. *Sci. Technol. Adv. Mater.* 2006, 6, 236.
24 Marmur, A. *Biofouling* 2006, 22, 107.

25 Lichter, J. A.; Van Vliet, K. J.; Rubner, M. F. *Macromolecules* 2009, 42, 8573.
26 (a) Permites, R. B.; Ponnapati, R. R.; Advincula, R. C. *Macromolecules* 2010, 43, 9724. (b) Pemites, R. B.; Ponnapati, R. R.; Felipe, M. J.; Advincula, R. C. *Biosens. Bioelectron.* 2011, 26, 2766.
27 Marquez, M.; Grady, B. P. *Langmuir* 2004, 20, 10998.
28 Lange, U.; Roznyatouskaya, N. V.; Mirsky, V. M. *Anal. Chim. Acta* 2008, 614, 1:
29 Apodaca, D. C.; Permites, R. B.; Ponnapati, R. R.; Del Mundo, F.; Advincula, R. C. *ACS Appl. Mater. Interfaces* 2011, 3,191.
30 (a) Rasch, B.; Vielstich, W. *J. Electroanal. Chem.* 1994, 370, 109. (b) Roncali, *J. Chem. Rev.* 1992, 92, 711-738.
31 Miwa, M.; Nakajima, A.; Fujishima, A.; Hashimoto, K.; Watanabe, T. *Langmuir* 2000, 16, 5754.
32 (a) Steele, A.; Bayer, I.; Loth, E. *Nano Lett.* 2009, 9, 501. (b) Johnson Jr., R. E.; Dettre, R. H. *Adv. Chem. Ser.* 1963, 43, 112.
33 Cassie, A. B. D.; Baxter, S. *Trans. Faraday Soc.* 1944, 40, 546.
34 Marmur, A. *Langmuir* 2003, 19, 8343.
35 Taranekar, P.; Fulghum, T.; Baba, A.; Patton, D.; Advincula, R. C. *Langmuir* 2007, 23, 908.
36 Xia, C.; Park, M-K.; Advincula, R. C. *Langmuir* 2001, 17, 7893.
37 Ikeda, T.; Higuchi, M.; Kurth, D. G. *J. Am. Chem. Soc.* 2009, 131, 9158.
38 (a) Deore, B.; Chen, Z.; Nagaoka, T. *Anal. Sci.* 1999, 15, 827. (b) Bredas, J. L.; Street, G. B. *Acc. Chem. Res.* 1985, 18, 309.
39 Azioune, A.; Chehimi, M. M.; Miksa, B.; Basinska, T.; Slomkowski, S. *Langmuir* 2002, 18, 1150.
40 (a) Ostuni, E.; Chapman, R. G.; Holmlin, R. E.; Takayama, S.; Whitesides, G. M. *Langmuir,* 2001, 17, 5605. (b) Chapman, R. G.; Ostuni, E.; Takayama, S.; Holmlin, R. E.; Yan., L.; Whitesides, G. M. *J. Am. Chem. Soc.* 2000, 122, 8303. (c) Ostuni, E.; Chapman, R. G.; Liang, M. N.; Meluleni, G.; Pier, G.; Ingber, D. E.; Whitesides, G. M. *Langmuir.* 2001, 17, 6336.
41 Clarke, M. L.; Wang, J.; Chen, Z. *J. Phys. Chem. B* 2005, 109, 22027.
42 Yang, Q.; Strathmann, M.; Rumpf, A.; Schaule, G.; Ulbricht, M. *ACS. Appl. Mater. Interfaces* 2010, 2, 3555.
43 Wei, T.; Kaewtathip, S.; Shing, K. *J. Phys. Chem. C* 2009, 113, 2053.
44 Liu, T.; Dong, L.; Liu, T.; Yin, Y. *Electrochim. Acta* 2010, 55, 5281.
45 (a) Bayer, M. E.; Sloyer Jr., J. L. *J. Gen. Microbio* 1990, 136, 867. (b) Ghuysen, J. M.; Hackenbeck, R. *Bacterial Cell Wall*; Elsevier: Amsterdam, The Netherlands, 1994.
46 (a) Oren, Z.; Shai, Y. *Biopolymers* 1998, 47, 451. (b) Shai Y. *Biopolymers* 2002, 66, 236.

Detailed Description of Section IV

Patterned Surfaces Combining Polymer Brushes and Conducting Polymer Via Colloidal Template Electropolymerization Introduction Section IV Recently, there has been a significant interest in the fabrication of patterned polymer surfaces because of potential applications in surface-based technologies such as microfluidic devices, chemical/biosensors, platforms for tissue engineering, etc.[1] To date, polymer brushes are widely used in patterning surfaces due to their robustness, broad range of chemical and mechanical properties, and ability to modify surface properties,[2] and thus an ideal surrogate for self-assembled monolayers (SAM)s. Despite the numerous applications of patterned polymer surfaces, there have been a limited number of strategies reported toward the formation of laterally well-defined binary composition patterned brushes.[3] Most of the methods used involve expensive, tedious and complex lithographic techniques,[4] which limits their practical applications.

Another material of high interest are conducting polymers, which are a versatile class of organic materials with electrical, optical, and electrochemical properties that are easily modified by design and synthesis. They are useful as display materials, semi-conductors, electrochromic devices, fluorescent materials, non-linear optical materials, electromagnetic shielding, and various types of industrial coatings for anti-corrosion and anti-static purposes.[5] Due to their unique properties, conducting polymers[6] are also being exploited in making 2D nano/microstructured arrays because of the many applications such as photonic crystals, diffraction gratings, biosensors, and surface-enhanced Raman scattering (SERS).[7]

The electropolymerization technique endows several advantages—ease in control of thickness and lateral dimension of the pattern, site-directed patterning, and deposition over large surface areas onto various conducting substrates. One unique electrodeposition approach is by template-assisted electropolymerization, which has remained largely unexplored for 2-D patterning. To our knowledge, this is the first report on binary composition patterned surfaces combining a conducting polymer and a polymer brush via a simple approach of colloidal template-assisted electropolymerization followed by growing the polymer brush, using surface initiated atom transfer radical polymerization (SI-ATRP). The present invention is also the first account on dual patterned inverse colloidal crystals (in a single layer assembly) of electrodeposited conducting polymer and an SI-ATRP initiator.

Summary of Inventions Section IV

Embodiments of the generic method of this invention should be useful for making different types of binary patterned surfaces using different combinations of polymer brushes, conducting polymers, and self-assembled monolayers. The importance of such combinations may be found in redox-active (π-conjugated polymer-based) stimuli-responsive polymer brushes and modulation of electro-optical properties simultaneous with changes in solvent swelling properties (polymer brushes), dependent on the binary composition and mode or size of patterning.

Detailed Description Section IV

Figure 46:
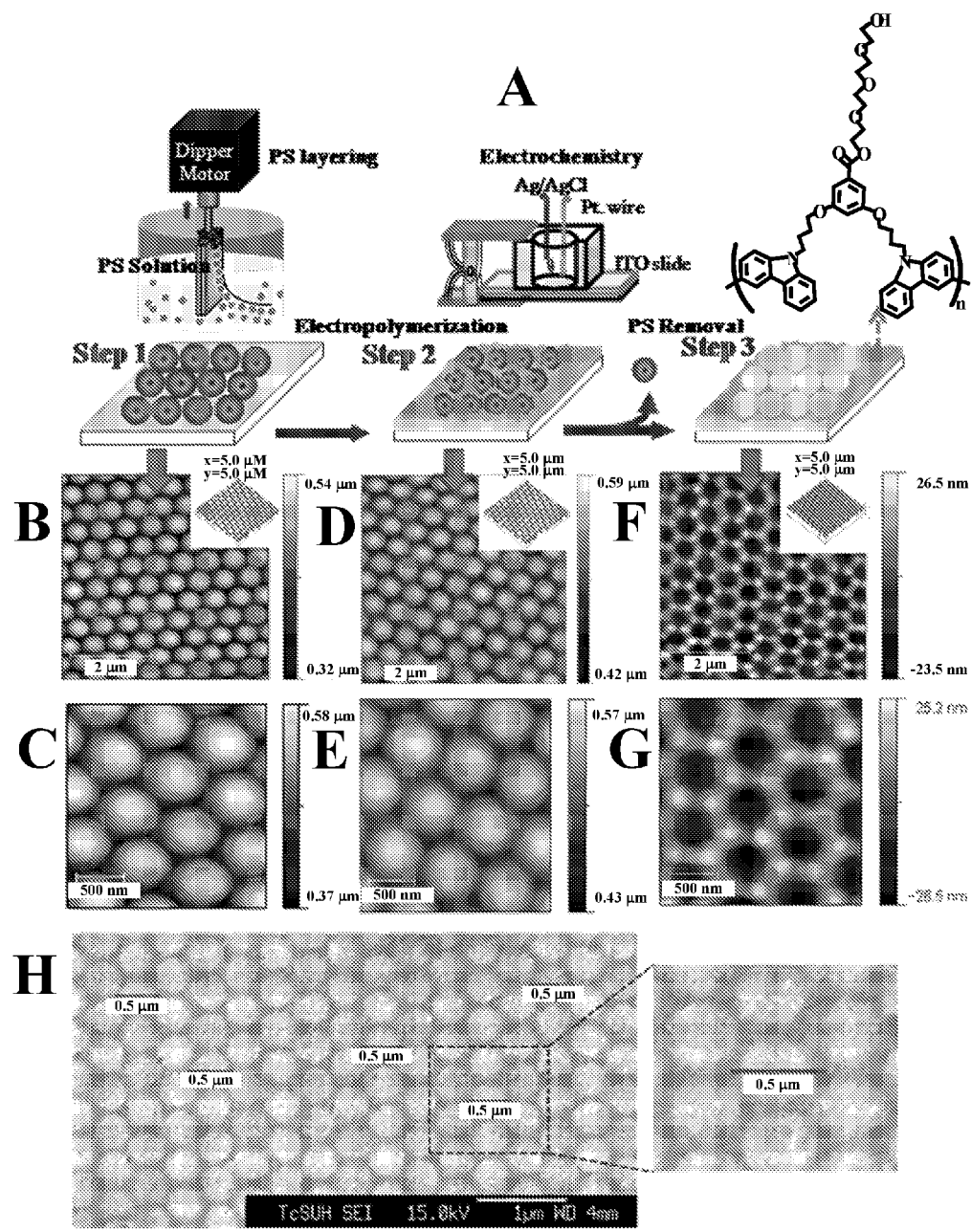
Figure 47:
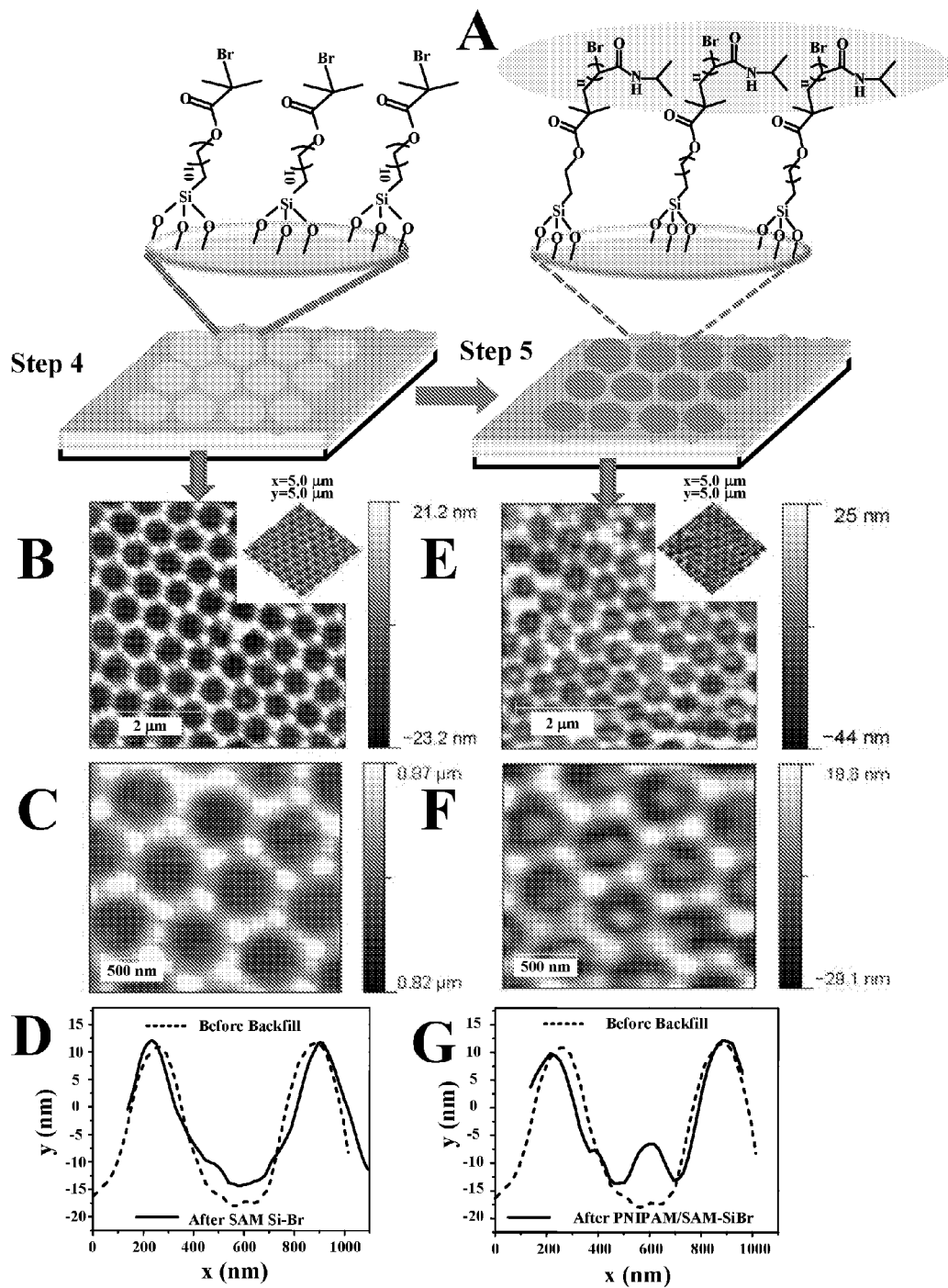

The protocol for stepwise patterning of binary patterned polymer surfaces is illustrated in FIG. 46A to FIG. 47A. First, the layering of polystyrene (PS) microspheres particles was done on flat conducting substrates such as indium tin oxide (ITO) and gold (Au) using the so-called Langmuir-Blodgett (LB)-like technique,[8] which uses only a vertical lifting motor (FIG. 46A, step 1). The LB-like technique allows the monolayer deposition of particles in hexagonal arrangement on the substrate (FIG. 46B and 46C), which serves as a template for the electrodeposition of conducting polymer. The monolayer ordering of the microsphere particles (called colloidal crystals) has been previously reported to be dependent on the vertical drawing speed of the LB-like technique, and the concentration of the particles and surfactant (sodium n-dodecyl sulfate or SDS) in solution.[8] The high ordering of the particles on the surface is well-preserved (FIG. 46D and 46E) even after the electropolymerization of the conducting polymer (polycarbazole) via cyclic voltammetry (CV). Note that this result is only made possible by using the right solvent like acetonitrile during electropolymerization. Other solvents such as water, dichloromethane (DCM), toluene, and tetrahydrofuran (THF) tend to wash the particles and destroy the ordering. The electrodeposition of the conducting polymer is observed by the increasing reduction-oxidation (redox) peak (between 0.7 to 0.9 V) of the poly(carbazole) as the potential is sweep from 0V-1.1 V from cycle 1 to 20 (FIG. 48). Moreover, the decrease in frequency ($\Delta F$) of the quartz crystal microbalance (QCM) accompanying the increase of the redox peak (in-situ electrochemistry-QCM measurements) corroborates the electrodeposition of the conducting polymer onto the PS Au coated substrate (FIG. 49). Using the Sauerbrey equation, an average of 8.97 µg (dry mass) is adsorbed onto the QCM crystal due to the electrodeposition of the polymer film. The advantage of using the CV for electropolymerization is the ability to control the deposition of a polymer and the two dimensional size of arrays by various electrochemical process variables and the size of the colloidal spheres. For instance, the conducting polymer is electrodeposited only at the interstitial void spaces underneath and in-between the PS particles, which is substantiated after removing the PS particles on the surface by washing with THF (2×, 30 min). The removal of the PS particles that serve as sacrificial templates for electropolymerization creates a monolayer array of conducting polymer network (called inverse colloidal crystals) of poly(carbazole) with pre-grafted ethylene glycol (EG) units (poly(CBzTEGG1) (FIG. 46F and 46G). Previously, surfaces modified with EGs have been known to resist the non-specific adsorption of proteins, and thus may find potential applications as biomedical coatings.[9] The SEM analysis confirms the AFM topography measurements of the inverse colloidal crystals, which depicts a high periodicity of the 500 nm PS imprinted film (FIG. 46H). The size of the cavity matches the size of the PS particle template (~500 nm) as determined by the SEM cross-sectional analysis (FIG. 46H right). The AFM line profile determines an average height of the cavity equivalent to 29.05±0.60 nm. The exact elemental analysis (C, N, O) as shown in Table IV.1 on the surface by complimentary x-ray photoelectron spectroscopy (XPS) confirms the electrodeposition of poly(carbazole) as shown in FIG. 50.

TABLE IV.1

Summary of Atomic Concentrations Determined from XPS

| Substrate | | C (%) | N (%) | O (%) |
|---|---|---|---|---|
| CBzTEGG1 | Theoretical value | 78.33 | 3.88 | 17.77 |
| CBzTEGG1 onto 500 nm PS/Au (after PS removal) | Experimental | 78.53 | 4.03 | 17.45 |

Moreover, the UV-Vis spectrum as shown in FIG. 51 of the surface reveals the signature peaks of a typical poly(carbazole) electrodeposited film on ITO with peaks centered at ~450 nm and ~890 nm, which are consistent with our earlier results.[10] These peaks are assigned to the π-π* transistion of the poly(carbazole)[11] and the polaronic band formation of the conjugated poly(carbazole) species and their complex redox ion couple with hexafluorophosphate ions,[10,12] respectively.

To create a highly ordered and dual pattern surface as shown in FIG. 47A, the inside cavities of inverse colloidal crystals of conducting polymer network were first back-filled with a silane molecule, 11-(2-Bromo-2-methyl)propionyloxy) undecyltrichlorosilane or Si—Br (details of the synthesis are described herein), which is an ATRP initiator used for grafting polymer brushes. The adsorption of the Si—Br self-assembled monolayer (SAM) into the inner holes is clearly seen in the AFM topography images as shown in FIGS. 47B and 47C, which is also evident in the decrease of the peak-to-baseline height in the AFM line profile analysis as shown in FIG. 47D. This dual pattern surface is amplified upon grafting the polymer brush atop the initiator layer. The difference in height before and after Si—Br SAM immobilization (~4.8 nm) into the cavities is equivalent to the theoretical length of the molecule calculated using Spartan, Wavefunction quantum calculations (FIG. 52). Also, the root-mean-square (rms) roughness value of the inner holes has increased to 3.15±0.36 nm from 2.45±0.32 nm after the back filling step. Note that the rms value of bare ITO is equivalent to 2.00±0.19 nm. The adsorption of the Si—Br SAM onto the macroporous polymer array is also confimed by the increasing hydrophobicity of the surface. Its water contact angle (WCA) had increased to 90°±2° from 83°±1° (WCA of inverse opals on ITO). Then the poly(n-isopropylacrylamide) (pNIPAM) brush was grown (~15 minutes reaction time) from the inner cavities via the ATRP initiator underlying surface. Similarly, the growth of the pNIPAM brush is shown in the AFM topography images as shown in FIGS. 47E and 47F. Now the back filling of the holes is more apparent with the growth of the polymer brush. The line profile analysis as shown in FIG. 47G validates the results as shown by the decrease of the peak-to-baseline height, which is lower than the Si—Br SAM. An average increase of ~12 nm in height of the inside layer is determined from the line profile. Moreover, the rms value of the inside cavities has increased to 4.71±0.82 nm, which is close to the rms value (4.52±0.56 nm) of the pNIPAM brush grown on unpatterned surface (bare ITO).

To further verify the adsorpton of the initiator and pNIPAM brush, XPS was used to analyze the patterned surface. The presence of the bromine (Br 3d) peak[13] as shown in FIG. 53A in the XPS high resolution scan, which is a unique elemental marker due only to the ATRP initiator, confirmed the immobilization of Si—Br. Likewise, the growth of the pNIPAM brush is evidenced by the increased in signal of the elements (C, N, O) in the survey scan as shown in FIG. 53B, which is more obvious with the N 1s peak (~400 eV).[13, 14a] Also, the survey scan reveals that the pattern surface is clean since the elements present are due only to the conducting polymer and the polymer brush. The bromine element as shown in FIG. 53B (inset), which is also a distinctive element of the pNIPAM brush,[13, 14a] is better seen in the high resolution scan. A more compelling evidence about the growth of the polymer brush is given by the attenuated total reflectance infrared (ATR IR) analysis as shown in FIG. 53C, which shows the characteristic peaks of pNIPAM as shown in FIG. 53C (green curve) reported in literature:[14] amide I band (1640 cm$^{-1}$) due to primary amide —C=O strething, amide band II (1540 cm$^{-1}$) due to secondary amide —N—H stretching, secondary amide —N—H stretching (3300-3500 cm$^{-1}$), and —CH$_3$, and —CH$_2$, asymmetric stretching (2800-3000 cm$^{-1}$). The same peaks are confirmed with the spectrum of the pNIPAM brush as shown in FIG. 53C (blue curve) grown on unpattern surface (bare ITO). As expected, the peak intensities in the spectrum of the pNIPAM brush grafted on bare ITO is higher than the pNIPAM pattern surface, which is attributed to the thicker brush formation in the unpatterned surface (ellipsometry thickness ~17.82±3.77 nm). Note that the ATR IR measurements is less sensitive to the analysis of thinner films. The macroporous conducting polymer network (inverse colloidal crystals) was also scanned in the ATR IR. The spectrum as shown in FIG. 53C (black curve) divulges the signature peaks of the polycarbazole[15] with anchored ethylene glycol units: —C=O stretching (1720 cm$^{-1}$) due to the pre-grafted carboxylic acid moiety, broad —OH stretching (3050-3550 cm$^{-1}$) due to the hydroxy terminated EG unit, —C=C strething (1593 cm$^{-1}$) due to the carbazole head group, and —CH$_2$ and —CH asymmetric stretching (2800-3000 cm$^{-1}$). Noteworthy, the emergence of the —N—H stretch (3300-3500 cm$^{-1}$) due to pNIPAM brush (shifting of the original —OH stretch) and still appearance of the —C=O stretch (noticeable shoulder peak, FIG. 53C (inset)) due only to poly(carbazole) with EG moiety proves the formation of a dual pattern surface as shown in FIG. 53C (green curve), which is earlier observed in the AFM topography measurements. Finally, the current sensing (CS)-AFM in contact mode was used to analyze the dual pattern surface. Unlike the tapping mode AFM, the topography image determined from the contact mode has lesser resolution but still the pattern is evident as shown in FIG. 54A. Nevertheless, the macroporous polymer network is better seen in the friction image as shown in FIG. 54B and current image as shown in FIG. 54C based on color distribution, which presents a good image contrast due to the difference in conductivity of the two materials with a high conductance corresponding to the honeycomb web-like array of conducting polymer. This finding is coherent with the previous current image of an ordered honeycomb of 4-dodecylbenzesulfonic acid (DBSA)-doped polyaniline (PANI).[16] Another coercing evidence is the outcome of the conductivity measurements by CS-AFM. For instance, the wall cavity of the pattern (AFM tip positioned at area 1, FIG. 54D) that is mainly poly(CBzTEGG1) exhibits a typical junction, I-V curve as shown in FIG. 54E of a conducting polymer[17] which is consistent with our earlier report.[17a] In contrast, the inside region of the cavity (AFM tip positioned at area 2, FIG. 54D) shows a nil current depicted by a flat line in the I-V curve (FIG. 54F). This result is expected since this area is composed of the pNIPAM brush that is non-conducting. Furthermore, the observed I-V (FIG. 54E) curve on the wall cavity is asymmetric with respect to 0 V, suggesting an archetypal semi-conductor-metal junction.[17a] Therefore, the CS-AFM is a powerful technique to verify the formation of patterned surfaces especially in the case of differing conductivity of the materials. Note that absolute conductivity values cannot be determined from this type of measurements (non-ohmic) but rather the technique is used mainly to differentiate the area of the conducting polymer (even at dedoped state) from the polymer brush.

In conclusion, we have developed a facile and new approach to creating topologically and chemically defined polymer surfaces by combining the techniques of colloidal sphere layering, electropolymerization and polymer brush synthesis. In principle, with the versatility of the method, it should be obvious to make dual or binary composition patterned surfaces using different polymer brushes, conducting polymers, self-assembled monolayers or a combination of any two. The fabricated binary patterned surface finds potential application in developing a dual responsive sensor film with specific composition of redox active and electrically conducting polymers within a periodic vicinity of surface attached molecular and macromolecular moieties for tethering specific receptors. The presence of the conducting polymer interconnected network can be used to control the stimuli-response in a hydrogel polymer brush link pNIPAM or enable control of p-conjugated polymer electro-optical properties combined with solvent-effects by the polymer brush.

Experiments of Section IV

Materials

The polystyrene (PS) latex microbeads (500 nm size, 2.5 wt. % solids in aqueous suspension) were purchased from Polysciences, Inc. and were used without further purification. The acetonitrile (ACN), sodium n-dodecyl sulfate (SDS), tetrahydrofuran (THF), methanol (MeOH), tetrabutylammonium hexafluorophosphate (TBAH), n-Isopropylacrylamide (NIPAM), N,N,N',N',N"-pentamethyldiethylenetriamine (PMDETA), and copper (I) bromide (CuBr) were obtained from Sigma-Aldrich. The monomer (CBzTEGG1) used in the electropolymerization was synthesized as described below. The PS solution used for layering contains 1 wt. % PS particles and 34.7 mM SDS (spreading agent) in Milli-Q water.

CV was performed in a fabricated electrochemical cell (Teflon-made, with a diameter of 1.0 cm and volume of 0.785 cm$^3$) using a conventional three-electrode cell using an Autolab PGSTAT 12 potentiostat (MetroOhm, Inc). AFM measurements were done on a PicoScan 2500 AFM from Agilent Technologies using tapping mode with scanning rate between 1-1.5 lines/s. Commercially available tapping mode tips (TAP300-10, silicon AFM probes, Tap 300, Ted Pella, Inc) were used on cantilevers with a resonant frequency in the range of 290-410 kHz. All AFM topographic images were filtered and analyzed using the Gwyddion software (version 2.19). The CS-AFM analyses in contact mode were done on the same set up using Pt-coated Si$_3$N$_4$ tip with radius around 20 nm and force constant of 0.5 N/m. Ellipsometry was used to measure the thickness of the polymer brush film on Au substrate using the Multiskop ellipsometer (Optrel GmbH, Germany) equipped with a 632.8 nm laser (at 60° angle of incidence). The measured values of delta and psi were used to calculate the thickness of the film using an integrated specialized software (Elli, Optrel) that was provided with the instrument. The thickness of the pNIPAM brush was calculated using a multilayer flat film model with an assumed refractive index of 1.5.[14a,18] Contact angle measurements were accomplished on a CAM 200 optical contact angle meter (KSV Instruments Ltd). XPS measurement (at take off angle of 45° from the surface) were carried out on a PHI 5700 X-ray photoelectron spectrometer with a monochromatic Al Kα X-ray source (hn=1486.7 eV) incident at 90° relative to the axis of a hemispherical energy analyzer. The ATR FTIR spectra of the film on ITO substrate were obtained on a Digilab FTS 7000 equipped with a HgCdTe detector from 4000 to 600 (cm') wavenumbers with a nominal spectral resolution of 4 cm$^{-1}$ in absorbance mode. SEM analysis was done in field emission scanning electron microscopy (FE-SEM) using a JSM 6330F JEOL instrument operating at 15 kV.

Preparation of Patterned Surfaces

First, the formation of colloidal crystals using PS on ITO and Au was accomplished by following the procedures reported by Grady and co-workers.[8] This step was followed by CV-electropolymerization (50 mV/s, 0V-1.1V, 20 cycles) of the monomer (5 mM CBzTEGG1 in ACN with 0.1 M TBAH as supporting electrolyte). Then the PS microspheres were removed from the surface by dipping the substrate into THF (for 30 min, twice) to create an inverse colloidal crystals. To prepare a dual patterned surface, the pre-patterned (inverse opal) substrate was placed into a solution of 8 mM ATRP initiator anhydrous toluene (for 19 hr without stirring, 60° C.). The initiator backfilled pre-patterned substrate was thoroughly rinsed sequentially with toluene, followed by drying with nitrogen gas. Note that 11-(2-Bromo-2-methyl)propionyloxy) undecyltrichlorosilane was used as initiator for patterned surface on ITO substrate while 11-mercaptoundecyl 2-bromo-2-methylpropanoate for patterned surface on Au substrate. To grow the brush, the initiator back-filled inverse opal substrate was placed into a schlenk tube and degassed with nitrogen. During this time a 0.16 M solution of NIPAM with a 1:1 ratio of methanol/water and 28 µL PMDETA was subjected to 3 cycles of freeze pump thaw technique. A third schlenk tube contained CuBr (6.35 mg, 0.04 mmol) was also degassed with nitrogen. Once the freeze pump thaw cycles were completed the solution containing the NIPAM, MeOH/$H_2O$, and PMDETA were transferred into the schlenk tube containing the CuBr using a syringe. After 5 min of stirring, this solution was then transferred into the schlenk tube containing the substrate with the ATRP-initiator selectively bound to the inner cavity of the polymer network array. After the desired time (15 min), the substrate were rinsed with water, methanol and placed into a vial with a 1:1 MeOH/$H_2O$ ratio solution over night to remove any unbound NIPAM, ligand, or metal catalyst.

REFERENCES FOR THE DETAILED DESCRIPTION OF SECTION IV

The following references were cited in this section.
1 a) R. L. McCarley, B. Vaidya, S. Wei, A. F. Smith, A. B. Patel, J. Feng, M. C. Murphy, S. A. Soper, *J. Am. Chem. Soc.* 2005, 127, 842; b) B. M. Lamb, S. Park, M. N. Yousaf, *Langmuir* 2010, 26, 12817; c) B. Yuan, Y. Li, D. Wang, Y. Xie, Y. Liu, L. Cui, F. Tu, H. Li, H. Ji, W. Zhang, X. Jiang, *Adv. Funct. Mater.* 2010, 20, 3715; d) N. J. Fredin, A. H. Broderick, M. E. Buck, D. M. Lynn, *Biomacromolecules* 2009, 10, 994.
2 R. C. Advincula, B. Brittain, J. Ruhe, K. Caster, *Polymer Brushes: Synthesis Characterizations, Applications*, Wiley-VCH, Weinheim, Germany 2004.
3 a) F. J. Xu, Y. Song, Z. P. Cheng, X. L. Zhu, C. X. Zhu, E. T. Kang, K. G. Neoh, *Macromolecules* 2005, 38, 6254; b) O. Prucker, J. Habicht, I. J. Park, J. Ruhe, *Mater. Sci. Eng., C* 1999, 8, 291; c) F. Zhou, L. Jiang, W. M. Liu, Q. Xue, *Macromol. Rapid Commun.* 2004, 25, 1979; d) Y. Liu, V. Klep, I. Luzinov, *J. Am. Chem. Soc.* 2006, 128, 8106.
4 a) A. del Campo, E. Arzt, *Chem. Rev.* 2008, 108, 911; b) M. Y. Paik, Y. Xu, A. Rastogi, M. Tanaka, Y. Yi, C. R. Ober, *Nano Lett.* 2010, 10, 3872; c) S. Jung, M. Kaholek, W. Lee, B. LaMattina, T. H. LaBeam, S. Zauscher, *Adv. Mater.* 2004, 16, 2141; d) T. Farhan, W. T. S. Huck, *Eur. Polym. J.* 2004, 40, 1599; e) O. Prucker, M. Schimmel, G. Tovar, W. Knoll, J. Ruhe, *Adv. Mater.* 1998, 10, 1073; f) X. G. Liu. S. W. Guo, C. A. Mirkin, *Angew. Chem. Int. Ed.* 2003, 42, 4785; g) T. A. von Werne, D. S. Germack, E. C. Hagberg, V. V. Sheares, C. J. Hawker, K. R. Carter, *J. Am. Chem. Soc.* 2003, 125, 3831.
5 J. Roncali, *Chem. Rev.* 1992, 92, 711.
6 a) T. Cassagneau, F. Caruso, *Adv. Mater.* 2002, 14, 34; b) S. Tian, J. Wang, U. Jonas, W. Knoll, *Chem. Rev.* 2005, 17, 5726.
7 a) D. V. Talapin, J-S. Lee, M. V. Kovalenko, E. V. Shevchenko, *Chem. Rev.* 2010, 110, 389; b) L. Lu, A. Eychmuller, *Acc. Chem. Res.,* 2008, 41 244.
8 M. Marquez, B. P. Grady, *Langmuir* 2004, 20, 10998.
9 a) T. L. Clare, B. H. Clare, B. M. Nichols, N. L. Abbott, R. J. Hamers, *Langmuir* 2005, 21, 6344; b) L. Li, S. Chen, J. Zheng, B. D. Ratner, S. Jiang, *J. Phys. Chem. B* 2005, 109, 2934; c) K. L. Prime, G. M. Whitesides, *J. Am. Chem. Soc.* 1993, 115, 10714.
10 C. Kaewtong, G. Jiang, Y. Park, T. Fulghum, A. Baba, B. Pulpoka, R. C. Advincula, *Chem. Mater.* 2008, 20, 4915.
11 D. A. Buttry, in *Electroanalytical Chemistry, Vol.* 17 (Ed: A. J. Bard), Marcel Dekker, New York 1991, p 1.
12 T. Fulghum, A. Karim, A. Baba, P. Taranekar, T. Nakai, T. Masuda, R. Advincula, *Macromolecules* 2006, 39, 1467.
13 T. Fujie, J. Y. Park, A. Murata, N. C. Estillore, M. C. R. Tria, S. Takeoka, R. C. Advincula, *ACS Appl. Mater. Interfaces* 2009, 1, 1404.
14 a) N. C. Estillore, J. Y. Park, R. C. Advincula, *Macromolecules* 2010, 43, 6588; b) M. Kaholek, W-K. Lee, S-J. Alm, H. Ma, K. C. Caster, B. LaMattina, S. Zauscher, *Chem. Mater.* 2004, 16, 3688.; c) Y. V. Pan, R. A. Wesley, R. Luginbuhi, D. D. Denton, B. D. Ratner, *Biomacromolecules* 2001, 2, 32.
15 P. Taranekar, T. Fulghum, A. Baba, D. Patton, R. C. Advincula, *Langmuir* 2007, 23, 908.
16 C. Yu, J. Zhai, X. Gao, M. Wan, L. Jiang, T. Li, Z. Li, *J. Phys. Chem. B.* 2004, 108, 4586.
17 a) G. Jiang, A. Baba, R. C. Advincula, *Langmuir* 2007, 23, 817; b) A. Baba, J. Locklin, R. Xu, R. C. Advincula, *J. Phys. Chem. B.* 2006, 110, 42.
18 T. M. Fulghum, N. C. Estillore, C-D. Vo, S. P. Armes, R. C. Advincula, *Macromolecules* 2008, 41, 429.

SYNTHESIS
SCHEME IV.1

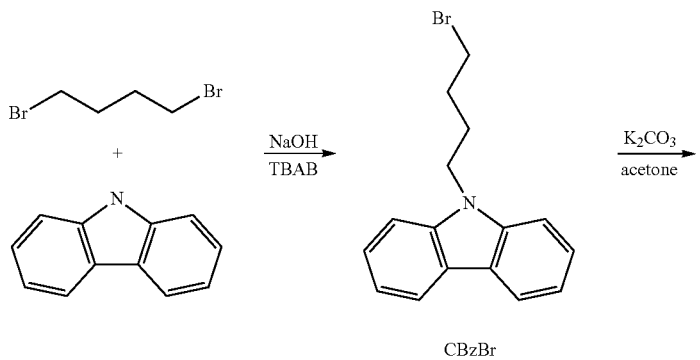

CBzBr

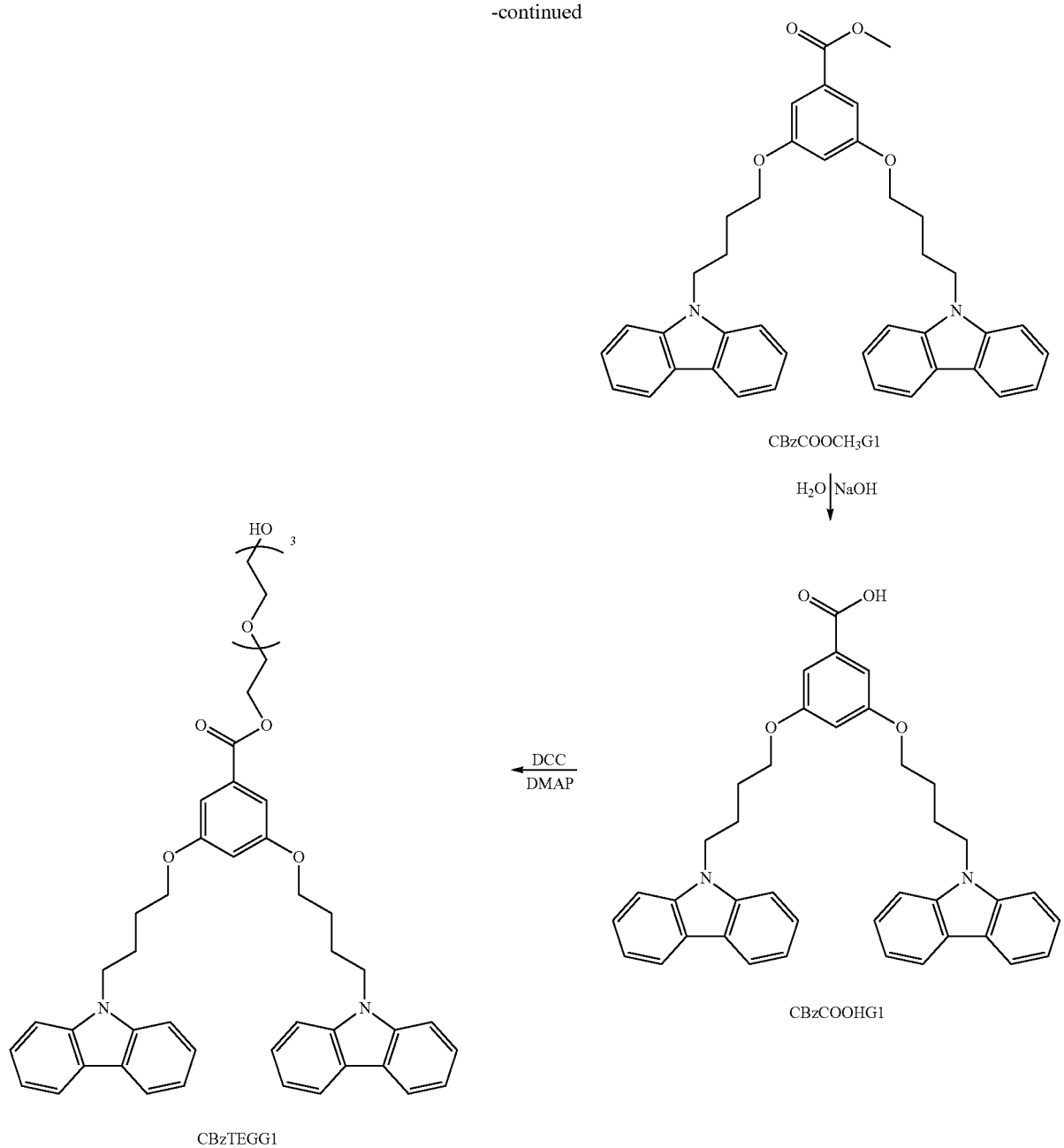

Sythesis of the Functional and Cross-Linking Monomer (CBzTEGG1)[1]

Synthesis of 9-(4-bromobutyl)-9H-carbazole [CBz Br]

The synthesis of CBz Br was done by combining carbazole (20.64 g, 0.1236 mol), 1,4-dibromobutane (132 mL, 1.095 mol), tetrabutylammonium bromide (4 g, 0.0124 mol), toluene (200 mL), and 50% NaOH (200 mL). The resulting mixture was stirred at 45° C. for 3 hrs and continuously stirred at room temperature overnight. The clear, yellow organic layer was then washed with 100-mL portions H$_2$O followed by 100 mL brine solution. This was then dried over anhydrous Na$_2$SO$_4$. The solvent was removed via rotary evaporator and the excess 1,4-dibromobutane via vacuum distillation. After which, the resulting cream-like solid residue was slowly dissolved in small portions of CH$_2$Cl$_2$. The yellow-brown solution was recrystallized using ethanol. The resulting white solid residue was dried under vacuum overnight. $^1$H NMR (δ ppm in CDCl$_3$): 8.12 (d, 2H), 7.22-7.48 (m, 6H), 4.36 (t, 2H), 3.38 (t, 2H), 1.95-2.07 (m, 4H).

Synthesis of methyl 3,5-bis(4-(9H-carbazol-9-yl)butoxy)benzoate [CBzCOOCH$_3$G1]

The synthesis of compound CBzCOOCH$_3$G1 was done by combining CBz Br (27.93 g, 0.0923 mol), methyl-3,5-dihydroxybenzoate (6.49 g, 0.0386 mol), and 18-crown-6 (2.416 g) in acetone. To the resulting yellow solution mixture was added K$_2$CO$_3$ (29.46 g) and this was left at reflux for 3 days. This was continuously stirred for 2 days. The solvent was then removed using a rotary evaporator. Water was added to the cream solid residue and the desired compound extracted with dichloromethane. The organic layer was subjected to rotary evaporation until 20-25 mL was left just to dissolve the solid residue. To this was added ethyl acetate to precipitate out the desired white solid compound. $^1$H NMR (δ ppm in CDCl$_3$): $^1$H NMR (δ ppm in CDCl$_3$): 8.20 (d, 4H), 7.49-7.12 (m, 16H), 6.54 (s, 1H), 4.40 (t, 4H), 3.95 (t, 4H), 3.88 (s, 3H) 2.11-2.04 (m, 4H), 1.87-1.82 (m, 4H).

Synthesis of 3,5-bis(4-(9H-carbazol-9-yl)butoxy)benzoic acid [CBzCOOHG1]

CBzCOOCH$_3$G1 (2 g, mol) was dissolved in THF. Ethanol (50 mL) was then added to the solution. To this was added KOH (10 eq). This was then refluxed for 2 days. After which, the reaction mixture was cooled down and acidified to pH=2-3. This was then extracted with dichloromethane and the solution washed with NaHCO$_3$. After drying with Na$_2$SO$_4$, the desired product was precipitated in hexane. $^1$H NMR (δ ppm in CDCl$_3$): $^1$H NMR (d ppm in CDCl$_3$): 8.09 (δ, 4H, J=7.8), 7.46-7.14 (m, 14H), 6.55 (s, 1H), 4.39 (t, 4H, J=6.7), 3.93 (t, 4H, J=6.0), 2.08-2.03 (m, 4H), 1.84-1.82 (m, 4H).

Synthesis of 2-(2-(2-(2-hydroxy)ethoxy)ethoxy)ethyl-3(4-(9H-carbazol-9-yl)butoxy)-5-(4-(9H-carbazol-9-yl)butoxy))benzoate [CBzTEGG1]

In a one-necked flask were combined CBzCOOHG1 (100 mg, 0.1676 mmol), tetraehylene glycol (97.53 mg; 0.5027 mmol), and 4-dimethylaminopyridine (2.909 mg, 0.0238 mmol). The mixture was dissolved in minimal amount of dichloromethane, bubbled with nitrogen, and placed in an ice bath. After which, a solution of dicyclohexylcarbodiimide (47.94 mg, 0.2327 mmol) in dichloromethane was added dropwise to the reaction mixture. This was then stirred vigorously for 30 mins, warmed to room temperature and stirred for 2 days. The solid by-product was filtered off and the filtrate was washed with water (5×) and brine solution (2×). The mixture was then subjected to column chromatography using 3% MeOH/CH$_2$Cl$_2$. The desired product was further purified by precipitating out other by-products with ethyl acetate. The supernatant was then concentrated and dried under vacuum. $^1$H NMR (δ ppm in CDCl$_3$): 8.19 (δ, 4H, J=7.8), 7.56-7.49 (m, 8H), 7.35-7.29 (m, 4H), 7.24 (d, 2H, J=2.4), 6.63 (t, 1H, J=2.7), 4.55 (t, 2H, J=4.8), 4.48 (t, 4H, J=6.6), 4.03 (t, 4H, J=6.0), 3.89 (t, 2H, J=4.8), 3.78-3.61 (m, 12H), 2.22-2.12 (m, 4H), 1.97-1.88 (m, 4H). MALDI-TOF-MS for C$_{47}$H$_{52}$O$_8$N$_2$ m/z: calcd, 772.9364 [M+]. found, 772.7447.

SCHEME IV.2
Synthesis of the Atom Transfer Radical Polymerization (ATRP-silane) Initiator (11-(2-Bromo-2-methyl)propionyloxy)undecyltrichlorosilan)

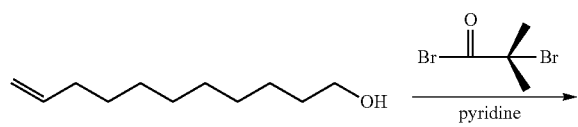

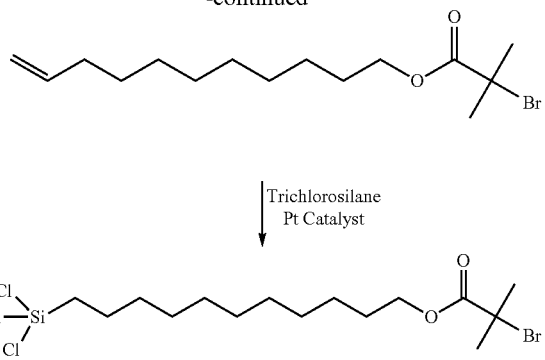

Synthesis of the Atom Transfer Radical Polymerization (ATRP-silane) Initiator (11-(2-Bromo-2-methyl)propionyloxy)undecyltrichlorosilan)

Synthesis of 10-Undecen-1-yl 2-Bromo-2-methylpropionate

A similar synthetic scheme was conducted as followed.[x] To a solution of 4.257 g (25 mmol) of co-undecylenyl alcohol in 25 mL of dry tetrahydrofuran was added 2.1 mL of pyridine (26.5 mmol) by dropwise addition of 3.10 mL of 2-bromoisobutyryl bromide (25 mmol). The mixture was stirred at ambient temperature for 8 hours. The remaining THF was removed under reduced pressure followed by dilution with hexane (50 mL). The mixture was washed with 2 M HCl solution and twice with water (50 ml). The organic phase was dried over sodium sulfate and filtered. The solvent was removed from the filtrate under reduced pressure yielding a colorless oil (89%). $^1$H NMR (500 MHz, CDCl$_3$) δ: 1.22-1.45 (br m, 12H); 1.62-1.75 (m, 2H); 1.94 (s 6H); 2.05 (q, 2H, J) 6 Hz); 4.17 (t, 2H, J=9 Hz); 4.9-5.05 (m, 2H); 5.72-5.9 (m, 1H) ppm.

Synthesis of 11-(2-Bromo-2-methyl)propionyloxy) undecyltrichlorosilane[2]

To a dry flask 1.35 g (4.23 mmol) of 10-undecen-1-yl 2-bromo-2-methylpropionate and 4.2 mL of trichlorosilane (42.6 mmol) were added. This was followed by the addition of Karstedt catalyst (4 μL, 100 ppm Pt equivalents). The reaction was allowed to stir for 6 h. The solution was immediately filtered through a plug of silica gel to remove the "Pt" catalyst. The excess trichlorosilane was removed under reduced pressure. The compound was used as such. Further purification can be done via vacuum distillation (80-85° C. at 2.0×10$^{-2}$ mmHg). When not the compound was not in use, it was stored in the drybox at 5° C. $^1$H NMR (500 MHz, CDCl$_3$) δ: 1.23-1.45 (br m, 16H); 1.54-1.75 (m, 4H); 1.93 (s 6H); 4.16 (t, 2H, J=9 Hz) ppm.

Initiator Immobilization[3]

Pre-patterned ITO slides were placed it into an 8 mM initiator anhydrous toluene solution for 19 h without stirring at 60° C. The initiator-modified Si wafer was thoroughly rinsed sequentially with toluene, followed by drying with nitrogen gas. The initiator-modified Si wafer was either immediately used for surface polymerization or stored in a desiccator under vacuum.

SCHEME IV.3
Synthesis of the Atom Transfer Radical Polymerization (ATRP-thiol) Initiator

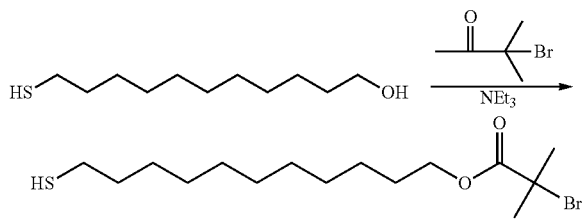

Synthesis of 11-mercaptoundecyl 2-bromo-2-methylpropanoate[4]

The thiol initiator (BrC(CH$_3$)$_2$COO(CH2)$_{11}$SH) was synthesized as reported.[2] A self-assembled monolayer (SAM) of the thiol initiator was obtained by immersing clean, gold-coated Si substrates in a 1 mM ethanolic solution of the thiol initiator for 1 day. After incubation, the substrates were washed with copious amounts of ethanol, and then rinsed again in ethanol to remove unbound thiols. The samples were finally dried with nitrogen.

Polymerization of NIPAM

The pre-patterned-coated slides with backfilled ATRP initiators placed into a schlenk tube and degassed with nitrogen. During this time a 0.16 M solution of NIPAM with a 1:1 ratio of methanol/water and 28 μL penta methyl diethyl triamine (PMDETA) was subjected to 3 cycles of freeze pump thaw technique. A third schlenk tube contained CuBr (6.35 mg, 0.04 mmol) was also degassed with nitrogen. Once the freeze pump thaw cycles were completed the solution containing the NIPAM, MeOH/H$_2$O, and PMDETA were transferred into the schlenk tube containing the CuBr a syringe. After 5 min of stirring, this solution was then transferred into the schlenk tube containing the slide with the ATRP-initiator bound to it. After the desired time the slide were rinsed with water, methanol and placed into a vial with a 1:1 MeOH/H$_2$O ratio solution over night to remove any unbound NIPAM, ligand, or metal catalyst.

Instrumentation

Electrochemistry

Cyclic voltammetry were performed in a conventional three-electrode cell using an Autolab PGSTAT 12 potentiostat (Brinkmann Instruments now MetroOhm USA). The potentiostat was controlled by GPES software (version 4.9). The electropolymerization of the monomer (FIG. 46C) is done using cyclic voltammetric (CV) technique in a standard three electrode measuring cell (fabricated electrochemical cell with a diameter of 1.0 cm and 0.785 cm$^3$, Teflon made) with platinum wire as the counter electrode, Ag/AgCl wire as the reference electrode, and the bare Au or PS coated Au substrate as the working electrode.

Quartz Crystal Microbalance (QCM)

The QCM apparatus, probe, and crystals were made available from Maxtek, Inc. The AT-cut polished Au-coated QCM crystals (5 MHz) with 13 mm diameter was used as the working electrode. The data acquisition was done with an R-QCM system equipped with a built-in phase lock oscillator and the R-QCM Data-Log software. The resulting change in frequency can then be used to calculate the mass change due to the adsorbed material onto the QCM crystal using the Sauerbrey equation:[5]

$$\Delta F = \frac{-2F_q^2 \Delta m}{A\sqrt{\rho_q \mu_q}}$$

where $\Delta F$ is the change in frequency, m is the mass change, $F_q$ (=5 MHz) is the resonant frequency of the QCM crystal, A (=1.227 cm$^2$) is the area of the electrode, $\rho_q$ (=2.65 g/cm$^3$) is the density of the quartz, and $\mu_q$ is the shear modulus of the quartz. Note that this equation is only used for the frequency measurement in air to discount the effect of the density and viscosity of the solution.[6]

Ellipsometry Measurement

The thickness of the polymer brush film is measured by ellipsometry using the Multiskop ellipsometer (Optrel GmbH, Germany) equipped with a 632.8 nm laser. The measurement is done at 60° angle of incidence at dry and ambient conditions on Au substrate. At least three measurements are performed at various spots of the film. The measured values of $\Delta$ and $\Psi$ are used to simulate the thickness of the film using integrated specialized software (Elli, Optrel) that is provided with the instrument. The thickness of the polymer brush was calculated using a multilayer flat film model with an assumed refractive index of 1.5, which is typical for pNIPAM brush.[7]

Contact Angle Measurement

A static contact angle analysis of the electropolymerized film is done using a CAM 200 optical contact angle meter (KSV Instruments Ltd) with CAM 200 software. The measurement is achieved by making ~1 μL drop of Milli-Q water onto the film. At least three measurements are performed at various positions of the film.

Atomic Force Microscopy (AFM) Measurement

The AFM measurements are carried out in a piezo scanner from Agilent Technologies. The scanning rate is between 0.8 to 1.0 lines/s. Commercially available tapping mode tips (TAP300, Silicon AFM Probes, Ted Pella, Inc.) are used on cantilevers with a resonance frequency in the range of 290-410 kHz. The scanning of the electropolymerized film is performed under ambient and dry conditions. All AFM topographic images (AAC tapping mode) are filtered, and analyzed by using SPIP software (Scanning Probe Image Processor, Imagemet.com) or Gwyddion 2.19 software. The current sensing (CS) AFM analyses in contact mode were done on the same set up using Pt-coated Si$_3$N$_4$ tip with radius around 20 nm and force constant of 0.5 N/m. The measurements were done under ambient conditions at ~40-50% relative humidity and 20-25° C. temperature. All AFM topographic images (AAC tapping mode) are filtered, and analyzed by using SPIP software (Scanning Probe Image Processor, Imagemet.com) or Gwyddion 2.19 software.

X-ray Photoelectron Spectroscopy (XPS) Measurement

A PHI 5700 X-ray photoelectron spectrometer was equipped with a monochromatic Al Kα X-ray source (hn=1486.7 eV) incident at 90° relative to the axis of a hemispherical energy analyzer. The spectrometer was operated both at high and low resolutions with pass energies of 23.5 eV and 187.85 eV, respectively, a photoelectron take off angle of 45° from the surface, and an analyzer spot diameter of 1.1 mm. All spectra were collected at room temperature with a base pressure of 1×10$^{-8}$ torr. The peaks were analyzed first by background subtraction using the Shirley routine. All the samples were completely dried in argon gas prior to XPS measurements.

Scanning Electron Microscopy

The morphology of the samples were examined by field emission scanning electron microscopy (FE-SEM) using a JSM 6330F JEOL instrument operating at 15 kV. Prior to SEM analysis, the films were thoroughly dried under vacuum for at least 24 hrs. SEM images were processed and analyzed using ImageJ software.

Attenuated Total Reflectance Fourier Transform Infrared (ATR-FTIR)

The ATR FTIR spectra were obtained on a Digilab FTS 7000 equipped with a HgCdTe detector from 4000 to 600 (cm$^{-1}$) wavenumbers. All spectra were taken with a nominal spectral resolution of 4 cm$^{-1}$ in absorbance mode. All films were measured under ambient and dry conditions. The scanning of the film was done on ITO substrate for both patterned and unpatterned surfaces.

REFERENCES FOR SYNTHESIS OF SECTION IV

The following references were cited in this section.
1 M. J. Felipe, R. Ponnapati, R. C. Advincula, *Submitted to ACS Appl. Mater. Interfaces*.
2 K. Matyjaszewski, P. J. Miller, N. Shukla, B. Immaraporn, A. Gelman, B. B. Luokala, T. M. Siclovan, G. Kickelbick, T. Vallant, H. Hoffmann, T. Pakula, *Macromolecules* 1999, 32, 8716.
3 K. Yu, H. Wang, L. Xue, Y. Han, *Langmuir* 2007, 23, 1443.
4 D. M. Jones, A. A. Brown, W. T. S. Huck, *Langmuir* 2002, 18, 1265.
5 G. Sauerbrey, *Z Phys*. 1959, 155, 206.
6 J. Bard, I. Rubinstein, *Electroanalytical Chemistry, Vol.* 22, Marcel Dekker, Inc., New York, USA 2004, Ch. 1.
7 a) N. C. Estillore, J. Y. Park, R. C. Advincula. *Macromolecules* 2010, 43, 6588. b) T. M. Fulghum, N. C. Estillore, C.-D. Vo, S. P. Armes, R. C. Advincula. *Macromolecules* 2008, 41, 429.

While the invention described here specifically relates to the design, fabrication, characterization, and use of new types of electrodeposited polymer coatings that offer both unique reversible wettability and electro-optical properties, one of ordinary skills in the art, with the benefit of this disclosure, would recognize the extension of this design to non-conducting polymers such as but not limited to acrylate, styrene, vinyl functional groups via cathodic, and other classes of materials.

All references cited herein are incorporated by reference. Although the invention has been disclosed with reference to its preferred embodiments, from reading this description those of skill in the art may appreciate changes and modification that may be made which do not depart from the scope and spirit of the invention as described above and claimed hereafter.

We claim:

1. A method for forming non-fluorinated conducting polymer coatings on a substrate comprising:
   forming a conducting layer on a surface of a substrate, and electrodepositing monomers of the general formula:

$$A-RZ \quad (I)$$

to form a non-fluorinated conducting polymer coating on the conducting layer to form a coated substrate, and where A is an anodic electropolymerizable group and is 2,5-di(thiophen-2-yl)thiophen-3-yl, R is an alkenyl group having between 1 and about 20 carbon atoms, where one or more of the carbon atoms may be replaced by oxygen atoms, amino groups, amide groups, ester groups, or mixtures thereof, and Z is an end group selected from the group consisting of COOH, COOR$^1$, and mixtures thereof, R$^1$ is a carbyl group having between 1 and about 10 carbon atoms and where the coating has controllable properties by applying an electric potential across the coating, where the properties include redox chemical, wettability and electrochromic or electro-optical properties.

2. The method of claim 1, wherein the electodepositing step comprises (a) anodic electropolymerizing or oxidative polymerizing or (b) cathodic electropolymerizing or reductive polymerizing the monomers to form the coating.

3. The method of claim 2, wherein the wettability properties are dual superhydrophobic and superoleophilic wettability properties and the redox chemical properties, the wettability properties, and the electrochromic or electro-optical properties are easily and rapidly reversed with voltage or surfactant.

4. The method of claim 1, wherein the redox chemical, wettability, and electrochromic or electro-optical properties are tuned by the electric potential across the coating.

5. The method of claim 1, further comprising:
   prior to the electrodepositing step, depositing one layer or a plurality of layers on the conducting layer, each layer comprising particles and where the layer or layers deposited on the conducting layer of the substrate surface influence a morphology of the coating.

6. The method of claim 5, further comprising the step of:
   doping the coating with a dopant or dopants, where the dopants permit control of the electro-optical properties of the coating, where the electro-optical properties are controlled by a level of doping and a nature of the coating and layers.

7. The method of claim 6, further comprising the step of:
   treating the coating with a surfactant or surfactants, where the surfactants permit further tuning of the wettability behavior of the coating.

8. The method of claim 6, further comprising the step of:
   after the electrodepositing step, removing the layers to provide an open coating structure having opened cavities.

9. The method of claim 8, further comprising the step of:
   after removing, backfilling the cavities with a backfilled initiator to form a backfilled initiator self-assembled monolayer.

10. The method of claim 9, further comprising the step of:
    polymerizing polymer brushes onto the backfilled initiator self-assembled monolayer.

11. The method of claim 6, wherein the coated substrate comprises an anti-wetting coated substrate, a filtration coated substrate, an anti-corrosion coated substrate, a de-icing coated substrate, an anti-microbial coated substrate, an electrochromic coated substrate, or an electrophoretic coated substrate or an electro-wetting coated substrate.

12. The method of claim 11, wherein the properties are tuned to resist or adsorb protein and bacterial cell.

13. The method of claim 5, wherein the layers provide a submicron scaled roughness of a biomimetic surface imitating a geometrical microstructure of a surface of a biological system, and the redox chemical, electrochromic and wettability properties are tuned by applying the electric potential across the coating.

14. The method of claim 13, wherein the particles comprise polymer particles, polymer latex particles, metal oxide particles, ceramic particles, salt particles, or mixtures and combinations thereof.

15. The method of claim 14, wherein the polymer latex particles comprise polymer latex microspheres.

16. The method of claim 1, wherein the coated substrate comprises an anti-wetting coated substrate, a filtration coated substrate, an anti-corrosion coated substrate, a de-icing coated substrate, an anti-microbial coated substrate, an electrochromic coated substrate, or an electrophoretic coated substrate or an electro-wetting coated substrate.

17. The method of claim 16, wherein the properties are tuned to resist or adsorb protein and bacterial cell.

18. The method of claim 1, wherein the conducting layer is a conducting electrode.

19. The method of claim 18, wherein the conducting electrode comprises a metal, a metal alloy, a conducting metal oxide, a conducting polymer, or a conducting non-polymer, where the metal comprises gold (Au), platinum (Pt), iridium (Ir), rhodium (Rh), iron (Fe), titanium (Ti), zinc (Zn), aluminum (Al), or mixtures thereof and the metal alloy comprise alloys of gold (Au), platinum (Pt), iridium (Ir), rhodium (Rh), iron (Fe), titanium (Ti), zinc (Zn), aluminum (Al), or mixtures thereof and where the conducting metal oxide is indium tin oxide (ITO).

20. The method of claim 1, wherein the R group is $CH_2$.

21. The method of claim 20, wherein the monomer comprises 2-(2,5-di(thiophen-2-yl)thiophen-3-yl)acetic acid, ethyl 2-(2,5-di(thiophen-2-yl)thiophen-3-yl)acetate, or mixtures thereof.

22. The method of claim 21, wherein:
the wettability properties are evidenced by a change in a water contact angle from a value of ≥150° at 0 V, a superhydrophobic surface, to a value of ~60° at 1.05 V, a hydrophillic surface,
the electrochromic properties are evidenced by a change in color of the film from orange at 0 V to dark green at 1.05V, and
the wettability and electrochromic properties are reverisble.

* * * * *